(12) United States Patent
Stellenberg

(10) Patent No.: US 9,950,247 B2
(45) Date of Patent: Apr. 24, 2018

(54) PINBALL MACHINE

(71) Applicant: Mulitmorphic, Inc., Austin, TX (US)

(72) Inventor: Gerald Stellenberg, Austin, TX (US)

(73) Assignee: Multimorphic, Inc., Austin, TX (US)

( * ) Notice: Subject to any disclaimer, the term of this patent is extended or adjusted under 35 U.S.C. 154(b) by 40 days.

(21) Appl. No.: 15/259,742

(22) Filed: Sep. 8, 2016

(65) Prior Publication Data

US 2017/0001100 A1   Jan. 5, 2017

Related U.S. Application Data

(63) Continuation-in-part of application No. 13/933,590, filed on Jul. 2, 2013, now Pat. No. 9,604,129, which
(Continued)

(51) Int. Cl.
*A63F 7/02*   (2006.01)
*G07F 17/32*   (2006.01)
*A63F 9/24*   (2006.01)

(52) U.S. Cl.
CPC ............ *A63F 7/027* (2013.01); *G07F 17/323* (2013.01); *G07F 17/3211* (2013.01);
(Continued)

(58) Field of Classification Search
CPC ... A63F 7/025; A63F 7/027; A63F 2007/0064
See application file for complete search history.

(56) References Cited

U.S. PATENT DOCUMENTS 3,897,951 A   8/1975   Morrison et al.
4,015,847 A *   4/1977   Myers ................... A63F 7/0608
                                                   273/108.1
(Continued)

FOREIGN PATENT DOCUMENTS

EP   0 737 495 A1   10/1996
WO   1984001908 A1   5/1984

OTHER PUBLICATIONS

Pinball News, P3 Pinball Platform, published on Mar. 23, 2012 at http://www.pinballnews.com/learn/p3, last accessed on Dec. 28, 2012.
(Continued)

*Primary Examiner* — Dmitry Suhol
*Assistant Examiner* — Ankit Doshi
(74) *Attorney, Agent, or Firm* — Braxton Perrone, PLLC

(57) ABSTRACT

Pinball machines are described. A method includes detecting an event during a game played at least in part over a surface of a playfield in a pinball machine. The playfield has first and second playfield portions. In response to the event, a playfield reducer located between the first and second portions is electronically activated in a manner sufficient to prevent a pinball from traveling between the first and second playfield portions. A pinball machine includes a playfield reducer that is operable to be in and transition between first and second positions during normal gameplay. When the playfield reducer is in the first position, the pinball is capable of rolling into and out of a portion of the playfield surface, and when the playfield reducer is in the second position, the playfield reducer prevents the pinball from accessing or from leaving the portion of the playfield surface.

6 Claims, 31 Drawing Sheets

Related U.S. Application Data is a continuation-in-part of application No. 13/777,865, filed on Feb. 26, 2013, which is a continuation-in-part of application No. 13/734,151, filed on Jan. 4, 2013, now Pat. No. 9,604,128, application No. 15/259,742, which is a continuation-in-part of application No. 14/485,823, filed on Sep. 15, 2014, now Pat. No. 9,463,375, which is a continuation-in-part of application No. 13/866,488, filed on Apr. 19, 2013, now Pat. No. 9,468,841, which is a continuation-in-part of application No. 13/734,151, filed on Jan. 4, 2013, now Pat. No. 9,604,128.

(60) Provisional application No. 61/633,559, filed on Feb. 14, 2012, provisional application No. 61/632,749, filed on Jan. 31, 2012, provisional application No. 61/632,002, filed on Jan. 17, 2012, provisional application No. 61/634,352, filed on Feb. 28, 2012, provisional application No. 61/685,588, filed on Mar. 21, 2012, provisional application No. 61/685,644, filed on Mar. 22, 2012, provisional application No. 61/690,711, filed on Jul. 3, 2012, provisional application No. 61/741,126, filed on Jul. 13, 2012, provisional application No. 61/687,307, filed on Apr. 23, 2012, provisional application No. 61/690,882, filed on Jul. 9, 2012, provisional application No. 61/960,315, filed on Sep. 17, 2013, provisional application No. 61/960,316, filed on Sep. 17, 2013, provisional application No. 61/961,007, filed on Oct. 3, 2013.

(52) U.S. Cl.
CPC ...... *G07F 17/3216* (2013.01); *G07F 17/3248* (2013.01); *A63F 2009/246* (2013.01); *A63F 2009/2442* (2013.01); *A63F 2009/2458* (2013.01); *G07F 17/3297* (2013.01)

(56) References Cited

U.S. PATENT DOCUMENTS

| | | | |
|---|---|---|---|
| 4,075,620 A | 2/1978 | Passavant | |
| 4,189,145 A | 2/1980 | Stubben et al. | |
| 4,269,412 A | 5/1981 | Hughes | |
| 4,269,413 A * | 5/1981 | Langieri | A63F 7/26 273/118 D |
| 4,359,223 A | 11/1982 | Baer et al. | |
| 4,367,876 A | 1/1983 | Kotoyori | |
| 4,375,286 A * | 3/1983 | Seitz | A63F 7/027 273/121 A |
| 4,448,417 A * | 5/1984 | Clark | A63F 7/027 273/121 A |
| 4,542,905 A | 9/1985 | Hooker | |
| 4,606,545 A | 8/1986 | Ritchie | |
| 4,710,873 A | 12/1987 | Breslow et al. | |
| 4,805,906 A | 2/1989 | Wiczer et al. | |
| 4,840,375 A * | 6/1989 | Lawlor | A63F 7/027 273/119 A |
| 4,853,764 A | 8/1989 | Sutter | |
| 4,971,323 A | 11/1990 | Gottlieb | |
| 5,190,286 A | 3/1993 | Watanabe et al. | |
| 5,316,303 A * | 5/1994 | Trudeau | A63F 7/027 273/118 A |
| 5,327,284 A | 7/1994 | Kuester | |
| 5,351,966 A | 10/1994 | Tohyama | |
| 5,418,579 A | 5/1995 | Jamieson | |
| 5,421,589 A | 6/1995 | Monroe | |
| 5,516,103 A | 5/1996 | Lawlor et al. | |
| 5,553,864 A | 9/1996 | Sitrick | |
| 5,558,373 A * | 9/1996 | Lesley | A63F 7/027 273/118 A |
| 5,611,731 A | 3/1997 | Bouton et al. | |
| 5,639,151 A | 6/1997 | McNelley et al. | |
| 5,669,685 A | 9/1997 | Kotani et al. | |
| 5,685,625 A | 11/1997 | Beaver | |
| 5,961,116 A | 10/1999 | Beyer | |
| 5,971,396 A | 10/1999 | Wieland | |
| 6,000,697 A * | 12/1999 | Popadiuk | A63F 7/027 273/118 A |
| 6,036,188 A | 3/2000 | Gomez et al. | |
| 6,036,189 A * | 3/2000 | Gomez | A63F 7/027 273/118 A |
| 6,129,353 A | 10/2000 | DeMar et al. | |
| 6,199,861 B1 | 3/2001 | Hume et al. | |
| 7,075,026 B2 | 7/2006 | Huang et al. | |
| 7,736,228 B2 | 6/2010 | Seelig et al. | |
| 2005/0245302 A1* | 11/2005 | Bathiche | A63F 13/00 463/1 |
| 2008/0143047 A1* | 6/2008 | Lokos | A63F 7/0017 273/121 R |
| 2008/0231611 A1 | 9/2008 | Bathiche et al. | |
| 2010/0160016 A1 | 6/2010 | Shimabukuro et al. | |
| 2011/0263312 A1* | 10/2011 | De Waal | A63F 7/02 463/20 |
| 2013/0147111 A1 | 6/2013 | Popadiuk | |

OTHER PUBLICATIONS

Pinball News, P3 Update: Team Adds New Game Designer, published on Dec. 5, 2012 at http://www.pinballnews.com/games/p3/index4.html, last accessed on Dec. 28, 2012.

Stellenberg, "Custom pinball machine—interactive playfield prototype," accessible at http://www.youtube.com/watch?v=Ek4F56AwAqE, uploaded on Sep. 3, 2011.

* cited by examiner

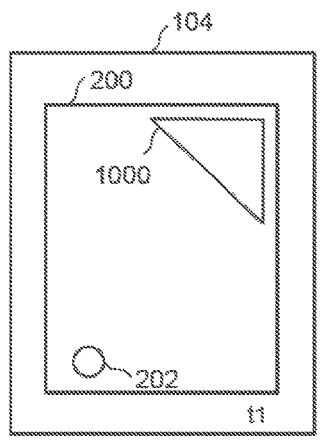 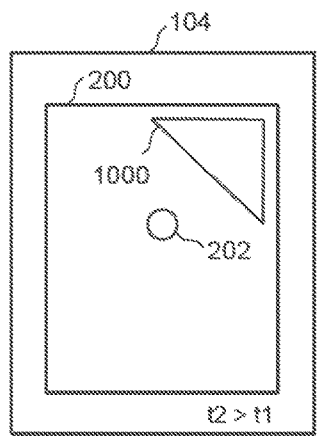 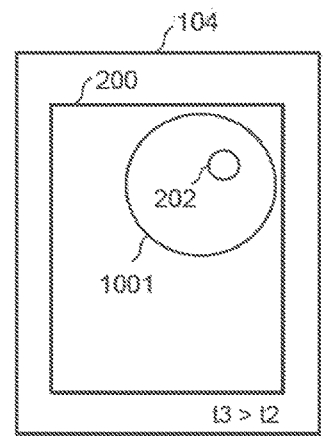
FIG. 10A          FIG. 10B          FIG. 10C
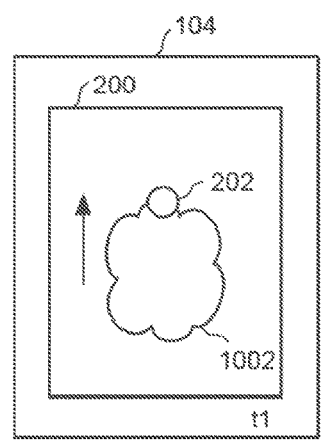 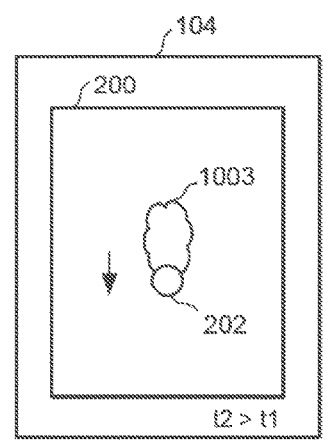
FIG. 10D          FIG. 10E

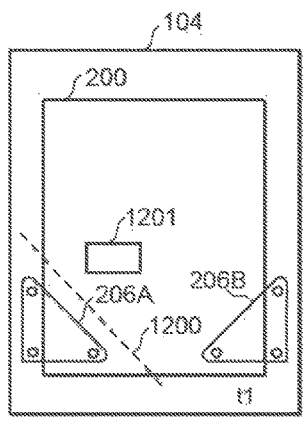 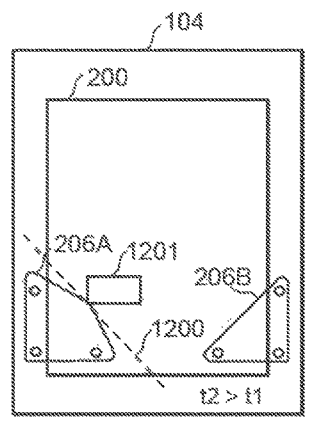 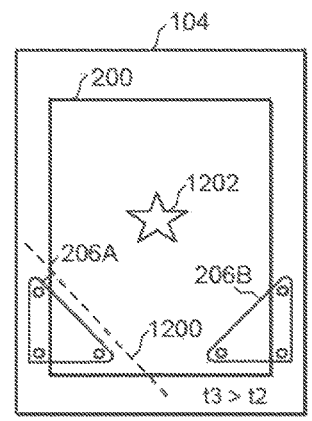
FIG. 12A　　　　　FIG. 12B　　　　　FIG. 12C
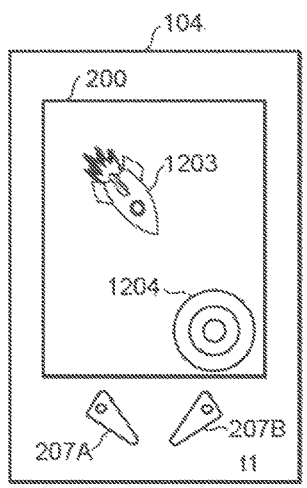 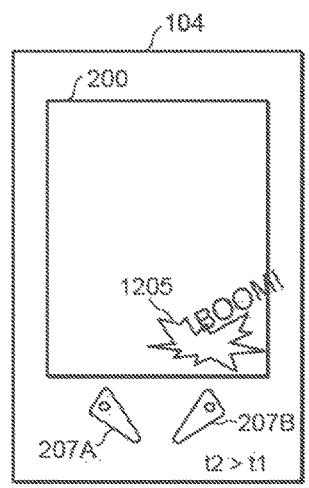 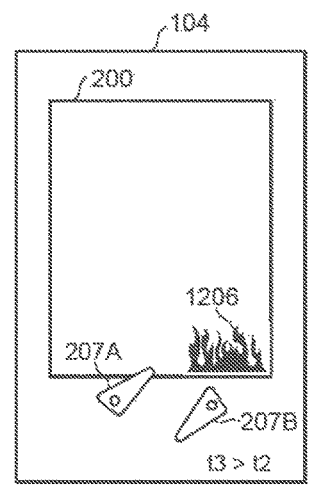
FIG. 12D　　　　　FIG. 12E　　　　　FIG. 12F

PINBALL MACHINE

CROSS-REFERENCE TO RELATED APPLICATIONS

This application claims priority to and is a continuation-in-part of U.S. patent application Ser. No. 13/933,590, filed on Jul. 2, 2013, which claims priority to and is a continuation-in-part of U.S. patent application Ser. No. 13/777,865, filed on Feb. 26, 2013, which claims priority to and is a continuation-in-part of U.S. patent application Ser. No. 13/734,151, filed on Jan. 4, 2013, which claims priority to and the benefit of U.S. Provisional Application No. 61/633,559, filed Feb. 14, 2012; U.S. Provisional Application No. 61/632,749, filed Jan. 31, 2012; and U.S. Provisional Application No. 61/632,002, filed Jan. 17, 2012; the entire disclosures of all of the foregoing applications are hereby incorporated herein by reference.

This application claims priority to and is a continuation-in-part of U.S. patent application Ser. No. 14/485,823, filed on Sep. 15, 2014, which claims priority to and is a continuation-in-part of U.S. patent application Ser. No. 13/866,488, filed on Apr. 19, 2013, which claims priority to and is a continuation-in-part of U.S. patent application Ser. No. 13/734,151, filed on Jan. 4, 2013, which claims priority to and the benefit of U.S. Provisional Application No. 61/633,559, filed Feb. 14, 2012; U.S. Provisional Application No. 61/632,749, filed Jan. 31, 2012; and U.S. Provisional Application No. 61/632,002, filed Jan. 17, 2012; the entire disclosures of all of the foregoing applications are hereby incorporated herein by reference.

U.S. patent application Ser. No. 13/777,865 claims priority to and the benefit of U.S. Provisional Patent Application No. 61/634,352, filed on Feb. 28, 2012; U.S. Provisional Patent Application No. 61/685,588, filed on Mar. 21, 2012; and U.S. Provisional Patent Application No. 61/685,644, filed on Mar. 22, 2012; the entire disclosures of all of the foregoing applications are hereby incorporated herein by reference.

U.S. patent application Ser. No. 13/933,590 claims priority to U.S. Provisional Patent Application No. 61/690,711, filed on Jul. 3, 2012; and U.S. Provisional Patent Application No. 61/741,126, filed on Jul. 13, 2012; the entire disclosures of all of the foregoing applications are hereby incorporated herein by reference.

U.S. patent application Ser. No. 13/866,488 claims priority to U.S. Provisional Patent Application No. 61/687,307, filed on Apr. 23, 2012; and U.S. Provisional Patent Application No. 61/690,882, filed on Jul. 9, 2012; the entire disclosures of all of the foregoing applications are hereby incorporated herein by reference.

U.S. patent application Ser. No. 14/485,823 claims priority to U.S. Provisional Patent Application No. 61/960,315, filed on Sep. 17, 2013; U.S. Provisional Patent Application No. 61/960,316, filed on Sep. 17, 2013; and U.S. Provisional Patent Application No. 61/961,007, filed on Oct. 3, 2013; the entire disclosures of all of the foregoing applications are hereby incorporated herein by reference.

BACKGROUND

A pinball machine is an entertainment or amusement device usually found in a variety of public places such as arcades, restaurants, bars, clubs, etc., but sometimes also present in private residences and other environments. Generally speaking, a conventional or traditional pinball machine allows players to play a game in which points are earned by physically manipulating one or more steel balls on a slightly inclined playfield within a glass-covered cabinet.

The pinball machine's playfield typically includes one or more physical targets. When a ball strikes a particular physical target, an electromechanical switch coupled to (or otherwise integrated into) the target detects the mechanical impact, which then triggers a change in some aspect of the game. For example, in some cases, when a ball hits a given target, a player may score a predetermined amount of points.

In most pinball implementations, a "hole" or "drain" is located at the bottom portion of the playfield. Usually, if the ball falls into the drain, the game ends or another ball is provided to the player. Mechanical "flippers" capable of at least partially covering the drain may allow a skilled player to hit the ball at an appropriate time so as to prevent it from falling into the drain, thus putting that same ball back in play and extending the duration of the game.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 10A-H are diagrams illustrating examples of physical object(s) initiating interaction(s) with virtual object(s) according to some embodiments.

FIGS. 12A-F are diagrams illustrating examples of virtual object(s) initiating interaction(s) with physical object(s) according to some embodiments.

DETAILED DESCRIPTION

Systems and methods disclosed herein are directed to pinball machines with hybrid or modular playfields and methods of operating the same. Generally speaking, some of these systems and methods may be incorporated into, or otherwise combined with, a wide range of other entertainment or amusement devices, including, but not limited to, video games, electro-mechanical games, redemption games, merchandisers, billiards, shuffleboards, table football ("Foosball"), table tennis ("Ping-Pong"), air hockey tables, etc. These systems and methods may also be incorporated into gambling devices, such as slot machines, pachinko machines, or the like. It should be noted, however, that some of the techniques discussed herein may be uniquely applicable to devices that allow a player to manipulate a physical object within a playfield without directly touching that physical object (e.g., pinball machines).

Figure 1:
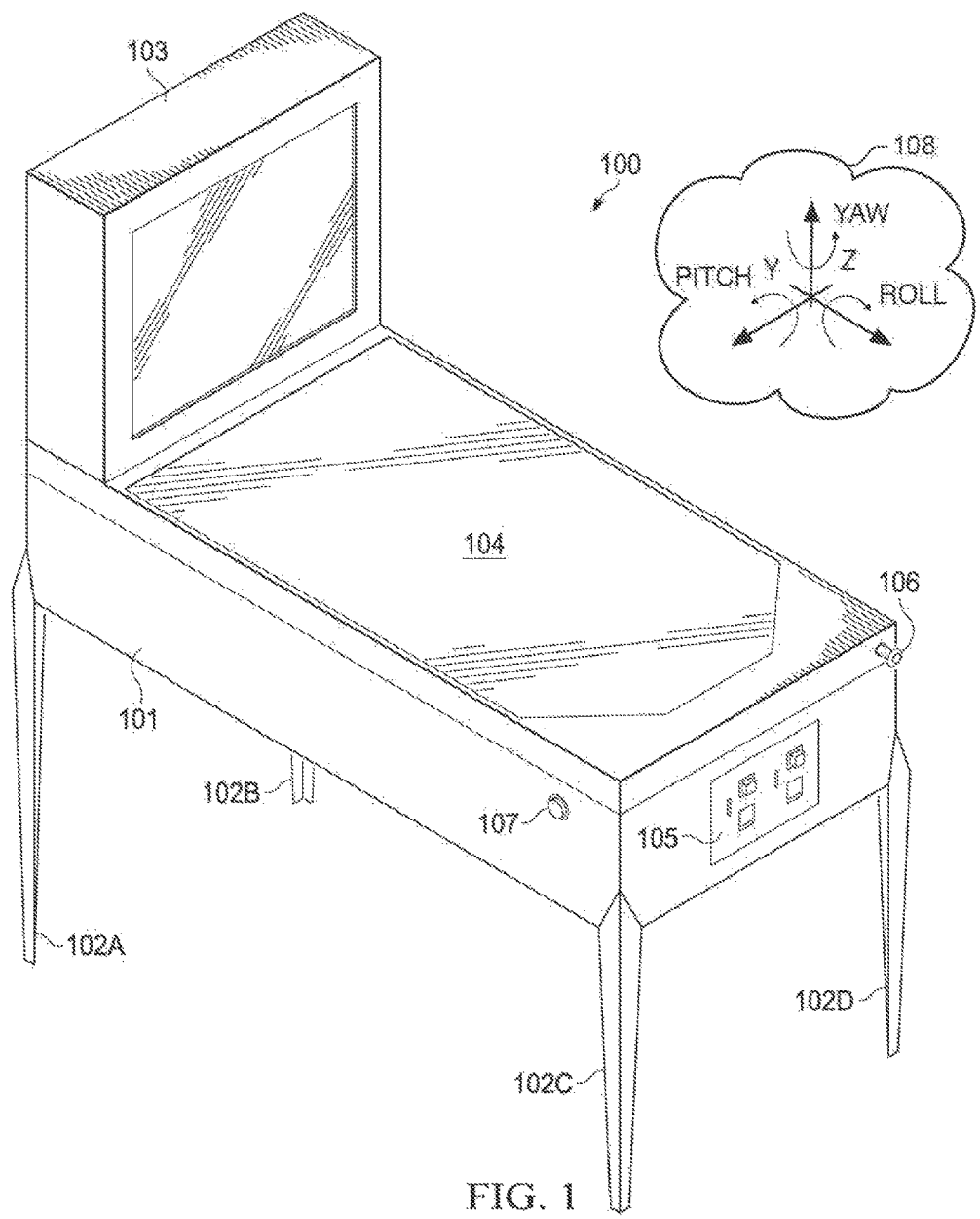
FIG. 1 is a three-dimensional, auxiliary view of an example of a pinball machine according to some embodiments.

Turning to FIG. 1, a three-dimensional, auxiliary view of an example of pinball machine 100 is depicted according to some embodiments. As illustrated, cabinet 101 stands on legs 102A, 102B, 102C, 102D, although in other implementations, legs 102A, 102B, 102C, 102D may be absent and cabinet 101 may sit on a stand, desk, table, countertop, or the like. Cabinet 101 includes hybrid playfield 104, where a game of pinball may take place. Examples of hybrid playfield 104 are discussed in more detail below. In some cases, legs 102A and 102B may be slightly longer than legs 102C and 102D, such that hybrid playfield 104 may have an angle of approximately 3.5° to 10.5° with respect to the ground ("pitch"). Accordingly, hybrid playfield 104 may be said to have an approximately horizontal surface. In other cases, legs 102A, 102B, 102C, 102D may each have the same length, and cabinet 101 may be constructed so as to provide a suitable pitch to hybrid playfield 104.

Vertical portion 103 may include one or more electronic displays, video cameras, loudspeakers, etc. Generally speaking, vertical portion 103 may include or otherwise present certain audio-visual information, whether related or unrelated to a pinball game playable on pinball machine 100 (e.g., promotional or marketing materials, etc.).

To enable a player to play a pinball game, front control(s) 105 may allow the user or player to deposit money or tokens into pinball machine 100. As such, front control(s) 105 may include, for example, a credit, coin or token receiver, a magnetic card reader, a Radio Frequency Identification (RFID) scanner, or the like. Front control(s) 105 may also include one or more buttons that allow a user to select a number of players for a particular game, or to simply to start a pinball game. Meanwhile, side control(s) 107 and playfield control(s) 106 allow the user to operate one or more physical objects within hybrid playfield 104. As an example, side control(s) 107 (and/or a corresponding control on the opposite side of cabinet 101, not shown) may include one or more buttons that allow a player to control mechanical "flippers." As another example, playfield control(s) 106 may include one or more buttons or mechanisms that allow the player to control a "plunger" element configured to put a steel ball in play during a pinball game.

Here it should be noted that pinball machine 100 is provided by way of illustration only. In different applications, pinball machine 100 may assume a variety of shapes and forms. Furthermore, one or more components discussed above may be absent or different from what is depicted in FIG. 1. For example, in some cases, front control(s) 105 may be located elsewhere on pinball machine 100, and, in other cases, may include more or fewer elements than shown. For instance, when designed for residential or personal use, pinball machine 100 may not be credit, coin or token-operated. Similarly, side control(s) 107 and/or playfield control(s) 106 may be replaced with motion detection devices (e.g., integrated into vertical portion 103), or may not be necessary for certain games. For example, if steel balls are provided within hybrid playfield 104 via an internal mechanism within pinball machine 100, then playfield control(s) 106 may not be necessary.

To facilitate understanding of some of the systems and methods introduced below, a three-dimensional (XYZ) coordinate system 108 is also shown in FIG. 1. As illustrated, an angle and/or rotation around the x axis is referred to as "roll," an angle and/or rotation around the y axis is referred to as "pitch," and an angle and/or rotation around the z axis is referred to as "yaw." As discussed in more detail below, in some implementations, pinball machine 100 and/or hybrid playfield 104 may include one or more accelerometers configured to evaluate leveling information based, at least in part, upon pitch, roll, and/or yaw measurements. Here, for ease of explanation, the lateral portion of pinball machine 100 is disposed along the x axis and the front portion of pinball machine 100 is disposed along the y axis.

Figure 2:
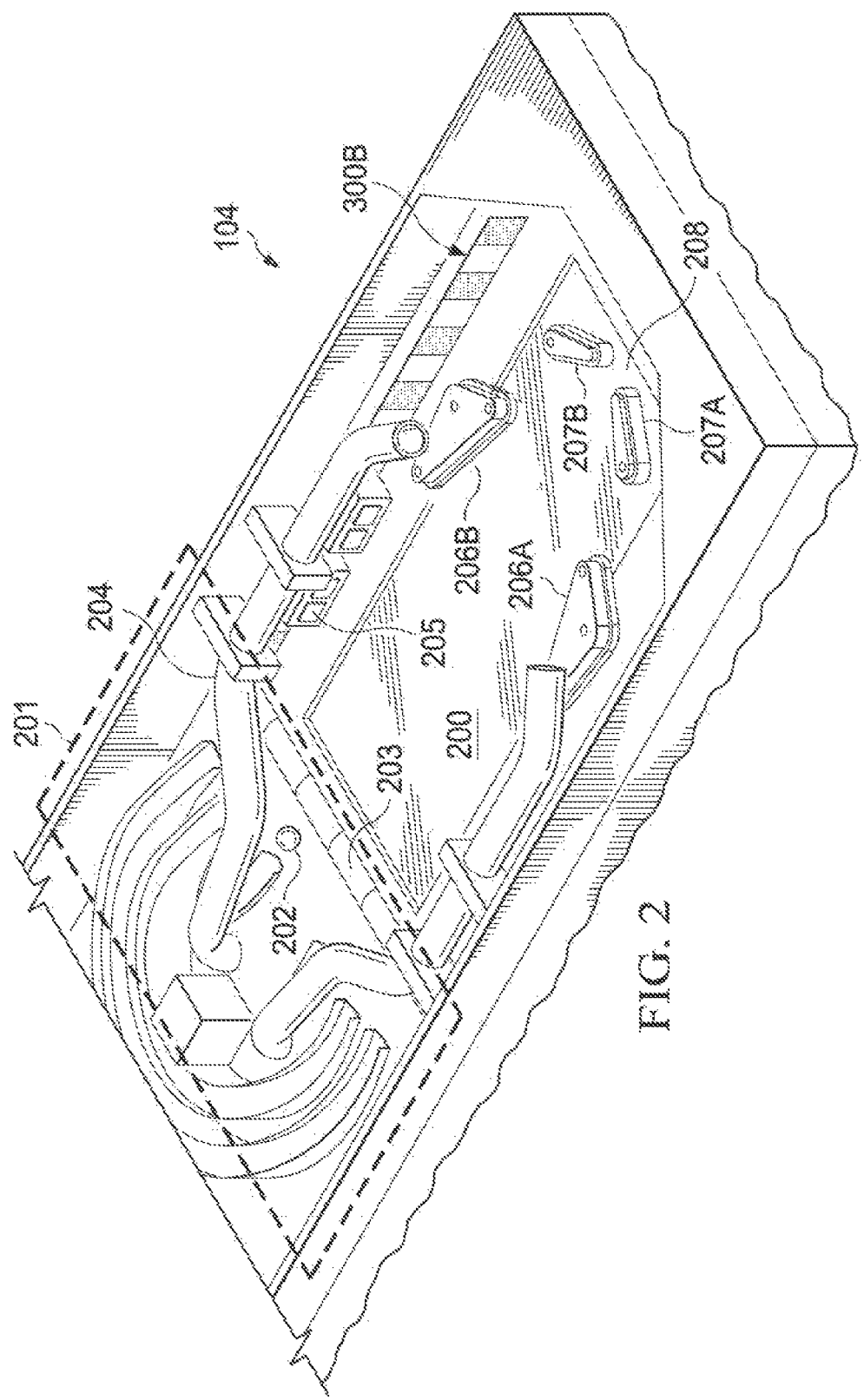
FIG. 2 is a three-dimensional, auxiliary view of an example of a hybrid playfield according to some embodiments.

FIG. 2 is a three-dimensional, auxiliary view of an example configurable hybrid playfield 104 according to some embodiments. Generally speaking, a "playfield" is a mostly flat surface over which one or more objects, such as pinball 202, move in an amusement game, such as a pinball game. Hybrid playfield 104 is a playfield comprising a "physical space" and a "virtual space." The physical space may include one or more mechanical or electromechanical elements, also referred to herein as "physical objects." Electronic display 200 may provide the virtual space portion of hybrid playfield 104 by rendering one or more graphical elements referred to herein as "virtual objects." Configurable and modular aspects of hybrid playfield 104 are discussed with respect to FIGS. 14-22 below.

In the case of a pinball machine, examples of physical objects of hybrid playfield 104 include, but are not limited to, ball(s), plunger(s), bumper(s), kicker(s), bullseye target(s), drop target(s), variable point target(s), roll(s), saucer(s), spinner(s), rollover(s), switch(es), gate(s), stopper(s), ramp(s), toy(s), electromagnet(s), etc. Meanwhile, virtual objects may include any graphical or digital element that may be rendered on electronic display 200, such as, for example, artwork, colors, images, animations, photographs, designs, etc.

In various implementations, systems and methods described herein may allow certain physical objects to cause changes to certain virtual objects and/or vice-versa. Accordingly, these systems and methods may create an impression or an illusion upon a player that physical and virtual elements are interacting during a game, for example, in a physical or mechanical manner.

In the illustrated embodiment, physical objects of hybrid playfield 104 include modular portion 201 configured to deploy one or more pinball 202 onto the playfield during a game. In this example, modular portion 201 includes barrier element(s) 203 and pipe element(s) 204. Barrier element(s) 203 may include one or more walls that can pop-up and at least partially block pinball 202 from transiting between modular portion 201 and other portion(s) of hybrid playfield 104. In some cases, barrier element(s) 203 may act as a "trap" to cause pinball 202 to fall under the surface of hybrid playfield 104 or become more or less static for a predetermined amount of time (e.g., by including an electromagnet or the like), for example. Meanwhile, pipe element(s) 204 may allow pinball 202 to travel through predetermined paths or "shortcuts" when traveling within hybrid playfield 104.

Once deployed, pinball 202 may tend to roll towards drain 208 depending upon the pitch of hybrid playfield 104 and absent action by a player operating flippers 207A and/or 207B. Flippers 207A and/or 207B are mechanically or electromechanically-controlled levers used for redirecting pinball 202 up hybrid playfield 104, preventing pinball 202 from falling into drain 208. Through the use of careful, skillful timing, a player may also be to manipulate flippers 207A and/or 207B to intentionally direct pinball 202 in a selected direction with a given speed, thus causing pinball 202 to hit various types of scoring targets, such as, for example, one or more trigger element 205 and/or slingshots 206A and 206B.

With respect to virtual object of hybrid playfield 104, electronic display 200 may be any suitable display or monitor (e.g., a Liquid Crystal Display (LCD) or the like) configured to present graphical designs and/or animations to a player. These virtual objects are configurable depending upon the design of a game, and may interact with certain physical objects in hybrid playfield 104. In some implementations, electronic display 200 may be capable of rendering 2D virtual objects on a flat screen. Additionally or alternatively, electronic display 200 may be capable of producing 3D and/or holographic virtual objects.

Although shown as a single display in FIG. 2, in other embodiments two or more electronic displays 200 may be disposed in hybrid playfield 104. For example, in some cases, a first electronic display and a second electronic display may be positioned side-by-side. In other cases, four electronic displays may be arranged such that each occupies a different quadrature of hybrid playfield 104. Furthermore, in some cases, electronic display 200 may be at least in part co-extensive with the surface of hybrid playfield 104.

As discussed in more detail below, pinball 202 may cause one or more virtual objects rendered by electronic display 200 to appear, disappear, or change depending upon its position on hybrid playfield 104. Similarly, when pinball 202 physically interacts with trigger element 205 and slingshots 206A and 206B, for example, one or more virtual objects presented on electronic display 200 may change their behavior in an appropriate manner. Conversely, virtual objects rendered on electronic display 200 may also behave in a way so as to cause a change in one or more of trigger element 205 and slingshots 206A and 206B, for example, thus appearing to a player as if a physical interaction between the virtual object and the physical object has taken place.

In some cases, in order to enable one or more of the foregoing operations, a tracking system may be disposed within pinball machine 100 to determine a position of pinball 202 and/or other physical objects. For instance, one or more arrays of infrared (IR) transducers may be disposed immediately above the surface of hybrid playfield 104 along one or more sides of electronic display 200.

Figure 3:
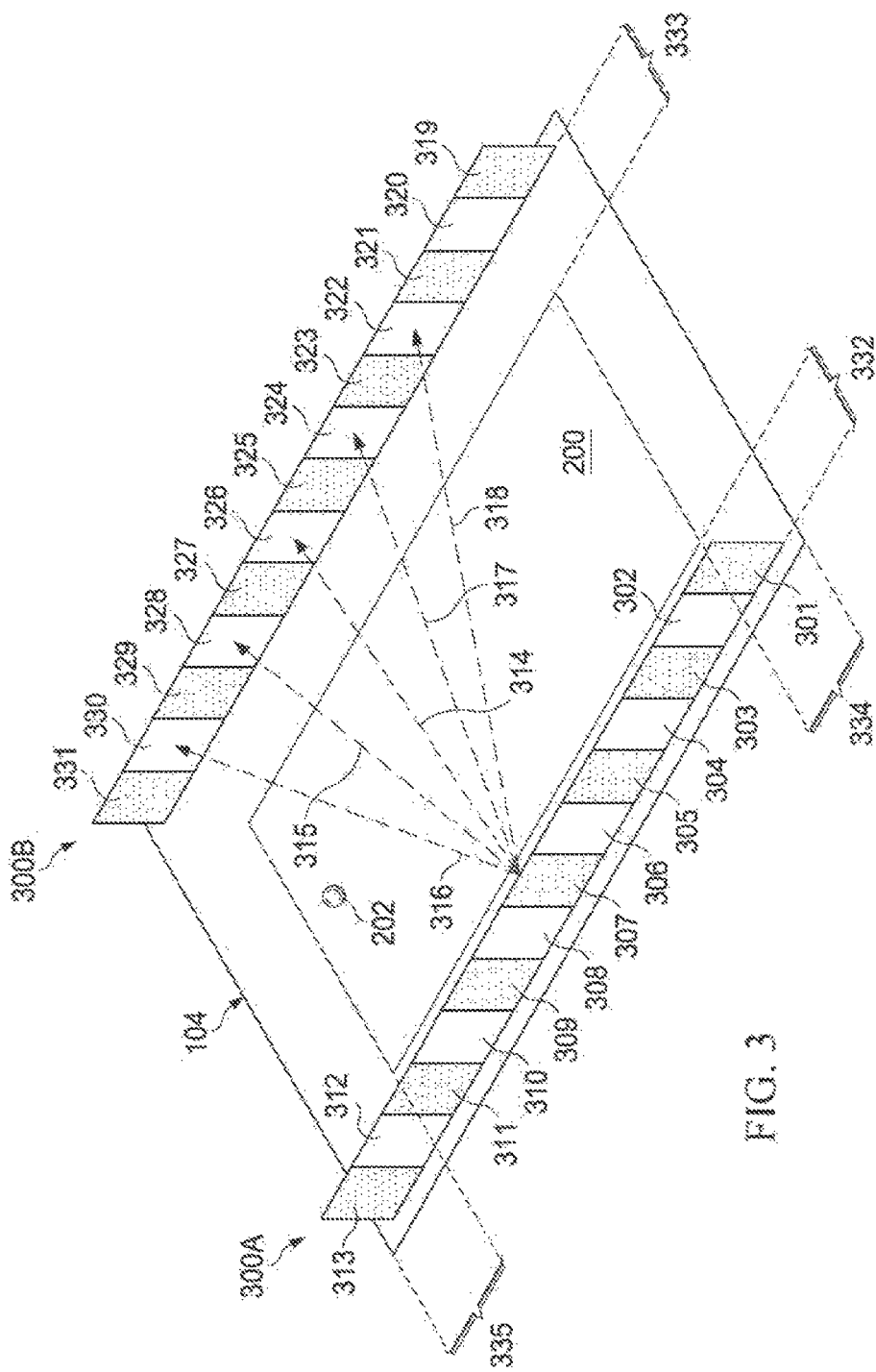
FIG. 3 is a three-dimensional, auxiliary view of an example of a tracking system in a hybrid playfield according to some embodiments.

Turning now to FIG. 3, a three-dimensional, auxiliary view of an example of tracking system 300 in hybrid playfield 104 is depicted according to some embodiments. As illustrated, tracking system 300 includes first IR transducer array 300A and second IR transducer array 300B. IR transducer arrays 300A and 300B are disposed immediately above the surface of hybrid playfield 104 on opposite sides of electronic display 200, and may be positioned such that other playfield components (e.g., trigger element 205, slingshots 206A and 206B, flippers 207A and 207B, etc.) do not interfere with its operations—that is, so that first IR transducer array 300A may have a least a partial direct line-of-sight with respect to second IR transducer array 300B. For instance, one or more of these playfield components may be "floating" with respect to electronic display 200 (e.g., attached or coupled to the top or cover of hybrid playfield 104).

In this example, IR transducer arrays 300A and 300B are positioned at lengths 332 and 333 from the sides of electronic display 200, and are longer than the height of electronic display 200 by lengths 334 and 335. In some implementations, distances and lengths 332, 333, 334, 335 may be selected to avoid interfering with gameplay (i.e., without blocking access of the pinball 202 to modular portion 201 or drain 208). Also, in cases where electronic display 200 extends to the edge of hybrid playfield 104, one or more of distances and lengths 332, 333, 334, 335 may be zero and/or IR transducer arrays 300A and 300B may be positioned outside of hybrid playfield 104.

In this embodiment, first IR transducer array 300A includes transmitter elements 301, 303, 305, 307, 309, 311, and 313 alternating with receiver or detector elements 302, 304, 306, 308, 310, and 312. Second IR transducer array 300B includes transmitter elements 319, 321, 323, 325, 327, 329, and 331 alternating with receiver or detector elements 320, 322, 324, 326, 328, and 330. It should be noted, however, that this particular configuration is provided for ease of explanation only, and that many other suitable configurations with a different number of arrays, transmitter elements, and detector elements may be used, sometimes in the same pinball machine 100. For instance, in other embodiments, tracking system 300 may include RF triangulation systems, video based motion tracking systems, capacitive systems, or other electro-mechanical position detection systems.

Figure 7:
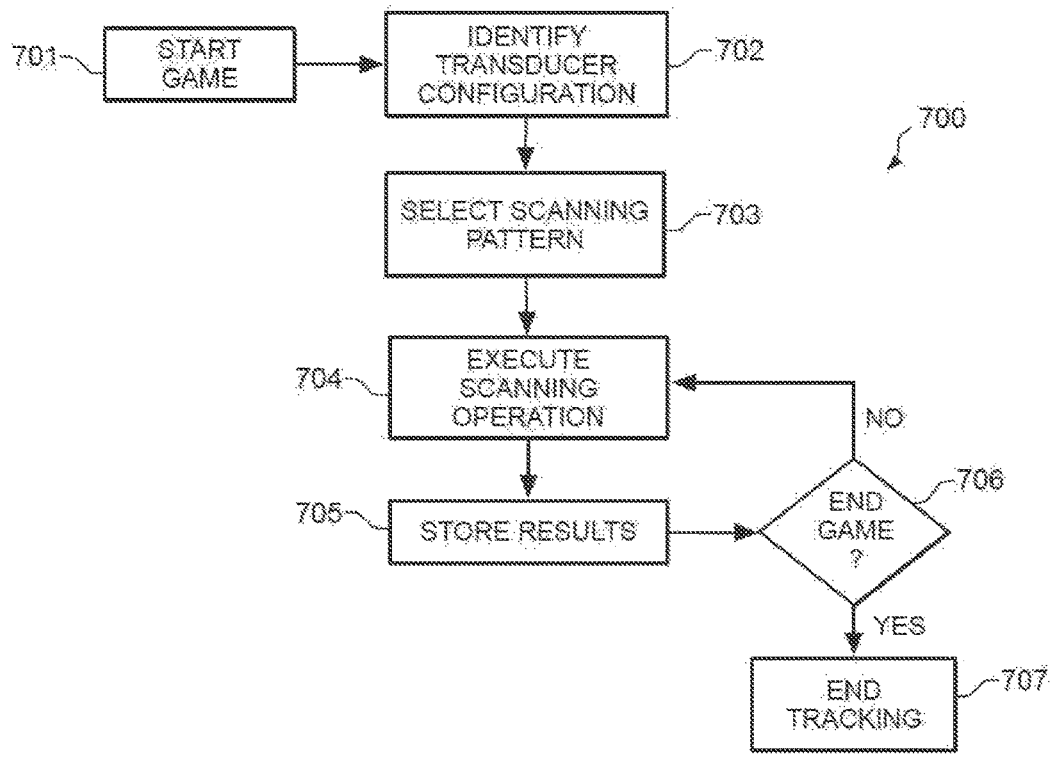
FIG. 7 is a flowchart of an example of a method of operating a tracking system in a hybrid playfield according to some embodiments.
Figure 8:
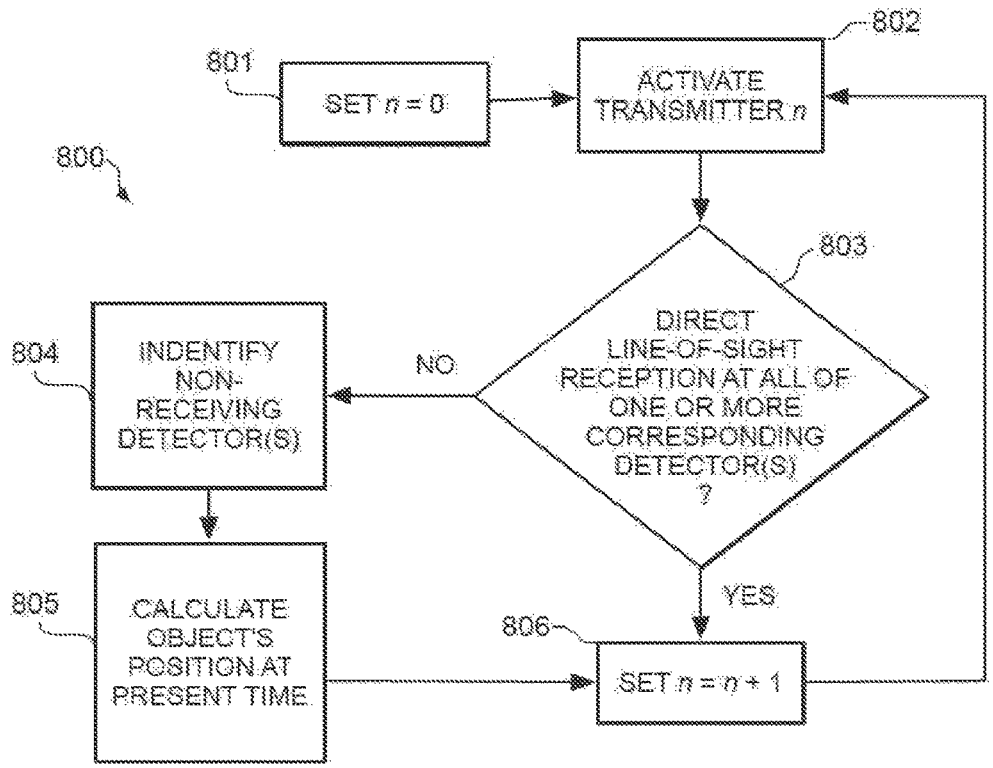
FIG. 8 is a flowchart of an example of a method of obtaining an object's position in a hybrid playfield using a tracking system according to some embodiments.

Tracking system 300 may be configured to scan hybrid playfield 104, for example, as explained in FIGS. 7 and 8. Briefly, each of transmitter elements 301, 303, 305, 307, 309, 311, and 313 of first IR transducer array 300A may transmit IR signals in succession such that one or more of detector elements 320, 322, 324, 326, 328, and/or 330 of second IR transducer array 300B receives these signals. Then, each of transmitter elements 319, 321, 323, 325, 327, 329, and 331 of second IR transducer array 300B may transmit IR signals in succession such that one or more of detector elements 302, 304, 306, 308, 310, and/or 312 of first IR transducer array 300A receives those signals. By determining which of detector elements 302, 304, 306, 308, 310, 312 320, 322, 324, 326, 328, and/or 330 were expected to receive their respective signals but did not, for example, because pinball 202 was blocking that detector's line-of-sight, tracking system 300 may determine the position of pinball 202 as it moves across hybrid playfield 104.

In some embodiments, tracking system 300 may be configured to determine the position, speed, and/or direction of movement of a physical object over hybrid playfield 104 with a margin of error no larger than the size of the physical object itself. Tracking system 300 may also be configured to determine the identification of a particular physical object, for example, when two pinballs 202 occupy hybrid playfield 104 simultaneously (e.g., via a chip or tag included in each pinball 202, by maintaining a record of which ball gets deployed at what time and their respective trajectories, etc.). In some implementations, two or more tracking systems 300 may be used in the same hybrid playfield 104, and each of the two or more tracking systems 300 may be of a different type (e.g., an IR system and an RFID system, etc.).

Figure 4:
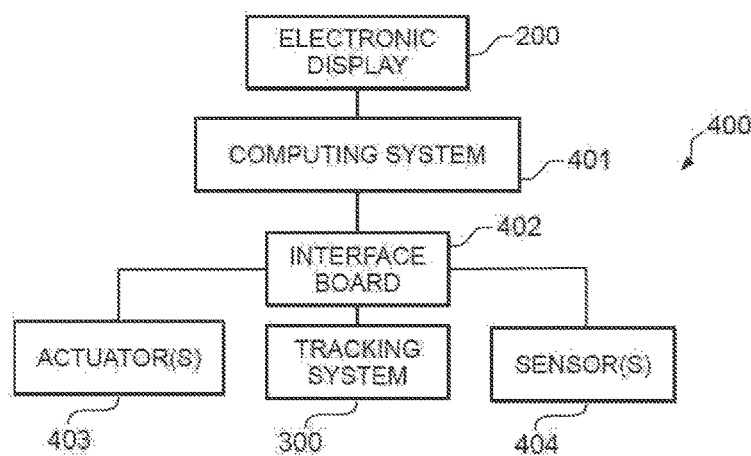
FIG. 4 is a block diagram of an example of hardware elements of a pinball machine with a hybrid playfield according to some embodiments.

FIG. 4 is a block diagram of an example of hardware elements 400 in pinball machine 100 with hybrid playfield 104 according to some embodiments. As shown, computing system 401 (e.g., controller) is coupled to electronic display 200 of FIG. 2. Computing system 401 is also coupled to (or otherwise includes) interface board 402, which in turn is coupled to tracking system 300, actuator(s) 403, and/or sensor(s) 404.

In operation, computing system 401 may be configured to control electronic display 200 by providing one or more video signals capable of being rendered by electronic display 200 to create one or more 2D or 3D virtual objects in hybrid playfield 104 during a pinball game. Also, through interface board 402, computing system 401 may be configured to control the behavior of and/or to receive information related to physical objects in hybrid playfield 104 through interface board 402.

In some embodiments, interface board 402 may be any suitable pinball controller device such as, for example, the "Pinball-Remote Operations Controller" or "P-ROC" controller available from Multimorphic, Inc., which enables a computer to control a pinball machine over Universal Serial Bus (USB). It should be noted, however, that other pinball controller devices may be used as interface board 402, and that such a device may communicate with computing system 401 using any suitable bus and/or communication protocol.

In some cases, interface board 402 may be configured to control actuator(s) 403, such as, for example, coils, motors, etc. to thereby affect the behavior or status of physical elements, such as, for example, pinball 202, barrier element(s) 203, pipe element(s) 204, trigger element 205, slingshots 206A and 206B, flippers 207A and 207B, or the like. Moreover, interface board 402 may be configured to receive information from sensor(s) 404 such as, for example, switches, optical sensors, accelerators, etc., to determine the status of those physical objects. With regard to certain physical objects, such as, for example, pinball 202, interface board 402 may also be configured to control tracking system 300 to obtain position and other information about those elements.

Figure 5:
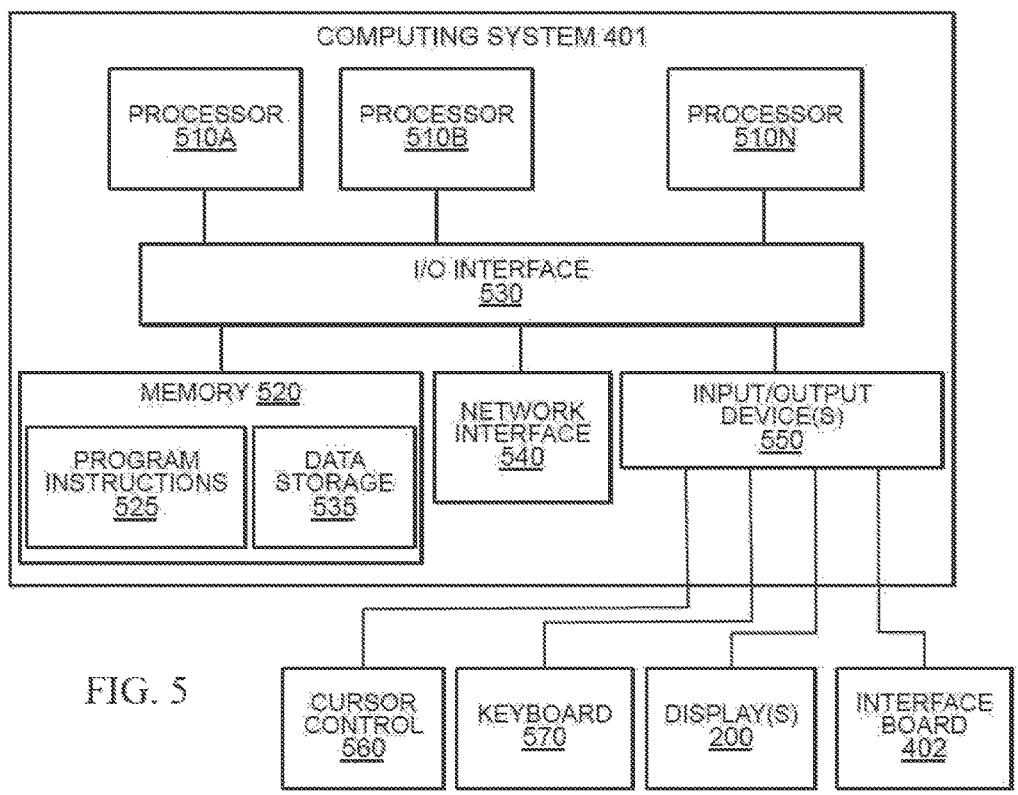
FIG. 5 is a block diagram of an example of a computing system or controller configured to implement aspects of a pinball machine with a hybrid playfield according to some embodiments.

FIG. 5 is a block diagram of an example of computing system 401 configured to implement aspects of pinball machine 100 with a hybrid playfield 104. In some embodiments, computing system 401 may be a server, a mainframe computer system, a workstation, a network computer, a desktop computer, a laptop, or the like. In other embodiments, one or more of the components described in connection with computing system 401 may be provided as a System-On-Chip (SoC), Application Specific Integrated Circuit (ASIC), or the like. More generally, however, computing system 401 may be any system, device, or circuitry capable of implementing or executing one or more of the various operations described herein.

In some implementations, computing system 401 may include one or more processors 510A-N coupled to a system memory 520 via an input/output (I/O) interface 530. Computing system 401 may further include a network interface 540 coupled to I/O interface 530, and one or more input/output devices 550, such as cursor control device 560, keyboard 570, electronic display 200, and interface board 402.

In various embodiments, computing system 401 may be a single-processor system including one processor 510A, or a multi-processor system including two or more processors 510A-N (e.g., two, four, eight, or another suitable number). Processor(s) 510A-N may be any processor capable of executing program instructions. For example, in various embodiments, processor(s) 510A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 510A-N may commonly, but not necessarily, implement the same ISA. Also, in some embodiments, at least one processor(s) 510A-N may be a graphics processing unit (GPU) or other dedicated graphics-rendering device.

System memory 520 may be configured to store program instructions and/or data accessible by processor(s) 510A-N. In various embodiments, system memory 520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described herein, may be stored within system memory 520 as program instructions 525 and data storage 535, respectively. In other embodiments, program instructions and/or data may be received, sent or stored upon different types of computer-accessible media or on similar media separate from system memory 520 or computing system 401. Generally speaking, a computer-accessible medium may include any tangible, non-transitory storage media or memory media such as magnetic or optical media—e.g., disk or CD/DVD-ROM coupled to computing system 401 via I/O interface 530.

The terms "tangible" and "non-transitory," are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor(s) 510A-N). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. In addition, in some embodiments some or all of the functionality of I/O interface 530, such as an interface to system memory 520, may be incorporated directly into processor(s) 510A-N.

Network interface 540 may be configured to allow data to be exchanged between computing system 401 and other devices attached to a network, such as other computer systems, or between nodes of computing system 401. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touch screens, scanning devices, voice or optical recognition devices, or any other devices suitable for entering or retrieving data by one or more computing system 401. Multiple input/output devices 550 may be present in computing system 401 or may be distributed on various nodes of computing system 401. In some embodiments, similar input/output devices may be separate from computing system 401 and may interact with one or more nodes of computing system 401 through a wired or wireless connection, such as over network interface 540.

As shown in FIG. 5, memory 520 may include program instructions 525, configured to implement certain embodiments described herein, and data storage 535, comprising various data accessible by program instructions 525. In an embodiment, program instructions 525 may include software elements of embodiments illustrated in FIG. 6. For example, program instructions 525 may be implemented in various embodiments using any desired programming language, scripting language, or combination of programming languages and/or scripting languages (e.g., C, C++, C#, JAVA®, JAVASCRIPT®, PERL®, etc.). Data storage 535 may include data that may be used in these embodiments. In other embodiments, other or different software elements and data may be included.

A person of ordinary skill in the art will appreciate that computing system 401 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other configurations.

Figure 6:
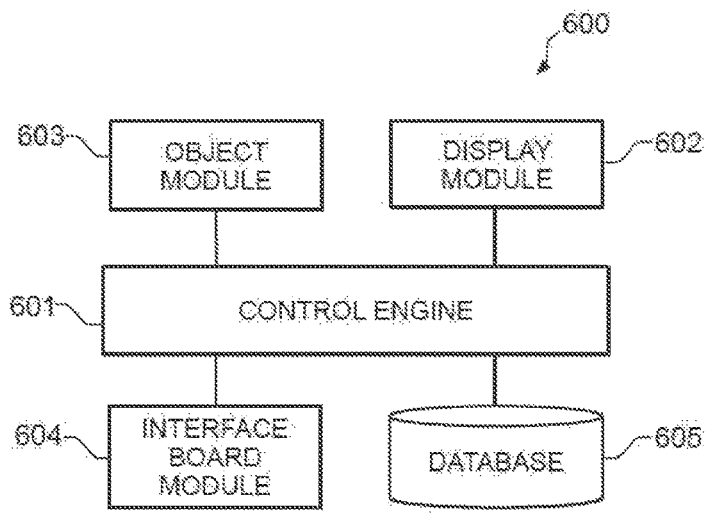
FIG. 6 is a block diagram of an example of a software program configured to implement aspects of a pinball machine with a hybrid playfield according to some embodiments.

FIG. 6 is a block diagram of an example of software program 600 configured to implement aspects of pinball machine 100 with a hybrid playfield 104. In some embodiments, software program 600 may be executed by computing system 401 described above. For example, in some cases, software program 600 may be implemented as program instructions 525 of FIG. 5. Generally speaking, control engine 601 may include one or more routines configured to implement one or more of the various techniques described herein. For instance, control engine 601 may include one or more routines configured to allow a user to select a game stored in database 605. Control engine 601 may also include one or more routines configured to allow a user to start or terminate a game, as well as one or more routines configured to manage progress of a game.

Display module 602 may provide a software interface between computing system 401 and electronic display 200 such that images produced by display module 602 are rendered in electronic display 200 under control of control engine 601. Interface board module 604 may provide a software interface between computing system 401 and interface board 402. Through interface board module 604, control engine 601 may determine that one or more sensor(s) 404 have been activated and/or it may control, via actuator(s) 403, a physical aspect of a physical object in hybrid playfield 104. Control engine 601 may also receive tracking information from tracking system 300 via interface board module 604.

Object module 603 may keep track of one or more graphical elements or virtual objects being displayed (or yet to be displayed) on electronic display 200 via display module 602, including, for example, a virtual object's characteristics such as the object's identification, boundaries, shape, color, size, texture, position (on electronic display 200), speed, direction of movement, etc. Object module 603 may also keep a record of the received tracking information for one or more physical objects including, for example, an identification of the physical object, its position (above electronic display 200), speed, direction of movement, shape, etc.

In some embodiments, the modules or blocks shown in FIG. 6 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined into fewer blocks. For example, in some cases, object module 603 may be combined with display module 602 and/or with interface board module 604. Conversely, any given one of control engine 601, display module 602, object module 603, interface board module 604, and database 605 may be implemented such that its operations are divided among two or more logical blocks. Although shown with a particular configuration, in other embodiments these various modules or blocks may be rearranged in other suitable ways.

FIG. 7 is a flowchart of an example of method 700 of operating tracking system 300 in hybrid playfield 104. In some embodiments, method 700 may be performed, at least in part, by computing system 401 executing software program 600 in cooperation with interface board 402 and tracking system 300. At block 701, method 700 may include determining that a pinball game has started or is about to start. At block 702, method 700 may include identifying a transducer configuration to be used by tracking system 300. As previously noted, different transducer configurations may be used in a single pinball machine 100, and, depending upon the specific game being played, a particular configuration may be more suitable for tracking certain physical objects.

At block 703, method 700 may include selecting a scanning pattern to be used during a tracking operation. For example, in the configuration shown in FIG. 3, the selected scanning pattern assigns detector elements 322, 324, 326, 328, and 330 to receive signals 318, 317, 314, 315, and 316 emitted by transmitter element 307, respectively. In some cases, a scanning pattern may be such that each of transmitter elements 301, 303, 305, 307, 309, 311, 313, 319, 321, 323, 325, 327, 329, and 331 is activated in rapid succession and in this order. In other cases, a transmitter element of first IR transducer array 300A may be activated followed by a transmitter element of second IR transducer array 300B in an alternating manner (e.g., 301, 319, 303, 321, and so on). In yet other cases, two or more transmitter elements may be activated simultaneously.

In some implementations, more or fewer detectors may be assigned to receive more or fewer signals from a given transmitter element at a given time. Moreover, the position of the transmitter element may dictate how many and which detector elements are assigned for a given scanning pattern. For instance, using the pattern illustrated in FIG. 3, when transmitter element 301 is active, only detector elements 320 and 322 (i.e., two detectors) may be configured to receive its signals. When transmitter element 303 is active, detector elements 320, 322, 324, and 326 (i.e., four detectors) may be configured to receive its signals. And, when transmitter element 305 is active, detector elements 320, 322, 324, 326, and 328 (i.e., five detectors) may be configured to receive its signals. In other implementations, however, a 1:1 relationship between transducer elements may be established such that a given detector is assigned to a single corresponding transmitter and vice-versa.

More generally, any suitable scanning pattern may be selected that creates a mesh such that, when a physical object such as pinball 202 is traveling between IR transducer arrays 300A and 300B therefore blocking the line-of-sight between a transmitter and an assigned detector, tracking system 300 and/or computing system 401 is capable of determining the position, speed, and/or direction of movement of the physical object. In various embodiments, signals are transmitted and received between IR transducer arrays 300A and 300B at angles other than a right angle.

At block 704, method 700 may execute scanning operation(s) using the identified configuration and/or selected pattern and, at block 705, method 700 may store results of those operation(s). At block 706, method 700 may determine whether the game has ended. If not, control returns to block 704. Otherwise, tracking may end at block 707.

It should be noted that, in some embodiments, one or more of the operations described above may be conducted independently of whether a game is in progress. For example, in some cases, tracking may be active for purposes of touchscreen interactions when pinball machine 100 is in "service mode" (e.g., testing, debugging, etc.). More generally, electronic display 200 in conjunction with tracking system 300 may allow an operator to interface with aspects of computing system 401 at any time, for instance, to change the machine's configuration, select a new pinball game, test one or more of the machine's components, etc.

FIG. 8 is a flowchart of an example of method 800 of obtaining an object's position in hybrid playfield 104 using tracking system 300 according to some embodiments. Again, in some embodiments, method 800 may be performed, at least in part, by computing system 401 executing software program 600 in cooperation with interface board 402 and tracking system 300. At block 801, method 800 may include initializing or setting an integer or counter n to a zero value and, at block 802, method 800 may include activating transmitter element n.

At block 803, method 800 may include determining whether there is a direct line-of-sight reception at all of the one or more assigned detector elements. If so, then block 806 increments the value of n and control returns to block 802, where a subsequent transmitter element following the selected scanning pattern is selected. Otherwise, at block 804, method 800 may include identifying which of the assigned detector elements had its light-of-sight blocked by a physical object. Then, at block 805, method 800 may include calculating the physical object's position based, at least in part, upon the result of block 804.

To illustrate blocks 802, 803, 804, 805, 806, consider the following example. Assume, hypothetically, that pinball 202 shown in FIG. 3 is now at a position such that it blocks the light-of-sight of detector element 330 when transmitter element 307 is activated. Because the relative position between IR transducer arrays 300A and 300B is known, it may be inferred that, at the time of the scan, pinball 202 was located somewhere along the path of signal 316. As n is incremented, subsequent transmitter elements are activated and other detectors may have their light-of-sight blocked, such that the position of pinball 202 may be determined to be at the intersection(s) of two or more of these signals.

In some embodiments, the frequency of the scanning operation may be such that a sufficient number of transmitters are activated in series to resolve the position of pinball 202 prior to pinball 202 having moved to another position that is significantly distant from the resolved position. For example, in some cases, the position of pinball 202 may be identified with a margin of error no larger than the diameter of pinball 202.

Computing system 401, interface board 402, and/or object module 603 may also maintain a historical record of the positions of pinball 202 at different times. Therefore, computing system 401 and/or interface board 402 may be configured to calculate a speed of pinball 202 and/or a direction of movement of pinball 202 based on that historical record. In some cases, computing system 401 and/or interface board 402 may be further configured to predict the position of pinball 202 at a future time based upon its present and/or past behavior.

Physical Objects Causing Changes in Virtual Objects

In some embodiments, hybrid playfield 104 may provide the illusion that one or more physical objects, such as one or more pinball 202, interact with one or more virtual objects, such as one or more images rendered on electronic display 200. This may take place, for example, when a physical object is detected via tracking system 300 to be moving over an area of hybrid playfield 104 containing the virtual objects. In other examples, the interaction with virtual objects may be triggered upon detection, via tracking system 300, that a physical object has a certain speed or moves in a particular direction (e.g., toward a virtual object) across hybrid playfield 104.

In some cases, interactions between a physical object and a first virtual object may cause that first virtual object to move, change its shape, disappear, etc. on electronic display 200. The same interactions between the physical object and the first virtual object may also cause a second virtual object to move, change its shape, appear, disappear, etc. on electronic display 200. Other game-related interactions resulting from the interaction of physical and virtual objects in hybrid playfield 104 may include, but are not limited to, game scores being adjusted, sound and video devices being played, lamps being turned on and off individually or in pre-defined sequences, etc.

Figure 9:
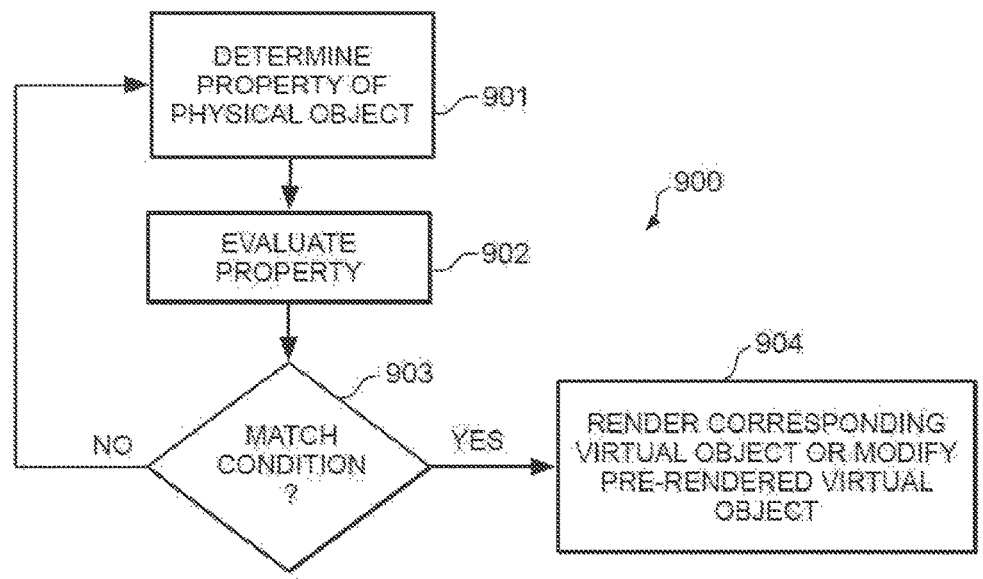
FIG. 9 is a flowchart of an example of a method of enabling physical object(s) to interact with virtual object(s) in a hybrid playfield according to some embodiments.

FIG. 9 is a flowchart of an example of a method of enabling physical object(s) to interact with virtual object(s) in hybrid playfield 104. In some embodiments, method 900 may be performed, at least in part, by computing system 401 executing software program 600 in cooperation with electronic display 200, interface board 402, and tracking system 300. At block 901, method 900 may include determining a property of a physical object (e.g., pinball 202). For instance, in some cases, method 900 may include determining a position of the physical object on hybrid playfield 104, a speed of the physical object over hybrid playfield 104, and/or a direction of movement of the physical object across hybrid playfield 104.

At block 902, method 900 may evaluate the property. At block 903, if the property does not match any preselected conditions, control returns to block 901. Otherwise, control passes to block 904, where method 900 may include rendering a corresponding virtual object on electronic display 200 or modifying a previously rendered virtual object. The conditions referred to in block 903 may include any programmable statement(s) that, when executed, give the appearance that the physical object's property or behavior has affected one or more virtual objects.

In some implementations, a player may indirectly manipulate the physical object described in block 901. For example, when the physical object is pinball 202, the player may briefly hit that object with another physical object, such as flippers 207A and 207B. Manipulation of flippers 207A and 207B may itself be indirect, for example, via side control(s) 107. After being hit, pinball 202 may travel along playfield freely and outside of the user's control.

It should be noted that determination of a property of a physical object in block 901 is different from the detection of a player's own finger or stylus on a capacitive touchscreen of a tablet computer, which the user directly controls. For example, in the tablet scenario, if the touchscreen does not respond as expected by the user, the user may simply repeat his or her gesture; whereas in the case of a pinball machine, because pinball 202 moves on its own, it would be much more difficult to make pinball 202 repeat the exact same trajectory at a later time and, in any event, a game opportunity would be lost.

Figures 10F, 10G, 10H:
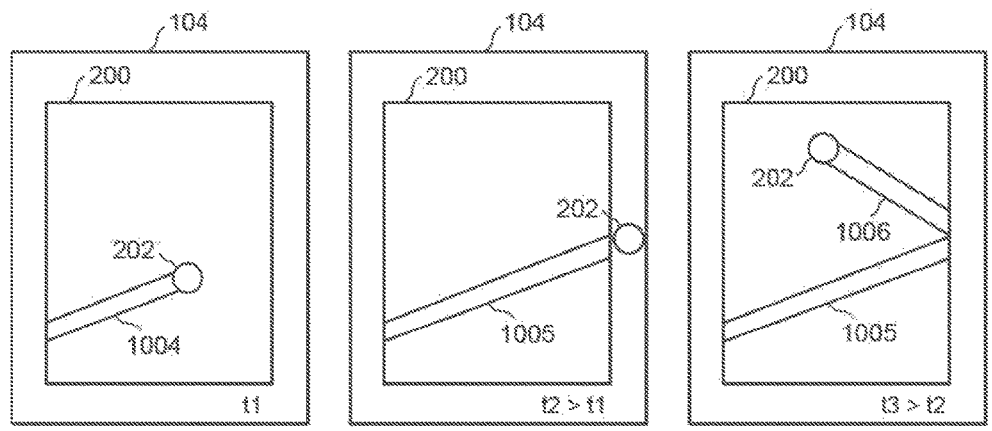

FIGS. 10A-H are diagrams illustrating examples of physical object(s) initiating interaction(s) with virtual object(s) according to some embodiments. Particularly, FIG. 10A shows pinball 202 (i.e., a physical object) at t=t1 traveling along hybrid playfield 104 while electronic display 200 renders virtual object 1000 in the shape of a triangle. At FIG. 10B, pinball 202 has moved closer to virtual object 1000 at t=t2 (t2>t1), but has not yet reached it. Then, at FIG. 10C, pinball 202 has reached the position of virtual object 1000 on electronic display 200 at t=t3 (t3>t2), thus causing virtual object 1000 to change into virtual object 1001, which now has a circular shape. Referring back to FIG. 9, the predetermined condition expressed in block 903 in this case may be such as:

if position of <pinball 202>position of <virtual object 1000>;
then change <virtual object 1000>into <virtual object 1001>

Thus, in this case, the operations of method 900 may help create a visual impression that pinball 202 has physically interacted with virtual object 1000 upon reaching its location in hybrid playfield 104 and effectively changed the virtual object's shape and/or other visual characteristic.

As another example, FIG. 10D illustrates pinball 202 traveling upwards (shown by an arrow pointing up) across hybrid playfield 104 at t=t1 (e.g., after being hit by flipper(s) 207A or 207B), thus acquiring a first speed. FIG. 10E shows pinball 202 traveling in a downwards direction (shown by an arrow pointing down) at t=t2 (t2>t1) with a second speed which, in this case, is smaller than the first speed. Accordingly, in FIG. 10D, virtual object 1002 represents a graphical image or visual animation of fire or smoke following pinball 202 and having a first size proportional to the first speed, whereas in FIG. 10E virtual object 1003 represents the fire or smoke with a second size proportional to the second speed, such that the first size is larger than the second size.

As yet another example, FIG. 10F shows pinball 202 traveling across hybrid playfield 104 at t=t1 in a first direction thus leaving trail or mark 1004. FIG. 10G shows pinball 202 leaving the surface of electronic display 200 and reaching the boundary of hybrid playfield 104 at t=t2 (t2>t1), from which pinball 202 bounces back. As such, trail or mark 1005 is longer than trail or mark 1004. Then, FIG. 10H shows pinball 202 traveling across hybrid playfield 104 in a second direction at t=t3 (t3>t2), thus creating trail or mark 1006 in the second direction.

It should be noted that the examples of FIGS. 10A-H are provided for sake of illustration. More generally, any virtual object(s) rendered on electronic display 200 may be affected by any physical property (or combination of physical properties) of any physical object(s) within hybrid playfield 104 in any suitable manner. In the examples above, the physical properties used are position, speed, and direction; although in other embodiments, other physical properties may be used such as shape, size, sound, color, etc. In various implementations, the type of virtual object and how that object is affected by the behavior of a physical object normally depends upon the specific game being played, and as such may vary from game to game.

Moreover, in some embodiments, the behavior of a physical object may be detected other than through tracking system 300. For instance, pinball 202 may physically reach trigger element 205, and electronic display 200 may in response render an animation such that it appears that a first virtual object such as an image of a laser beam or projectile is shot by trigger element 205 into hybrid playfield 104. The first virtual object may then interact with other virtual objects on electronic display 200; for example, the virtual laser beam or projectile may cause a second virtual object (e.g., an image of a building, etc.) to explode on electronic display 200.

Virtual Objects Causing Changes in Physical Objects

In some embodiments, hybrid playfield 104 may present the illusion that one or more virtual objects, such as one or more images rendered on electronic display 200, interact with one or more physical objects, for example, when the virtual object exhibits a predetermined behavior. For instance, when a virtual element is animated on electronic display 200 in a particular way, it may trigger a software-initiated modification to an aspect of a physical object.

Figure 11:
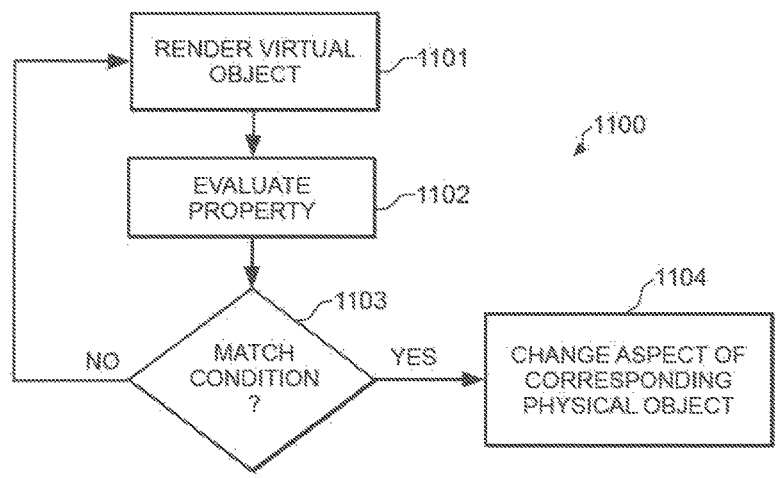
FIG. 11 is a flowchart of an example of a method of enabling virtual object(s) to interact with physical object(s) in a hybrid playfield according to some embodiments.

In that regard, FIG. 11 is a flowchart of an example of a method of enabling virtual object(s) to interact with physical object(s) in hybrid playfield 104. In some implementations, method 1100 may be performed, at least in part, by computing system 401 executing software program 600 in cooperation with electronic display 200, interface board 402, and tracking system 300. At block 1101, method 1100 may include rendering a virtual object on electronic display 200. At block 1102, method 1100 may include evaluating a property of the virtual object. At block 1103, if the property does not match a programmed condition, control returns to block 1101. Otherwise, at block 1104, method 1100 may include changing an aspect of a corresponding physical object.

FIGS. 12A-F are diagrams illustrating examples of virtual object(s) initiating interaction(s) with physical object(s) according to some embodiments. In FIG. 12A, virtual object 1201 is animated on electronic display 200 to move at t=t1 toward slingshot 206A, a physical object. FIG. 12B shows virtual object 1201 reaching threshold line 1200 at t=t2 (t2>t1), thus triggering a deformation of slingshot 206A such that, to an observer, it appears as if slingshot 206A is reacting physically to the behavior of virtual object 1201 on electronic display 200. The deformation of slingshot 206A is a physical response initiated by software because, in this case, virtual object 1201 is in a specific position relative to slingshot 206A. In an embodiment, the shape of slingshot 206A may be controlled by a solenoid mechanism that, when activated by software, pushes against a side of slingshot 206A, thus causing it to mechanically expand. Then, FIG. 12C shows slingshot 206A returning to its original shape at t=t3 (t3>t2), and electronic display 200 changes the shape of virtual object 1201 into virtual element 1202, which now travels away from slingshot 206A on electronic display 200 as if it had physically bounced off of slingshot 206A and now appears to be moving further away from slingshot 206A.

By drawing virtual element 1202 such that it appears to be moving away from slingshot 206A, this technique may cause an observer, such as the player, to believe that a virtual object 1201 (i.e., a graphical image) actually represents a physical object that interacted mechanically or physically with another (but actual) physical object (i.e., slingshot 206A). More specifically, it may appear as if virtual object 1201 actually collided with slingshot 206A, causing a solenoid mechanism to activate, in turn causing slingshot 206A to "push" virtual element 1202 away from it.

In other embodiments, a virtual element does not need to appear to come into contact with a physical object, but it may still affect the operation of that physical object. An example of this technique is shown in FIGS. 12D-E. In FIG. 12D, a first virtual object 1203 (a rendering of a missile) is animated to move toward a second virtual object 1204 (a rendering of a target) on electronic display 200 at t=t1. FIG. 12E shows that first virtual object 1203 and second virtual object 1204 have been replaced by third virtual object 1205 (a rendering of an explosion) upon the first virtual object 1203 reaching the second virtual object 1204 at t=t2 (t2>t1). At this moment, operation of flipper 207B (i.e., a physical object) may be changed such that, when a player activates side control(s) 107, only flipper 207A is capable of moving upwards while flipper 207B is stuck in a down position as a result of the collision between first virtual object 1203 and second virtual object 1204. In some cases, a fourth virtual object 1206 (e.g., a rendering of fire or smoke) may indicate that flipper 207B is not operational such that, when virtual object 1206 disappears of fades from electronic display 200, flipper 207B returns to its normal operation under control of the player.

In other words, when the first virtual object reaches a specific point on electronic display 200, it may cause a specific, predetermined reaction in a physical object, such as one or more flippers 207A and 207B. An example of such a reaction may be to cause the one or more of flippers 207A and 207B to flip, as if the missile pressed a "virtual flipper" button. Another reaction may be causing flippers 207A and 207B to "lose power," such that when the player next activates the flippers, they do not have as strong a pulse as they did prior to the missile reaching the specific location on electronic display 200. Because the length of the flipper pulse, and therefore the power of the pulse, is controlled by software, control engine 601 may effectively weaken flippers 207A and/or 207B in response to the first virtual object 1203 reaching the specific location on the electronic display 200. This technique may make it appear that the graphical, virtual object (i.e., first virtual object 1203) represented a physical element, such as a real missile, and was therefore capable of affecting physical object (i.e., flippers 207A and 207B).

Similarly as explained above, here it should also be noted that the examples of FIGS. 12A-F are provided for sake of illustration. More generally, any physical object(s) in hybrid playfield 104 may have its property(ies) modified in response to the behavior of one or more virtual object(s). Properties of the physical objects that may be subject to being changed include its shape, operation, color, sound, etc. Again, in various implementations, the type of physical object and how that object is affected by the behavior of a virtual object normally depends upon the specific game being played, and as such may vary from game to game.

Physical objects that can be affected by virtual objects include, but are not limited to, lamps, light emitting diodes (LEDs), magnets, motors, and solenoid assemblies, all of which may be found on pinball machine 100. Virtual objects that may interact with physical objects include, but are not limited to, shapes or combination of shapes drawn on a display element, projected from a projection device, or otherwise displayed in a way that they appear to be part of or on pinball machine 100. The location of virtual objects can be anywhere on pinball machine 100, oftentimes, but not always, close to the physical objects with which they appear to interact. In the example above where the missile is described to press a virtual flipper button, the spatial proximity of the missile and virtual button relative to the flippers is not relevant. As such, the graphical elements (missile and virtual button) can be located anywhere on electronic display 200.

Multiple-Game Pinball Machine

In some embodiments, a pinball machine 100 such as described in FIG. 1 may be configured to load, store, and/or run multiple software applications. A software application may, upon execution, present a player with a full gaming experience on pinball machine 100. Such a gaming experience is commonly referred to as a "pinball game" or simply "game." Each game may include program instructions and/or logic that causes it to: start running at a player's request, launch one or more balls into play, and enable the player's interaction with the ball (e.g., by allowing the player to control the flippers, and present play objectives to the players). Play objectives may include goals that the player may attempt to achieve during the course of gameplay, including, but not limited to, hitting specific targets or shots, sometimes in specific sequences.

Each game may have a defined beginning and end. The beginning of a game usually includes the resetting of specific game objects and objectives and launching a ball into play. The ball may be launched into play either automatically when the game begins, or in response to an action by the player, such as the pressing of a button. The end of a game may include the conclusion of a set of gameplay objectives. This conclusion may occur either when the player successfully achieves the objectives or when the player's last ball goes out of play, either by draining or by some other event on the pinball machine. The end of a game may also include information presented to the player about the accomplishments that were achieved during gameplay and/or about other information indicating the game has ended. In some cases, the information may be presented as audio and/or video and/or even as tactile feedback provided through mechanisms on the machine.

As previously noted, pinball machine 100 may comprise computing system 401, which in turn includes static or dynamic computer memory, typically a non-volatile flash-based device or a computer hard drive, onto which multiple software applications may be loaded and/or stored. Generally speaking, there is no limit to the number of software applications that may be loaded and/or stored other than those imposed by the physical size of the storage devices used for software application storage.

In another embodiment, pinball machine 100 may be capable of connecting to a computer network over which software applications may be loaded, stored, and/or played. Therefore, software applications available on the network, whether on a remote software application server or on another pinball machine on the network, may be loaded and stored so that they can be played immediately or at some time in the future, whether or not the pinball machine remains connected to the network. Alternatively, a software application may be run directly from the network, whereby the software application is not stored locally but rather loaded and run while the pinball machine stays connected to the network. In this case, the software application may not be stored on the pinball machine and therefore would be unavailable when the machine is not connected to the network.

In yet another embodiment, the pinball machine may be capable of running a game directly from locally attached media, such as a CD or DVD. In this embodiment, a user can load one media device, such as a CD or DVD, to play one software application and later load another media device, such as another CD or a DVD, to play another software application. Alternatively, one media element, such as a CD or DVD, may contain multiple software applications from which the player can choose which one to load and play.

Pinball machine 100 may also include a software Operating System (OS) that presents the user with a way to select the desired software application. In an embodiment, the operating system, which is a layer of software that is running when no software application is active and oftentimes even while a software application is active, shows a set of choices on a display (e.g., electronic display 200). Each choice may include a menu of additional choices or the name of available software applications. The OS may provide the user with a suitable way of navigating through the choices, oftentimes via button presses, and selecting desired items, such as additional menus to be navigated or the software application to be executed. The OS may therefore provide a way for the user to select a software application to play.

As described before, a list of software applications may include software applications already stored locally on the machine and/or software applications that are available from remote devices accessible via a computer network to which the pinball machine is connected and/or software applications stored on media devices, such as CDs, DVDs, or any other type of media capable of storing one or more software applications.

The OS may also provide ways of loading and storing additional software applications. In an embodiment, the OS may provide a set of options the user can select via buttons. One such option may be to load a list of available software applications from the network. The OS may then allow a user to select one or more of the available software applications, and the OS may load the desired software applications from the network and store them locally. In another embodiment, the OS may provide one or more mechanisms to load additional software applications from locally attached media, such as a CD or DVD, or from some other locally attached device, such as a computer or storage device attached through USB, BLUETOOTH, or some other communications interface.

Embodiments of pinball machine 100, as described above, may present the user with a list of software applications. The presentation of the list may take many forms, including but not limited to menus, folders, a single long list, and/or graphical icons or screens. The user may select and play the same software application every time he wants to play a game, or he can select and play a different software application each time.

In multi-player games, whereby software tracks the gameplay of multiple players simultaneously or sequentially, each player may optionally choose the same software application as those chosen by other players or a completely different software application. In this manner, multiple players may play different software applications at the same time on the same machine. In some embodiments this may involve each player taking turns playing until one specific portion of their game ends, such as a ball draining, while in other embodiments, players may be physically interacting with the machine and playing their chosen software applications simultaneously.

When including one or more of the elements described above, pinball machine 100 may be considered to be a pinball platform, whereby the platform is capable of loading and/or storing and/or executing many different software applications. The software applications may all be related to a specific theme or subject matter, or they may each be completely different and unique. Because the number of software applications the pinball machine stores and/or executes may continue to grow over time, it is significantly less likely, as compared to a traditional pinball machine that presents just one or two different software applications to a player, to become boring to the player.

Figure 13:
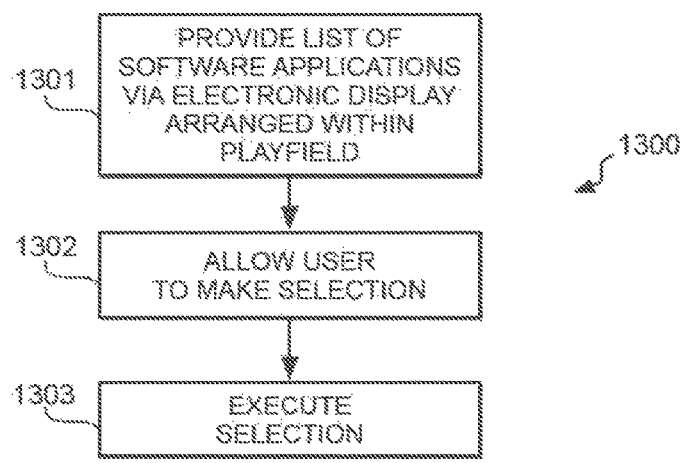
FIG. 13 is a flowchart of an example of a method of providing one or more software applications in a pinball machine according to some embodiments.

FIG. 13 is a flowchart of an example of method 1300 of providing one or more software applications in pinball machine 100 according to some embodiments. At block 1301, method 1300 includes providing a list of software applications (e.g., pinball games) via a display or screen (e.g., electronic display 200) arranged within a playfield (e.g., hybrid playfield 104). At block 1302, method 1300 may include allowing a player or user to make a software selection (e.g., using side control(s) 107). Then, at block 1303, method 1300 may include executing the software selection (e.g., starting a selected game).

Playfield Reducer

In some embodiments, pinball machine 100 such as described in FIG. 1 may include a playfield reducer. A playfield reducer is a mechanism configured to reduce the effective size of a playfield by creating an effective barrier that blocks, from one edge of the playfield to an opposite edge, an entire portion of the playfield. In some implementations, a playfield reducer may naturally rest in an unblocking configuration such that, when activated, it blocks a first playfield portion from a second playfield portion. In other implementations, a playfield reducer may naturally rest in a blocking configuration such that, when activated, it connects a first playfield portion from a second playfield portion.

Generally speaking, a playfield reducer is said to "block" a first playfield portion from a second playfield portion when a pinball cannot travel freely between the two portions during a game. In some cases, even when the pinball can travel between the two portions, the playfield reducer prevents the pinball from interacting with other pinball components positioned behind the playfield reducer itself. For example, if the playfield reducer is a barrier located in the second playfield portion, although a pinball can enter the second playfield portion prior to hitting the barrier, the barrier then blocks the pinball from interacting with other elements of the second playfield portion (i.e., objects positioned behind the barrier).

Figures 14A, 14B:
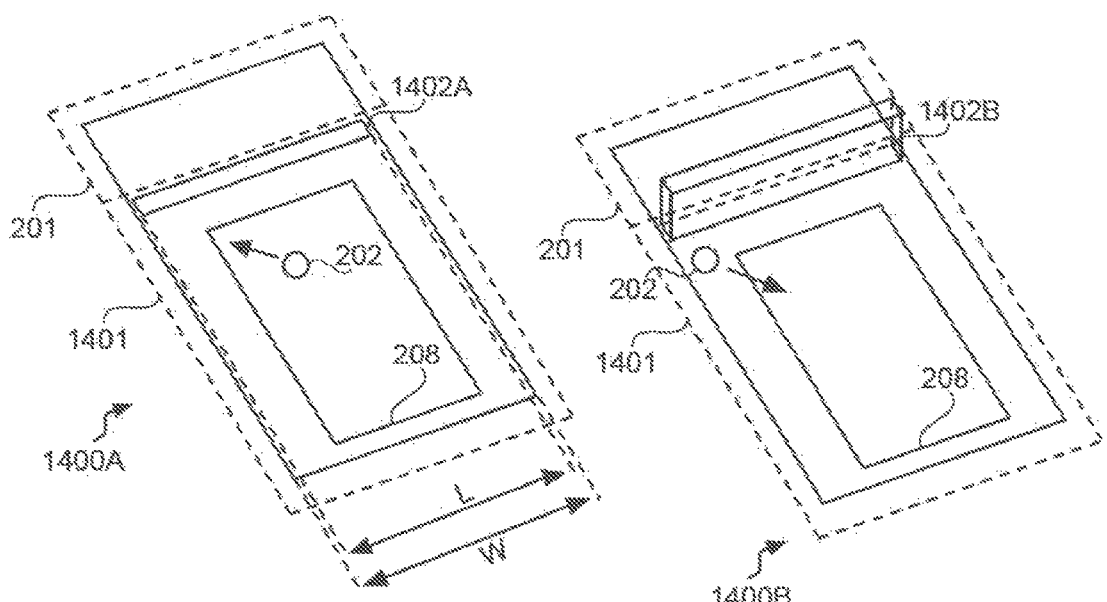
FIGS. 14A and 14B are diagrams illustrating an example of a playfield reducer configured as a barrier element according to some embodiments.

FIG. 14A is a diagram of an example of a playfield reducer configured as a barrier according to some embodiments. As illustrated, playfield 1400A includes main playfield portion 1401 and modular portion 201. (Modular portions are discussed in more detail below.) Main playfield portion 1401 includes playfield reducer 1402, which in this instance is in a natural position "A" such that its top surface is aligned with the surface of playfield 1400A, and therefore does not interfere with the movement of pinball 202. In this configuration, pinball 202 is free to travel between main playfield portion 1401 and modular portion 201 during a pinball game—for example, when hit by flippers 207A and 207B—without regard for playfield reducer 1402A.

In FIG. 14B, playfield reducer 1402 has been activated and assumes a "B" configuration; that is, its top surface is above the surface of playfield 1400B and therefore impedes pinball 202 from traveling from main playfield portion 1401 to modular portion 201. In this example, the width (W) of main playfield portion 1401 is longer than the length (L) of playfield reducer 1402. Consequently, playfield reducer 1402 does not reach the opposite, outermost lateral edges of playfield 1400B. However, assuming that the diameter of pinball 202 is given by D, so long as (W−L)/2>D, then playfield reducer 1402 is still capable of effectively stopping pinball 202 from crossing over between main playfield portion 1401 and modular portion 201.

Here it should be noted that traditional barriers have been designed to block only a small portion of a playfield, and therefore do not extend from one outermost edge of the playfield to the other. In contrast, a playfield reducer, as described herein, is configured to ensure that pinball 202 cannot move beyond playfield reducer 1402 at any point between the two lateral edges of the playfield. Moreover, in the foregoing example, main playfield portion 1401 may be similar to hybrid playfield 104 described above, and may include electronic display 200. Accordingly, even when playfield reducer 1402 is activated, a game or portion thereof may still be played using only main playfield portion 1401, for example, by allowing physical objects (e.g., pinball 202) to interact with virtual objects rendered upon electronic display 200 and vice-versa.

In some embodiments, a playfield reducer may be located in main playfield portion 1401, in modular portion 201, or both. Also, a playfield reducer may include mixed elements or mechanisms. For example, returning to FIG. 14A, playfield reducer 1402A may be physically divided into distinct components (e.g., smaller walls disposed side-by-side), and each distinct component may be activated together to raise a barrier in FIG. 14B. Additionally or alternatively, the playfield reducer may include different types of components. For example, a wall or barrier portion may cause pinball 202 to bounce back into main playfield portion 1401, whereas a hole portion may capture pinball 202 and return it via a ramp, shoot, or any other suitable return path.

Figure 15A:
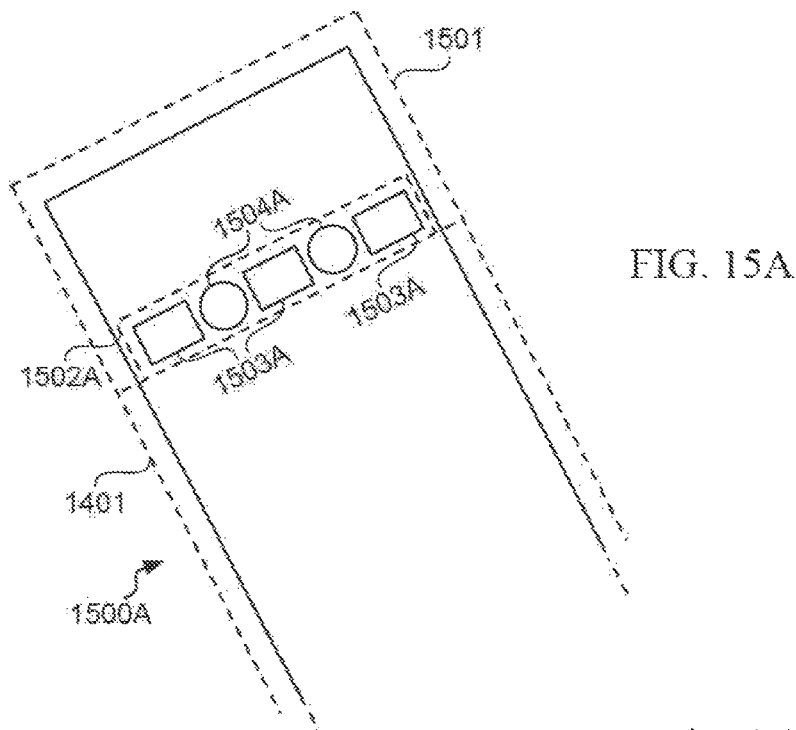
FIGS. 15A and 15B are diagrams illustrating an example of a mixed-element playfield reducer according to some embodiments.

FIG. 15A is a diagram of an example of a mixed-element playfield reducer according to some embodiments. As illustrated, playfield 1500A includes main playfield portion 1401 and modular portion 1501. Modular portion 1501 includes playfield reducer 1502, which is in a natural position "A" such that its top surface is aligned with the surface of hybrid playfield 104, and therefore does not interfere with a pinball (not shown). In this configuration, a pinball would be free to travel between main playfield portion 1401 and modular portion 1501 during a pinball game.

In contrast with the embodiment shown in FIGS. 14A and 14B, here playfield reducer 1502 includes mixed reducer elements including targets 1503A and holes 1504A. In particular, targets 1503A are interspersed by holes 1504A. In order for a pinball to be able to cross over playfield reducer 1502, targets 1503A are lowered into playfield 1500A, and holes 1504A are covered.

Figure 15B:
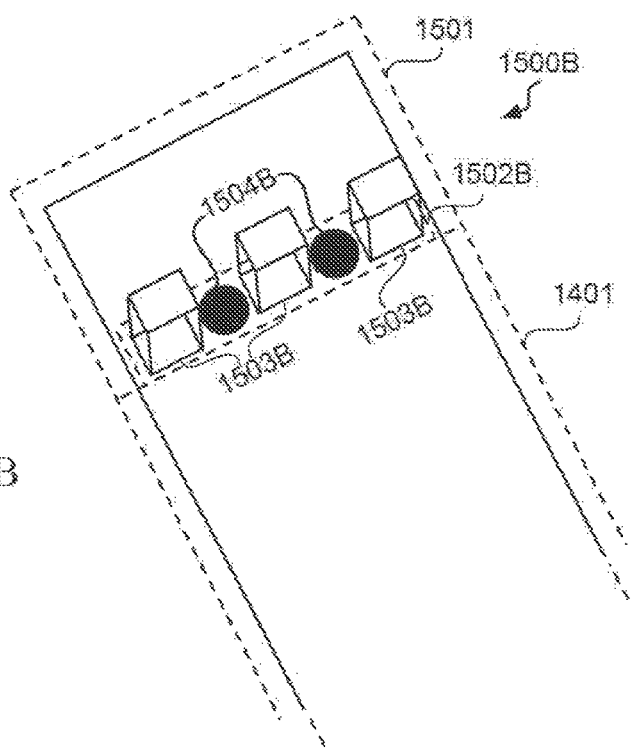

As shown in FIG. 15B, playfield reducer 1502 has been activated. Accordingly, targets 1503B are raised above the surface of playfield 1500A, and holes 1504B are uncovered. For example, in some implementations, one or more lids may be configured to slide in a direction parallel to hybrid playfield 104, thus opening holes 1504B such that a pinball traveling toward holes 1504B is trapped within them; and in some cases redirected to another area of hybrid playfield 104. In other implementations, one or more lids may open with a flapping movement; the lid itself creating an additional barrier such that a pinball, upon hitting the lid, falls into holes 1504B. In yet other implementations, the lid can open in a downward direction.

In some embodiments, the various components of playfield reducer 1502 may be arranged non-linearly, and can be configured in any way that keeps an object from reaching any position, from a first playfield edge to a second playfield edge, beyond at least one specific point of playfield reducer 1502. Additionally or alternatively, one or more components may be arranged in a main playfield portion, and one or more other components may be arranged in a modular portion.

Figure 16:
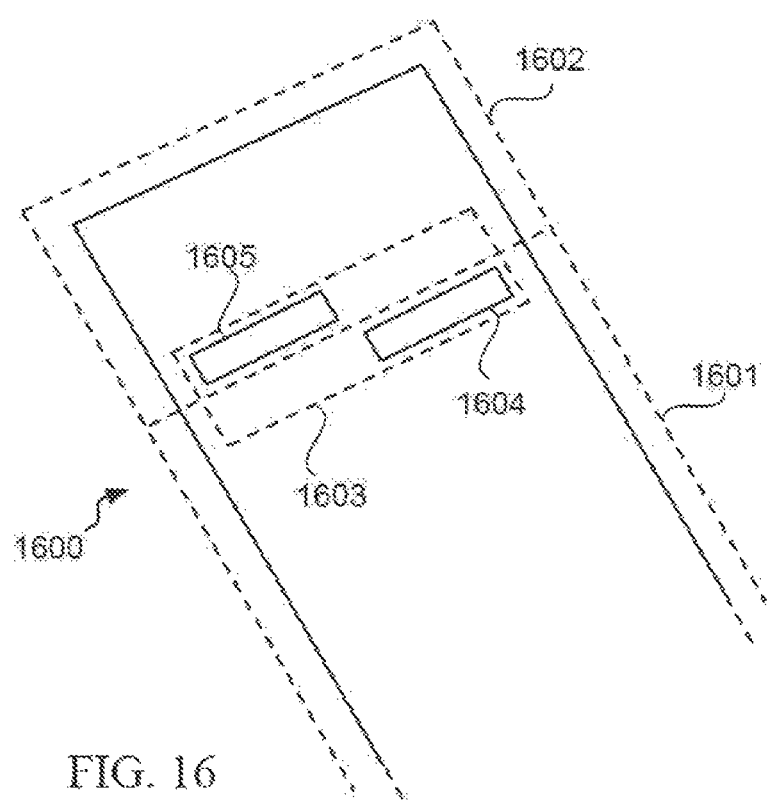
FIG. 16 is a diagram illustrating an example of a split playfield reducer according to some embodiments.

In that regard, FIG. 16 shows an example of a split playfield reducer according to some embodiments. As illustrated, playfield reducer 1603 divides playfield 1600 into a first playfield portion 1601 and a second playfield portion 1602. A first part 1604 of playfield reducer 1603 is disposed in first playfield portion 1601 and a second part 1605 of playfield reducer 1603 is disposed in second playfield portion 1602. Moreover, the first playfield portion 1601 and second playfield portion 1602 may be capable of being decoupled from each other. In some embodiments, activation and deactivation of the entire playfield reducer 1603 may be coordinated such that it happens synchronously during a pinball game.

Figure 17:
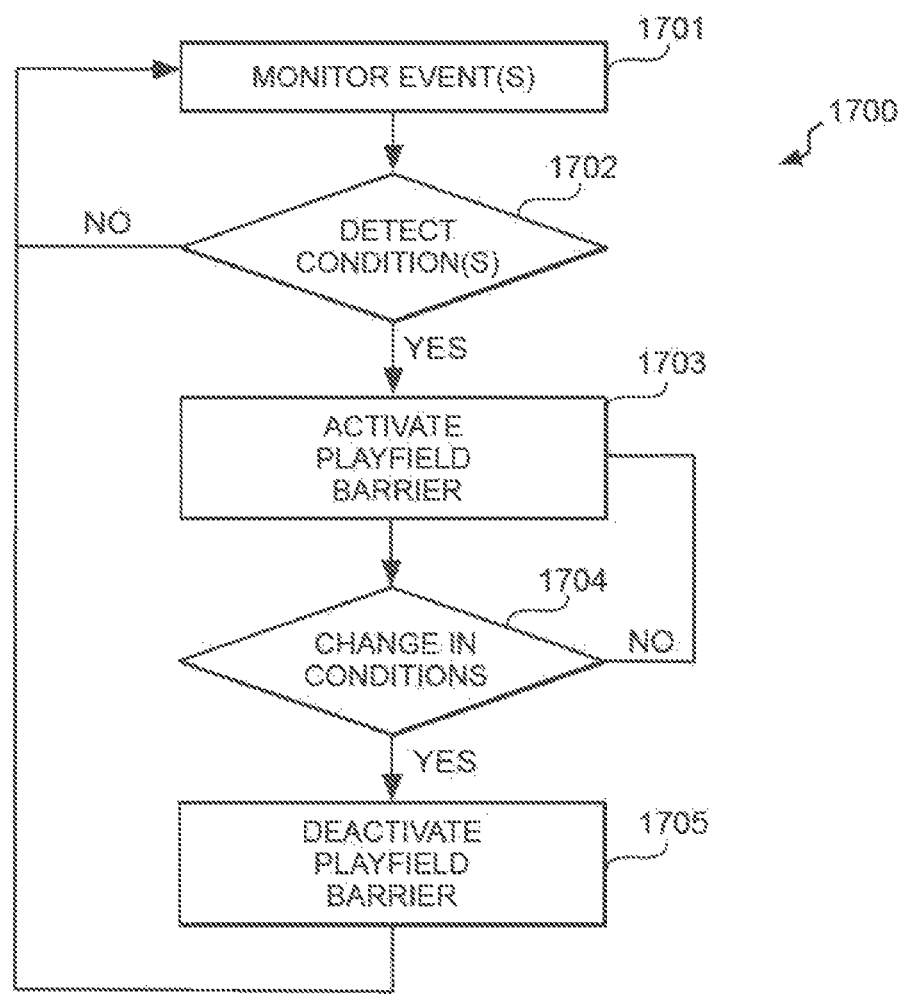
FIG. 17 is a flowchart of an example of a method of operating a playfield reducer according to some embodiments.

FIG. 17 is a flowchart of an example of a method of operating a playfield reducer. In some embodiments, method 1700 may be performed, at least in part, by computing system 401 executing software program 600 in cooperation with electronic display 200, interface board 402, and tracking system 300. At block 1701, method 1700 may include monitoring or attempting detection of one or more events. In some cases, the event may be a software-based event that takes place during a pinball game, such as the reaching of a predetermined score, the failing to reach the predetermined score, the reaching of a predetermined game stage, the passage of a predetermined amount of time, and/or user selection. In other cases, the event may be a physical event that takes place, for example, when a physical object (e.g., pinball, flipper, slingshot, kicker, bumper, target, plunger, hole, saucer, spinner, gate, switch, stopper, ramp, magnet, etc.) assumes one or more physical properties (e.g., position, speed, direction, etc.).

At block 1702, method 1700 may include evaluating whether one or more event conditions are met. For example, a game rule may be such that, if a player has reached a given score, a playfield reducer is activated. Additionally or alternatively, a rule may provide that upon a pinball hitting a particular target, the playfield reducer is activated. If the conditions are not met, control returns to block 1701. Otherwise, at block 1703, method 1700 includes activating a playfield reducer.

In some cases, activating the playfield reducer may include raising one or more barrier elements located in a main playfield portion and/or in a modular portion of the playfield. Additionally or alternatively, activating the playfield reducer may include opening in one or more hole elements located in a main playfield portion and/or in a modular portion of the playfield.

At block 1704, method 1700 may include evaluating whether there has been a change in conditions. For example, a software timer may have expired, the player may have scored a predetermined number of points, and/or the pinball may have again hit the same (or another) target. If not, control returns to block 1703. Otherwise, at block 1705, method 1700 includes deactivating the playfield barrier. In some cases, deactivating the playfield reducer may include lowering barrier element(s) and/or closing hole element(s).

In the previous example, it is assumed that a playfield reducer, when in its natural or resting state, allows a pinball to travel between different playfield portions. As previously noted, however, in some cases a playfield reducer may be configured to block a pinball from travelling between different playfield portions in its resting or natural state. In those cases, activating the playfield reducer includes unblocking the pinball to that it has access to the different playfield portions.

Although the examples herein discuss the use of barriers or targets and holes and reducer elements, it should be noted that different types of reducer elements may be used, and that those elements may be used in any suitable configuration. For example, in cases where a pinball is made of a metallic material, a playfield reducer may include a magnet or electromagnet configured to "catch" the pinball when activated and "release" the pinball when deactivated (or vice versa).

In sum, the various playfield reducers described here may be configured to restrict the movement of one or more objects, at specific times during the play of a game, from traveling beyond a barrier. This effectively creates a smaller size playfield, to which the movement of the object(s) is confined. In some cases, such playfield reducers may be used for challenging a player's reaction times by reducing the distance an object can travel, creating a smaller region in which an object can interact with other mechanisms or objects on the playfield, etc.

Modular Playfields

Traditionally, pinball machines have used a monolithic playfield. In those machines there is one main playfield, sometimes subdivided into one or more smaller areas, but nonetheless lacking interchangeable or swappable playfield modules. The playfield is commonly made from a large sheet of plywood, typically Baltic birch or some other hardwood, though the material that comprises the playfield can be anything on which a pinball can roll or to which other components (e.g., targets, barriers, switches, lights, ramps, etc.) may be attached. Such playfields may have a multitude of holes down through which one or more pinballs can fall, or up through which one or more pinballs may be propelled. The types and varieties of components attached to playfields are numerous and combine to define a layout that determines how one or more balls will move on the machine and provides visual, audio, and/or tactile feedback to a person playing the machine.

In various embodiments described herein, pinball machine 100 of FIG. 1 may be adapted to receive any of a plurality of different interchangeable, swappable, and/or (re)configurable modular playfield portions. For example, modular portion 201 of FIG. 2 may be one of a plurality of different playfield modules that may be adapted to deploy one or more pinball 202 onto a playfield and/or to return a pinball to the playfield during a game. In some implementations, modular portion 201 may include barrier element(s) 203, pipe element(s) 204, loops, guides, holes, traps, playfield reducers, or any other pinball component or combinations thereof.

In some implementations, an interchangeable or swappable playfield module may enable a user to organize and/or rearrange playfield modules that are coupled together or to a main playfield portion of a pinball machine. Once coupled to one another, the various playfield modules may provide an entire or combined playfield whereupon a pinball game may be played. In order to modify a game or implement an entirely new game in otherwise the same pinball machine, one or more playfield modules may be removed and replaced with a different playfield module.

In other implementations, a configurable playfield module portion may enable a user to reconfigure that very module by modifying the position, number, and/or type of pinball components coupled thereto. In other words, in a configurable playfield module, pinball components not restricted to a single location and/or whose entities can be replaced by differently shaped pinball components or by pinball components that provide a different operation than the components being replaced. After each reconfiguration, a configurable playfield module may provide a different set of interactions with one or more pinballs and/or with a person playing the machine.

An advantage of a swappable playfield module over a configurable playfield module becomes apparent when there are numerous pinball components attached to the module or when one or more of the pinball components is significantly complex such that it makes it impractical to replace or move the components themselves. In either scenario, moving or replacing any or all of the pinball components may be tedious or impractical, but an entire playfield module may be more easily replaced by another, swappable playfield module.

In yet other implementations, a single pinball machine may be configured to receive interchangeable or swappable modular playfield portions, and one or more of those modular playfield portions may be also have reconfigurable pinball components. As such, various systems and methods described herein may allow for a virtually limitless number of combinations and games to be implemented on a same pinball machine, thus reducing the financial costs that would otherwise be associated with buying entirely new pinball machines every time a new game is desired.

Figure 18:
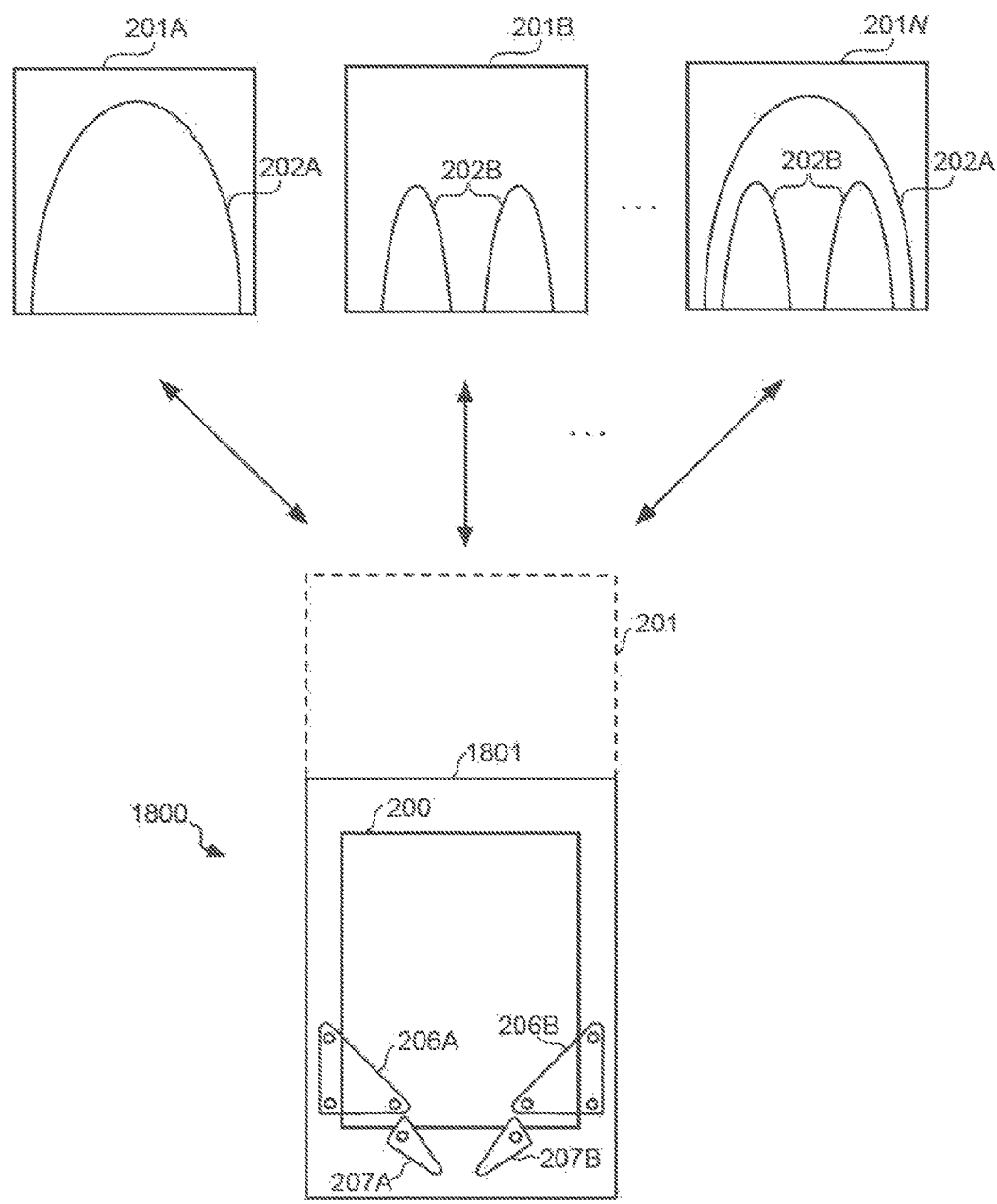
FIG. 18 is a diagram illustrating interchangeable or swappable playfield modules according to some embodiments.

Turning now to FIG. 18, a diagram illustrating interchangeable or swappable playfield modules is depicted. As shown, pinball machine 1800 includes main playfield portion 1801 having electronic display 200, slingshots 206A and 206B, and flippers 207A and 207B. It should be noted, however, that these components of main playfield portion 1801 are shown only by way of example, that that in other implementations other components may be used.

Modular portion 201 may be any of swappable playfield modules 201A-N. To illustrate the distinctions between swappable playfield modules 201A-N, it is noted that module 201A includes large ball guide 202A, module 201B includes two small ball guides 202B, and module 201N includes both large ball guide 202A and small ball guides 202B. More generally, however, each of swappable playfield modules 201A-N may have any suitable combination of pinball components, and may each have a very distinct appearance from one another, whether decoratively or functionally. For example, module 201A may have a cartoon theme corresponding to a children's game, module 201B may have a sci-fi theme for an adult game, and so on.

Main playfield portion 1801 may have or otherwise be coupled to a set of hardware elements 400 shown in FIGS. 4 and 5. In some embodiments, each of swappable playfield modules 201A-N may also have or otherwise be coupled to one or more of hardware elements 400. For example, in some cases, a swappable playfield module may include its own interface board 402, actuator(s) 403, and/or sensor(s) 404. The hardware components of a swappable playfield module (e.g., an interface board) may enable a main playfield module's computing system 401 to control one or more pinball components disposed on the swappable playfield module.

For ease of explanation, hardware elements 400 that are directly coupled to main playfield portion 1801 are referred to as "primary" or "master" components. Additional hardware elements 400 that are directly coupled to a swappable playfield module are referred to as "secondary" or "slave" components. In some cases, a secondary interface board (of a swappable playfield module) and a primary interface board (of a main playfield portion) may be both coupled to the same computing system 401. In that case, a single computing system 401 may be capable of controlling elements and detecting events taking place over the entire playfield of a pinball machine.

In some embodiments, in order to couple a swappable playfield module to a main playfield module (or to another swappable playfield module), each module's respective interface board 402 may be communicatively and/or electronically coupled together via an electrical harness, wireless connection, etc. Further, when each module has its own interface board 402, those various boards may be connected in series or in parallel to I/O device 550 and/or network interface 540 of computing system 401.

Figure 19:
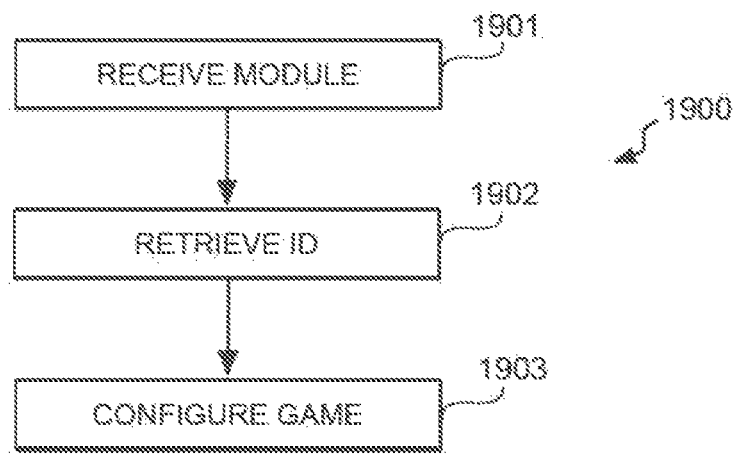
FIG. 19 is a flowchart of an example of a method of using interchangeable or swappable playfield modules according to some embodiments.

FIG. 19 is a flowchart of an example of a method of using interchangeable or swappable playfield modules according to some embodiments. In this example, at block 1901, method 1900 includes receiving a swappable playfield module. For instance, a user may mechanically couple one of a plurality of possible swappable playfield modules 201A-N to a main playfield portion of a pinball machine. The mechanical coupling may be performed via fasteners, supporting mechanisms, or any other suitable way. In addition, one or more secondary hardware components may be communicatively and/or electronically coupled or paired to one or more primary hardware components (e.g., computing system 401). Once coupled together, the swappable playfield module and main playfield portion may appear and operate as single pinball playfield.

At block 1901, method 1900 may include receiving or retrieving an identification from the swappable playfield module. For example, once coupled to each other and powered on, a secondary interface board 402 may transmit, either automatically or upon request, a serial or model number or code to primary computing system 401.

At block 1903, method 1900 may include configuring the pinball machine and/or a game in a manner that utilizes the pinball components of the swappable playfield module. For example, primary computing system 401 may look up configuration data in a game database (e.g., stored in optical or flash memory) or server (e.g., over the Internet), and use that configuration data to control elements and/or detect events taking place at the swappable playfield module of the playfield during a pinball game. Examples of configuration data include, but are not limited to, the number, type, and position of pinball components within the swappable playfield module, as well as rules for operating those components (e.g., when to trap or return a pinball, when to perform a lighting operation, etc.). In this manner, the game software running on the pinball machine can dynamically adjust the game rules depending on which playfield modules are being used at any given time.

In some cases, each swappable playfield module may be associated with its own pinball game such that, upon having its identity recognized by primary computing system 401, primary computing system 401 is capable of either loading a locally stored game or downloading that game from an online game store or repository. In some implementations, at least a portion of the game may be playable and/or visualized through electronic display 200 of the main playfield portion.

In alternative embodiments, at least a portion of the aforementioned configuration data, operating rules, and/or pinball game may be stored in a hardware component that is part of the swappable playfield module. As such, rather than performing the operations of FIG. 19, a primary computing system 401 may obtain some or all of the information necessary to control the swappable playfield module directly from that module itself. In other alternative embodiments, a swappable playfield module may include a secondary computing system and at least some of the control or detection operations taking place with respect to pinball components of the swappable playfield module are performed in parallel with other processing performed by a primary computing system of the main playfield portion.

Figure 20:
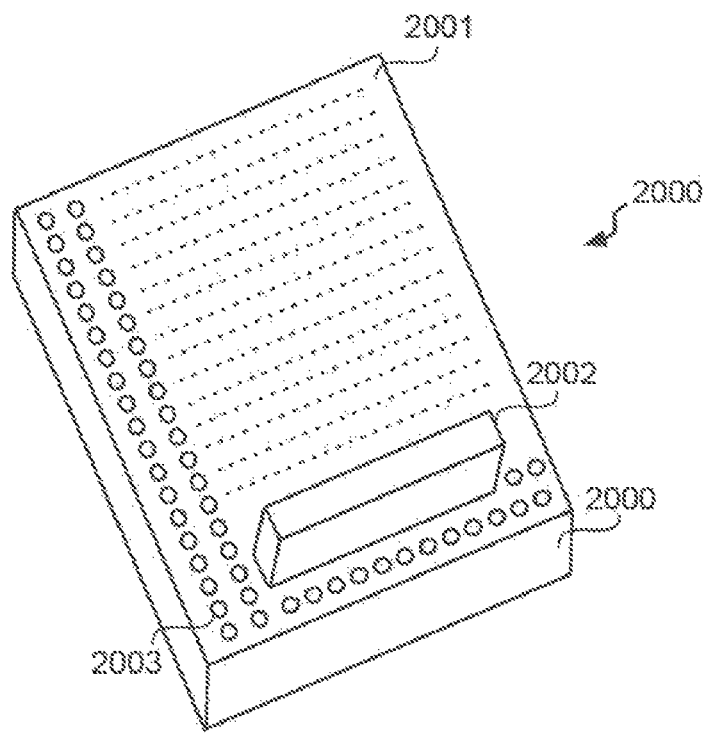
FIG. 20 is a three-dimensional, auxiliary view of an example of a configurable playfield module according to some embodiments.

As noted above, in some embodiments, a playfield module (whether or not interchangeable or swappable) may also be configurable. To illustrate this implementation, FIG. 20 shows a three-dimensional, auxiliary view of an example of a configurable playfield module.

Particularly, configurable playfield module 2000 has a surface 2001 to which one or more pinball components, in this case barrier 2002, may be coupled or mounted. It should be emphasized, however, that any number and/or type of pinball components may be used in other implementations. In some cases, surface 2001 may remain fixed and unchanged, but barrier 2002 may be moved and/or replaced by other elements, thereby providing a different set of interactions with one or more pinballs and/or with a person playing the machine.

To allow barrier 2002 to be coupled to surface 2001, surface 2001 may include a matrix of screw-holes 2003 into which barrier 2002 can be secured. In other embodiments, however, any pinball component may be attached to configurable playfield module 2000 by magnets, double-sided tape, or any number of other mechanisms that can hold a pinball component in any specific position at any given time.

An advantage of configurable playfield module 2000 versus a traditional non-modular playfield is that the overall look of the playfield can be changed, as can the entities that interact with one or more pinballs and/or the player playing the game. In some cases, this may result in a game that can present a variety of layouts and features, thereby making a same pinball machine capable of presenting many different sets and styles of interactions.

In some embodiments, in order to facilitate configuration of a pinball machine employing a configurable playfield module, a computer software program may be provided. Such a program may be executed, for example, by computing system 401 of pinball machine 100 using electronic display 200 as its display interface. In other embodiments, a personal computing system (e.g., desktop computer, laptop, tablet, smart phone, etc.) may be used to execute the configuration software, and any resulting configuration data or file may be then transferred to computing system 401 of pinball machine 100.

Figure 21:
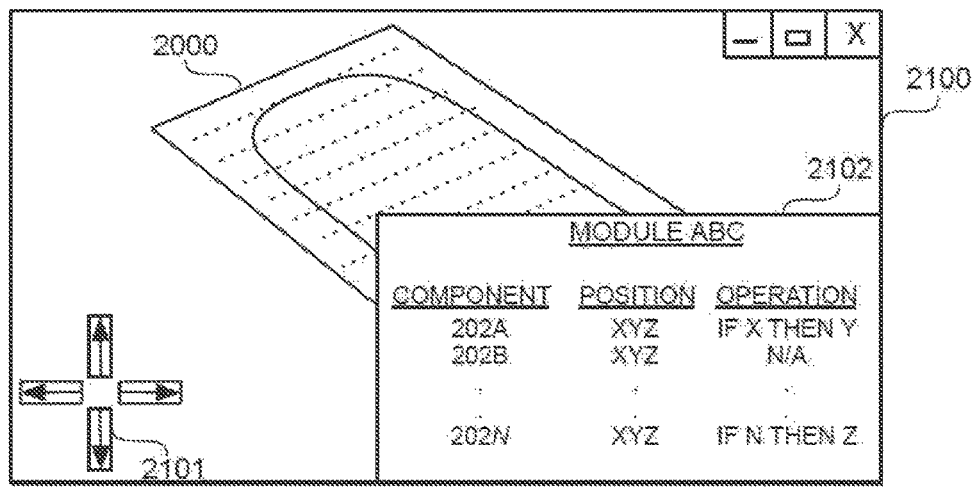
FIG. 21 is a simulated screenshot of an example of a playfield configuration program according to some embodiments.
Figure 22:
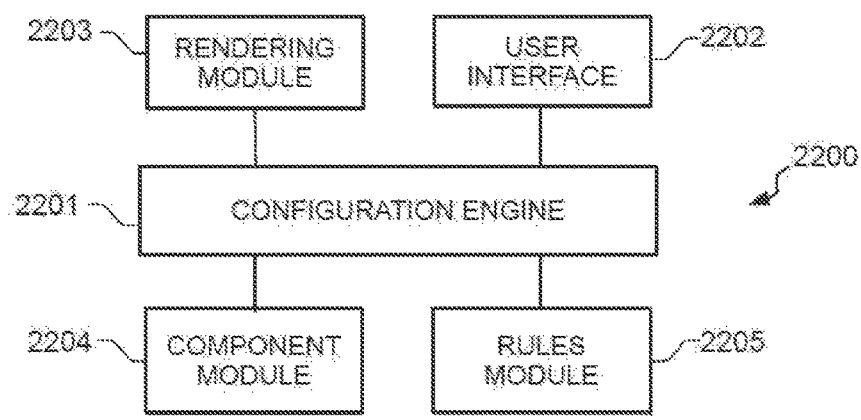
FIG. 22 is a block diagram of an example of a playfield configuration program according to some embodiments.

FIG. 21 is a simulated screenshot and FIG. 22 is a block diagram of an example of playfield module configuration program according to some embodiments. As illustrated, configuration engine 2201 may enable a user via user interface module 2202 to perform one or more playfield module configuration operations. Moreover, rendering module 2203 may cause window 2100 to be presented to the user.

Window 2100 displays a virtualized rendering of a physical, configurable playfield module 2000, similar to that shown in FIG. 20. Using controls 2101 via user interface module 2202, a user may be capable of rotating, translating, magnifying, or otherwise manipulate the rendering of configurable playfield module 2000.

Menu 2102 may list a number of items relevant to the configuration of configurable playfield module 2000. For example, menu 2102 may include an identification of a particular component installed in configurable playfield module 2000, as available in component module 2204, as well as its position of configurable playfield module 2000. Menu 2102 may also include a rule applicable to the corresponding component and stored in rule module 2205. For instance, for any given entry, menu 2102 may display a name of a component, its XYZ coordinates on the surface of configurable playfield module 2000, and, in cases where some action may be perform upon detection of an event, a rule that specifies the event-action pair. An example of such an entry may be to increase the number of game points awarded to a player (i.e., action) in response to the pinball making contact (i.e., event) with a target (i.e., component) located at a given position (i.e., location).

In some embodiments, after having designed a particular configuration for a given playfield module, a user may operate configuration engine 2201 to execute one or more simulations. These simulations may be configured to mimic the performance of the configured playfield module under various game conditions using a physics engine or the like. In this manner, a user may experiment with different pinball component configurations prior to actually assembling the physical parts into a playfield module.

A pinball machine implementing a configurable playfield as described above can provide its owner and players with an infinite number of combinations of playfields. The owner and/or players can make the game feel like an entirely different game by swapping one or more of the playfield modules and/or reconfiguring one or more entities that can be moved or replaced. Therefore, a single pinball machine can provide different features and interactions by having entities on one or more of the small playfields moved or replaced in addition to or instead of having an entire playfield replaced.

As previously noted, a pinball machine with a modular playfield can be considered a multi-game platform. This is in contrast with conventional pinball machines which present a single theme or game to the owner and/or player. The look and feel of a multi-game platform, when employing a modular playfield, can be changed in an infinite number of ways. For example, if a pinball platform is used with a configurable playfield module, numerous pinball components may be swapped in and out or moved on the playfield to present different interactions to the player. Similarly, if the pinball platform is used with swappable playfield modules, numerous new playfield modules may be swapped in and out to present different interactions to the player. Given an infinite number of entities than fit onto a configurable playfield module or an infinite number of swappable playfield modules that may exist, the possible arrangements and types of interactions are also infinite.

Similarly, the software associated with changing the rules based on the identification of a playfield module and/or pinball components may have numerous operating modes, each one based on the type of playfield and or entities that are installed when the software is running. When a playfield module or new pinball component is swapped in, the software may automatically present the player with a different set of rules by which the game is played. Therefore, there may also be an infinite number of different game rules that may be played.

Modular Playfield Frame and Support System

As previously noted, traditional pinball machine playfields include a piece of wood, with material removed to create holes and slots, and physical components, such as flippers, bumpers, targets, scoops, troughs, channels, subways, magnets, levers, plungers, buttons, solenoids, motors, gates, ramps, wireforms, diverters, and ball guides. Physical components or objects are attached to the playfield surface, usually with screws or other types of fastening devices. In some cases, the playfield may be manufactured to have specific physical devices attached to it in a specific way— that is, in a predetermined, fixed or non-changeable configuration. In other cases, however, playfields may be manufactured such that physical devices may be attached to it in different ways. In other words, the playfield can have one set of physical devices attached at one time and one or more different sets of physical devices attached at one or more different times, respectively. Additionally or alternatively, a given physical device may be installed in one location on the playfield surface at one time and in a different location at a different time. In this manner, the playfield may be considered as modular, allowing for components to be removed and replaced with different components and/or allowing for components to be moved into different locations.

To accommodate the various scenarios described above, in some embodiments systems and methods described herein may include a modular playfield frame and/or support system in which one or more slots and/or platforms are designed into support structures for the purpose of holding the physical devices that interact with each other on a pinball playfield, and optionally without the use of fastening devices, such as screws, for example.

One reason for using the modular playfield frame and support system instead of a traditional wooden playfield is for easy and possibly tool-free installation and/or removal of physical devices for cleaning and/or repairing and/or swapping with other devices and/or moving to a different location. Another reason is so that playfields may be shipped unassembled to customers who want to save money on shipping and/or pre-assembly charges, opting instead to assemble the playfield themselves. With traditional wooden playfields, installing and/or removing components from the playfield is generally a very time consuming process. Yet another reason for using the modular playfield frame and support system is to create an entirely modular machine where every, or nearly every, physical device can be easily replaced (e.g., by a user) with a different physical device. For instance, a modular playfield frame and support system is useful to hold physical devices in a multi-game pinball platform where some physical devices are used only in specific games. When another game is to be played, the modular playfield frame and support system makes it relatively easy to install different physical devices that work with the new game.

Figure 23:
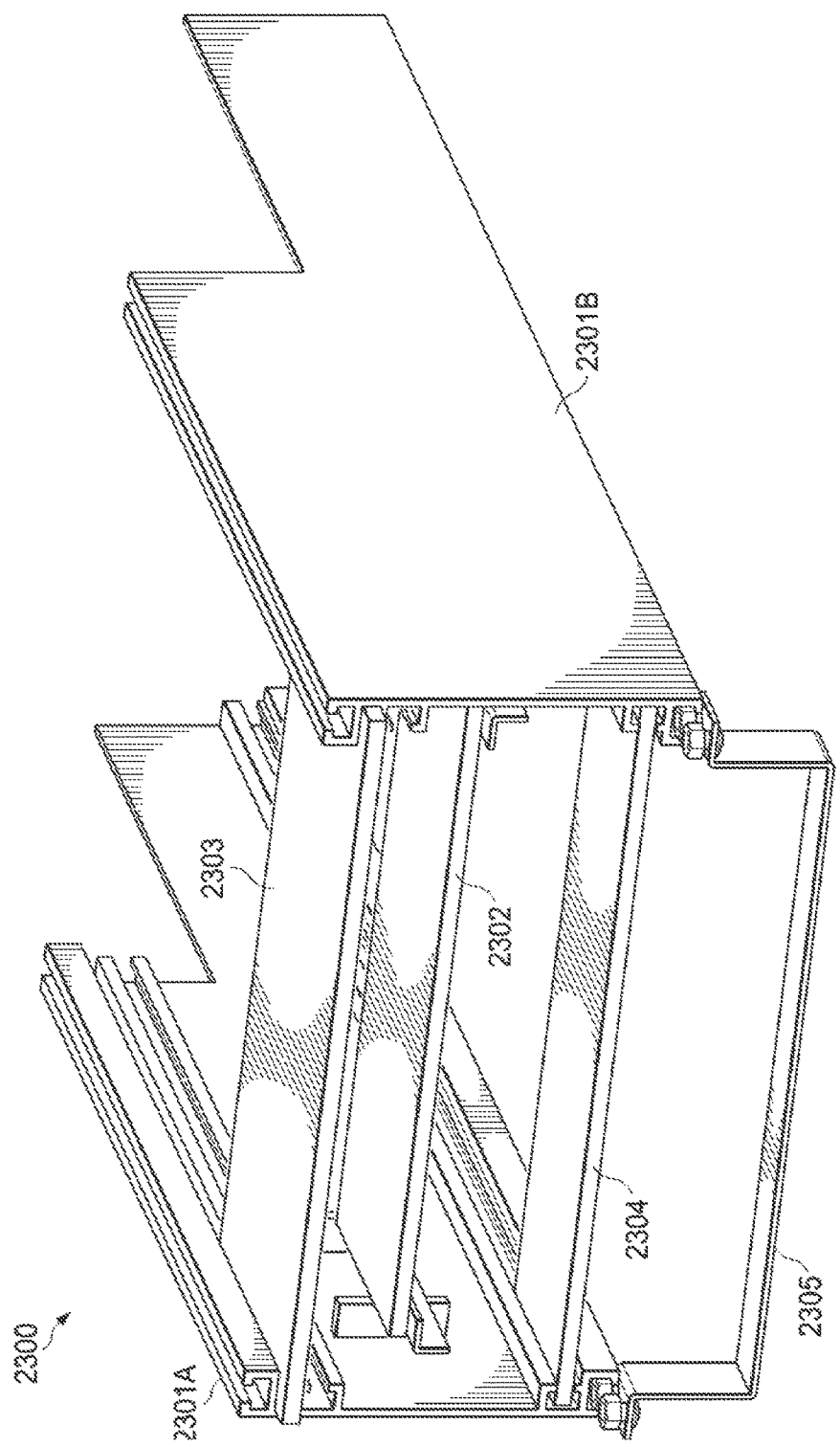
FIG. 23 is a three-dimensional, auxiliary view of an example of a frame and support system according to some embodiments.

FIG. 23 is a three-dimensional, auxiliary view of an example of a frame and support system 2300 according to some embodiments. In this example, extruded aluminum may be used to manufacture rack portions 2301A and 2301B, which may be coupled to the internal surfaces of the lateral portions of cabinet 101 shown in FIG. 1. Used together, rack portions 2301A and 2301B may be used to hold physical devices with no additional fasteners. Particularly, rack portions 2301A and 2301B include a set of features (e.g., slots and platforms) into or onto which physical devices can slide or sit. Nearly any physical device can be made to slide into one of the slots or rest on top on the platforms.

Two or more pieces of extruded aluminum may be used as the rack portions 2301A and 2301B and may be used to hold both sides of plates or other elements which may then be combined with the aforementioned physical devices to create a pinball playfield, complete with a relatively flat playfield surface 2302 on which a ball can roll, and any other devices with which the ball can interact or that interact with each other. Rack portions 2301A and 2301B may also be used to hold an electronic display 200 mounted on plate 2304, flipper assemblies may be mounted on plate 2303, and ball guides or channels may be mounted onto bracket 2305, for example.

Figure 24:
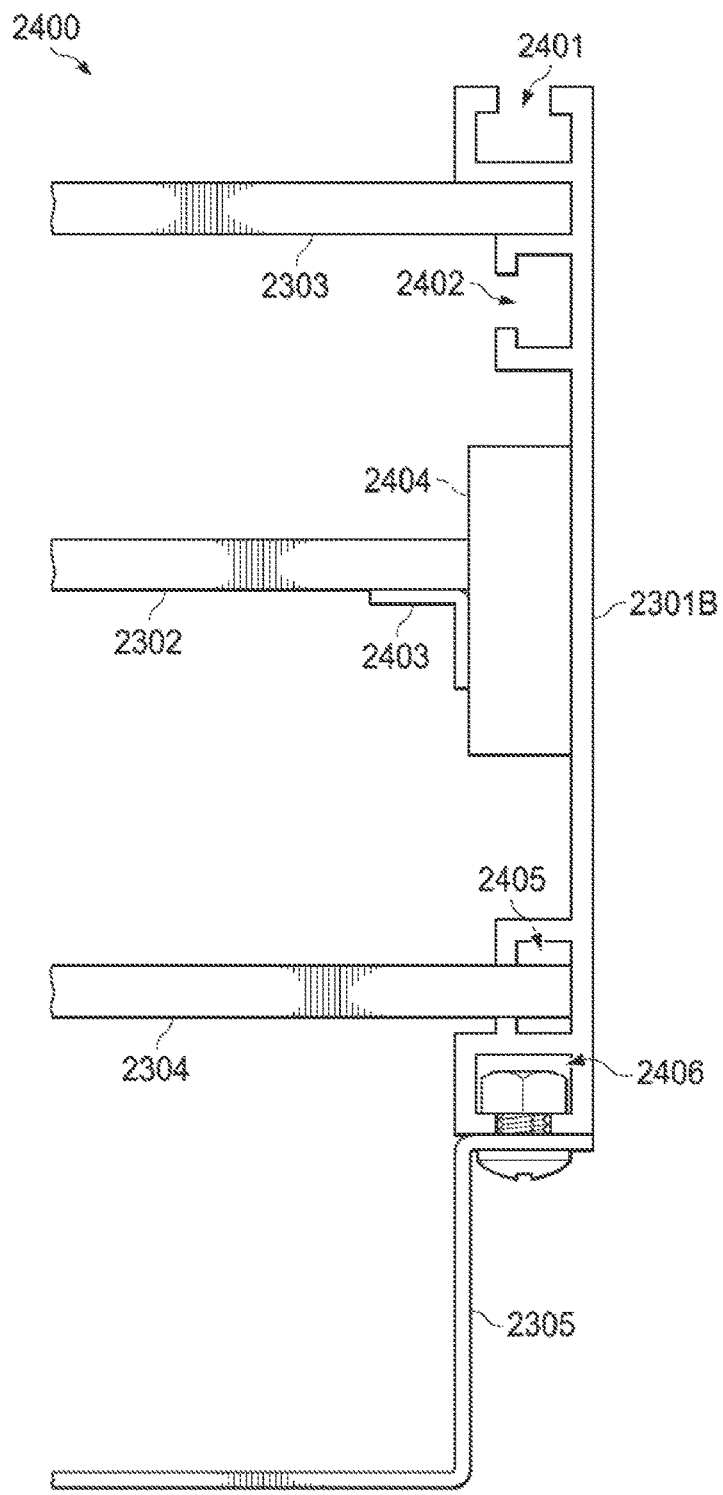
FIG. 24 is a cross-sectional view of an example of one side of a frame and support system according to some embodiments.

FIG. 24 is a cross-sectional view of one side (right side, from the player's perspective) 2400 of a frame and support system according to some embodiments. In this example rack portion 2301B is shown supporting flipper assembly plate 2303, playfield surface 2302, display support plate 2304, and bracket 2305. Particularly, plate 2303 is held in a slot formed between two C-shaped extruded portions 2401 and 2402, the former having an opening facing up and the latter having an opening facing left. Plate or playfield surface 2302 is supported by platform 2403, which in this example is L-shaped, and coupled to rack portion 2301B via block or spacer 2404.

Plate 2304 is held in a slot formed or provided by extruded portion 2405, which is C-shaped with its opening facing left. Bracket 2305 is held by extruded portion 2406, which is also C-shaped but with its opening facing down, using a fastening system described in more detail in connection with FIG. 25. As a person of ordinary skill in the art will recognize in light of this disclosure, the positioning of extruded portions 2401, 2402, 2405, and 2406, as well as the positioning of block or spacer 2404 and platform 2403 may vary depending upon which devices are being supported by each of plates 2303 and 2304, and their respective configurations. Furthermore, although shown with particular shapes, extruded portions 2401, 2402, 2405, and 2406, platform 2403, and block or spacer 2404 may have other suitable shapes.

In other words, physical devices need not be assigned to specific slots or platforms. For example, in some cases a wireform may be placed in the playfield via extruded portion 2401 and a target may be placed in the playfield via extruded portion 2402. In other cases, however, the wireform may be installed in the playfield via extruded portion 2402 and the block may be installed in the playfield via extruded portion 2401, or in any of the other slots or platforms on the extruded aluminum.

Because the slots and platform system of rack portions 2301A and 2301B make it extremely easy to slide physical devices in and out of cabinet 101, physical devices can be easily removed for cleaning and repairs. A given physical device may also be replaced by another physical device of different form and/or function. Physical devices can also be installed in different areas of rack portions 2301A and 2301B and/or cabinet 101. As such, rack portions 2301A and 2301B comprise a modular playfield frame and support system.

As identified above, a traditional wooden playfield, or a subset thereof, can be installed in the modular playfield frame and support system described herein. In this manner, the traditional wooden playfield or a portion thereof is considered to be like any other physical device installed in the modular playfield frame and support system. Again, the type of material used to create the modular playfield frame and support system need not be aluminum, and the slots and platforms need not be shaped as shown in the figures.

Figure 25:
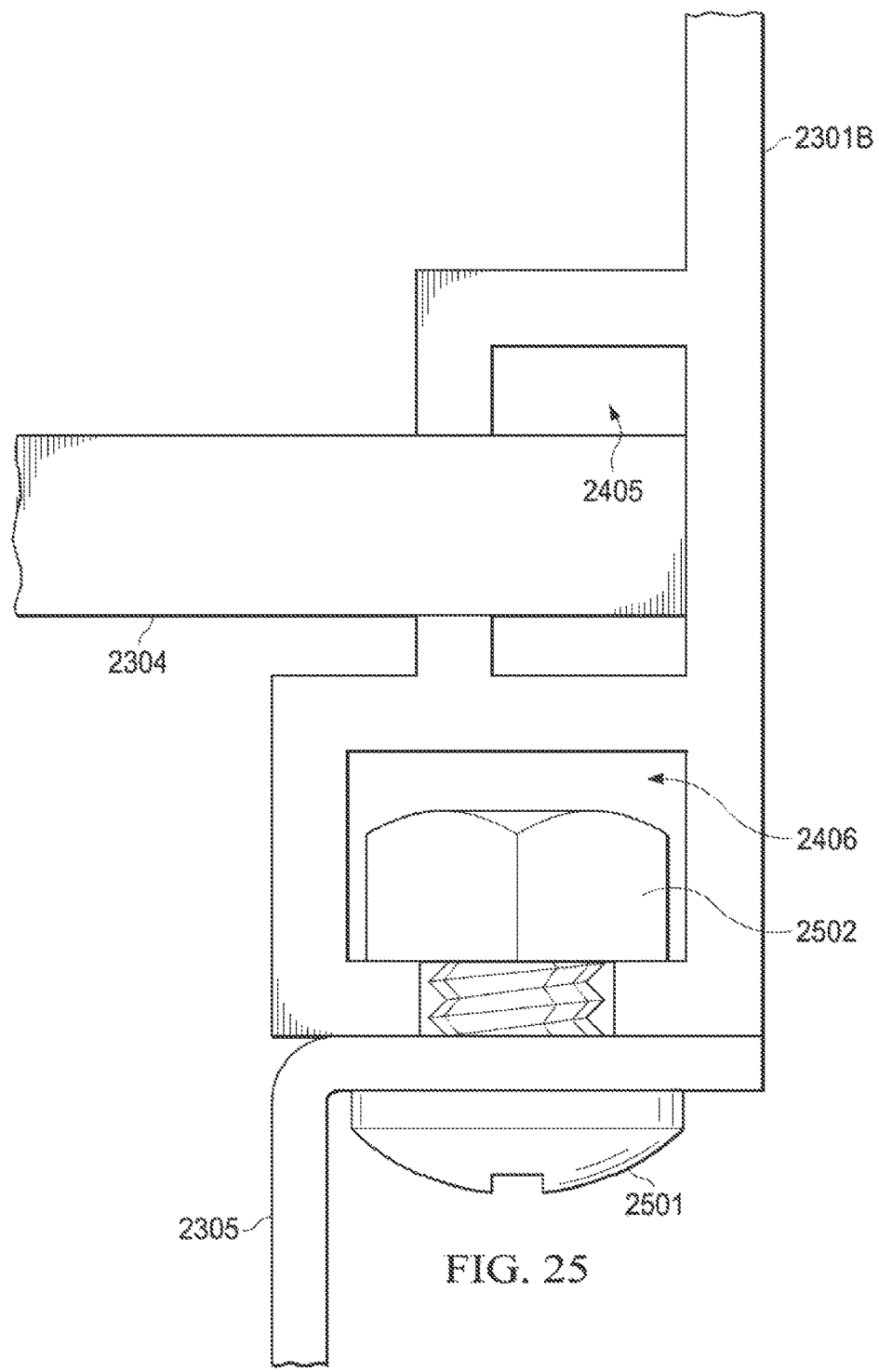
FIG. 25 is a cross-sectional view of an example of a slot and a fastener according to some embodiments.

Additionally, it should be noted that the presence of slots and platforms does not preclude the use of physical fasteners, such as screws, from attaching physical devices to the modular playfield frame and support system. In that regard, FIG. 25 is a cross-sectional view of an example of a slot and a fastener according to some embodiments. As previously noted, extruded portion 2405 of rack portion 2301B holds plate 2304 in its slot. Bracket 2305 slides into the slot created by the opening of extruded portion 2406 using bolt 2501 and nut 2502. In some cases, the shape of the head of bolt 2501 may be hexagonal, and it may have a size or diameter such that it fits within the slot, and therefore may slide in an out of extruded portion 2406. In short, the manner in which rack portions 2301A and 2301B hold physical devices can be extended by using some physical devices to hold additional physical devices.

Modular Pinball Machine Controller System

Most modern pinball machines provide the player with the ability to control the movement of the ball through buttons attached to machine. Sometimes buttons directly close or open an electrical circuit that directly activates one or more physical devices controlled by that circuit. Other times button activations and deactivations are sensed by separate circuits which directly control physical devices. Yet other times, button activations are sensed by separate circuits which are used as inputs into computing systems that run software that indirectly controls physical devices.

In each of these cases, part or all of the process of activating physical devices requires the player to physically press a button. In other cases, systems may be built to allow the player to activate physical devices through other controls, such as by moving a joystick or trackball, or by making hand gestures, or by any other physical movement, including even eye movement and/or brain activity, that can be sensed by the machine and translated into control of one or more physical devices.

In some embodiments described herein, the input mechanism(s) in a pinball machine, some of which were described above, may be modular in that they can be easily replaced by a user with different input systems. For example, many pinball machines have one button on either side of the cabinet, and those buttons generally allow a player to indirectly activate and deactivate the flippers that control one or more balls. Other pinball machines have two buttons on either side of the cabinet, where the first set of buttons generally controls the flippers and the other set generally controls one or more other features in the game. In some cases, it may be desirable to have a machine that only has one set of buttons at one time and has two sets of buttons at a different time. A modular controller system makes those cases possible, allowing the one button configuration to be easily replaced by a two button configuration.

Figure 26:
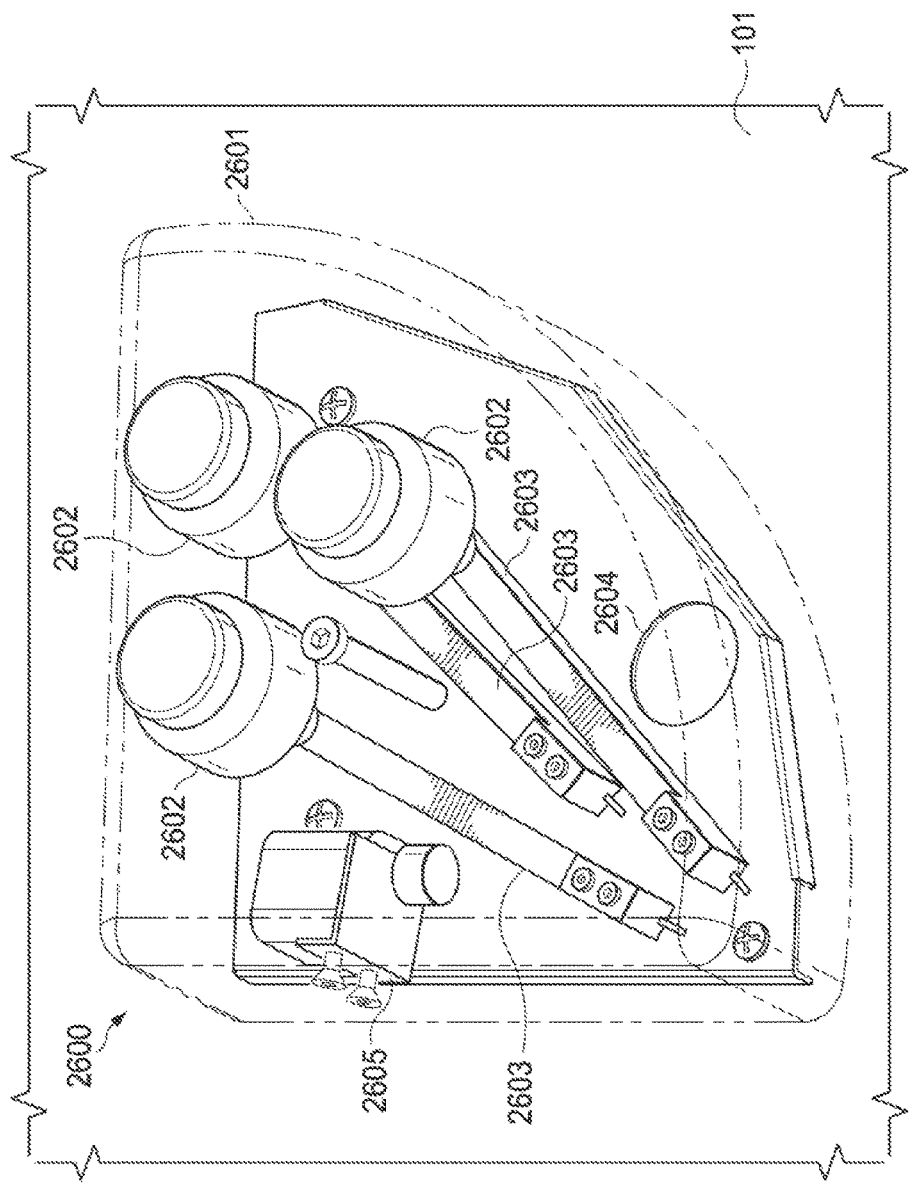
FIG. 26 is three-dimensional, auxiliary view of an example of a user-replaceable module according to some embodiments.

FIG. 26 is three-dimensional, auxiliary view of an example of user-replaceable module 2600 according to some embodiments. As shown, the pinball machine has 3 buttons 2602 on the right side of cabinet 101. Buttons 2602 may be used by the player to control the flippers and/or other devices in the machine. Instead of being installed directly into the side of the pinball machine's cabinet, making them hard to replace, buttons 2602 are installed in box 2601, which is a modular component that can easily be removed from the machine by user removing one or more screws, for example, and possibly disconnecting a modular cable connection (not shown).

Box 2601 may be referred to as a button box, which is one of many possible devices that, along with the physical pinball machine to which it connects, comprise a modular pinball machine controller system. It is referred to as "modular" because it can be easily removed from the machine, and it is a "controller system" because it contains buttons that give the player a way to control devices on the machine (e.g., in the playfield).

Box 2601 is but one example of a device that can be part of a modular pinball machine controller system. Box 2601 and the pinball machine comprise a modular pinball machine controller system because the pinball machine may be specifically designed to allow box 2601 and/or other variations of boxes to be replaced by different variations of boxes. For example, box 2601 may be replaced by a different box that contains a single button, two buttons, a joystick, a trackball, or any input mechanism that may be used to control devices on the pinball machine. A malfunctioning box 2601 may also be replaced by another box that's identical in form and/or function to box 2601.

In this embodiment, buttons 2602 are connected to leaf switches 2603, which close electrical circuits when the associated buttons 2602 are pushed by the player. Wires (not shown) are connected on one end to leaf switches 2603 and on the other end to a modular connector (not shown) so that they may interface to the pinball machine. In some cases, wires or cables may be routed through hole 2604 of box 2601 into a corresponding hole on cabinet 101 to the inside of the pinball machine, where they may connect to electrical circuits that sense the activation of leaf switches 2603 in button box 2601.

Button boxes used in a modular pinball machine controller system may contain any number of devices in them. For example, box 2601 also shows vibration motor 2605. Vibration motor 2605 is not required for button box 2601 to be used in a modular pinball machine controller system, but box 2601 may be a convenient place to add vibration motor 2605. Any number of additional devices could be installed in a button box, such as a USB connector, headphone jack, volume controls, or any other device that may be used by a user, player or alternatively by the owner of a pinball machine.

Button boxes used in a modular pinball machine controller system is not required to be shaped in any specific way. A button box may be round, square, or triangular. It may have a relatively flat shape or a complex three-dimensional shape appearing like a gun or a motorcycle or bike handle. There are no limitations to the shape of the box.

Moreover, a button box does not need to have a single enclosure. For example, in some cases a button box may include a combination of enclosures or devices that either connect to each other or individually connect to the control circuitry inside the pinball game. The box also does not need not be mounted directly onto cabinet 101. For instance, a button box may be used remotely with only a cable providing connection back to the machine, optionally through a hole such as hole 2604. In other implementations, a box need not connect to the machine through a physical cable. Various wireless technologies (e.g., Bluetooth, NFC, WiFi, RFID, etc.) may be used to interface a button box with the control circuitry in the pinball machine.

One reason to use a modular pinball machine controller system is to present players and pinball machine owners with an easy means to change the way players interact with the machine. While this may be useful in certain single-game pinball machines, it's especially useful in multi-game pinball machines, where the machine can present different games to the player by offering various software applications that present the player different options, by allowing various physical modules on the machine to be replaced with differently configured physical modules, or by a combination of the two. In such cases, it may be advantageous to allow the input mechanisms to be changed as well, sometimes to provide the player with more theme-relevant input mechanisms, and other times simply for variety.

Magnetic Pinball Machine Artwork

Pinball machines cabinets are typically made of wood or plastic materials. For various reasons, including the desire to attract players in an arcade environment, pinball machines are usually decorated with artwork. Oftentimes the artwork is related to the theme around which the game was designed. Other times the artwork is more generic, possibly representing the company that created the game. During the manufacturing process of physical gaming systems, artwork is applied onto the machine's cabinet in one of many possibly ways, such as silkscreening the cabinet directly or by attaching printed artwork to the machine with one of many types of permanent or semi-permanent adhesives.

Physical gaming systems, such as pinball machines, have traditionally been built for public locations, such as arcades and amusement parks. They were also built for private establishments that served as social gathering places, like bars and bowling alleys. In these locations, the gaming systems would typically be replaced every few years for newer systems in order to keep people interested in the gaming systems. They were therefore considered to be somewhat disposable, and only needed to look good and function well for the few years that they resided on location.

Because of the disposable nature of these gaming systems, they were designed with little regard to long term maintenance and appearance. If, after a few years, the artwork no longer looked good, that was not considered an issue. Because of this, there have not been a need to make the cabinet artwork easily replaceable.

Some gaming systems eventually find their way into the hands of collectors and in the homes of consumers, and oftentimes these collectors and consumers attempt to restore the gaming systems, including making the cabinet artwork look good again. However, because of the permanent way the artwork was applied to the cabinets, this is a very difficult, expensive, and time-consuming process. The typical procedure for replacing artwork involved tedious physical labor including sanding off the old artwork, repairing any defects in the wood, and then applying new permanent or semi-permanent artwork.

To address these and other concerns, in some embodiments magnetic decals may be coupled to cabinet 101 such that they may be easily removed or replaced by a user. There are many reasons one would want to easily remove or replace the artwork on a gaming system. For example, one reason is to make an old machine look new again by replacing old, worn out artwork with newer versions of the same artwork. Another reason is to change the artwork to a new style with new images representing the same theme as the original artwork. Yet another reason is to change the entire subject the artwork represents. The latter may be applicable to multi-game platforms, where the game presented by the system can be changed by the player or owner. With easy-to-replace artwork, the player or owner can keep the theme represented by the outside of the gaming system matching the theme represented by the game installed in the gaming system.

Because a gaming system can include a cabinet 101 that is traditionally made of wood, application of magnetic decals would ordinarily not be possible. In some cases, however, by first applying magnet paint, which may include for example a standard paint mixed with iron flakes or other ferrous materials, it becomes possible to create a painted wooden surface to which a magnetic decal adheres. Additionally or alternatively, gaming system cabinets may also be made out of metal or other ferrous material instead of wood, thereby allowing magnetic decals to directly adhere.

Figure 27:
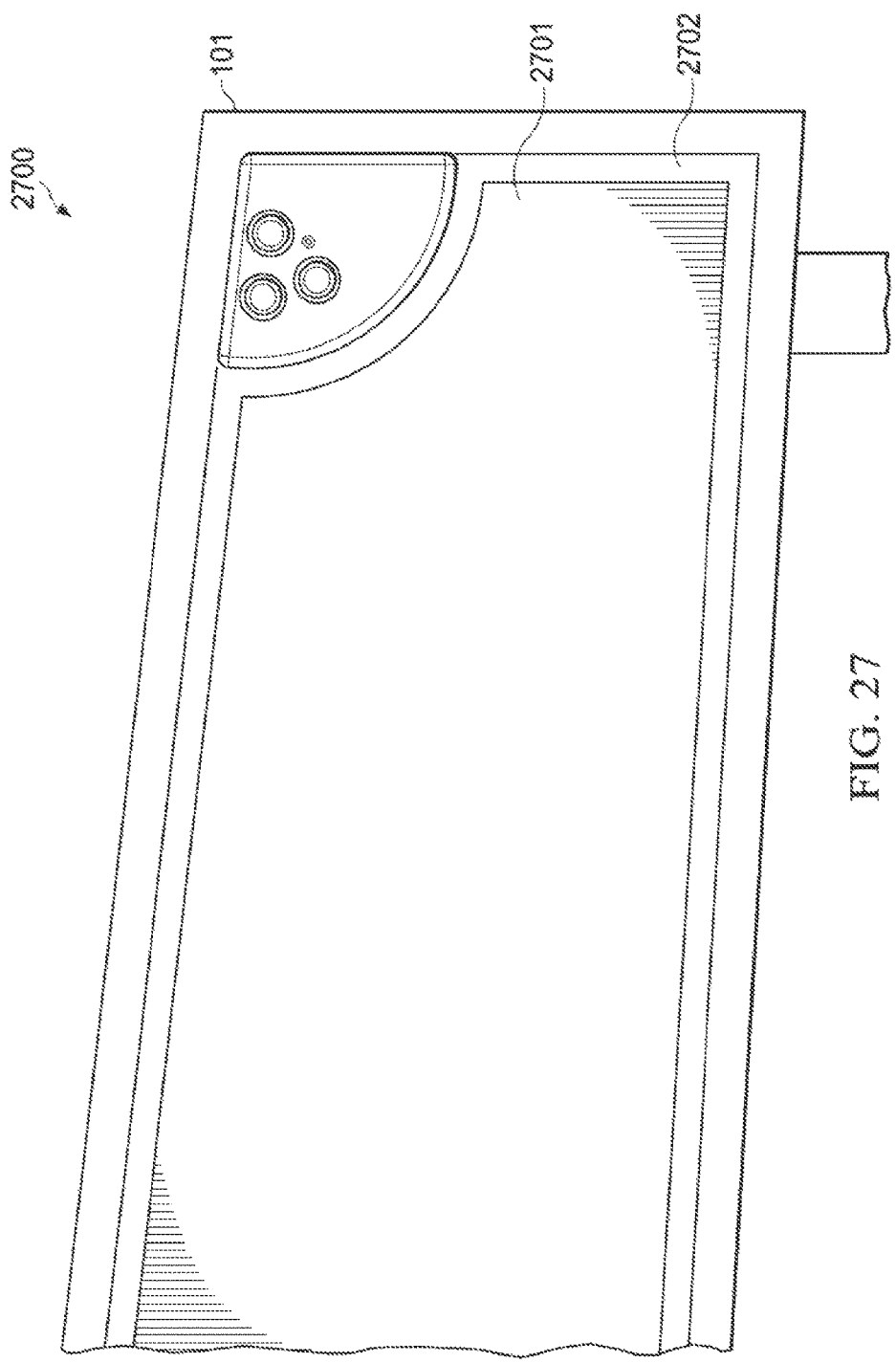
FIG. 27 is a side view of an example of a user-replaceable magnetic decal according to some embodiments.

FIG. 27 is a side view 2700 of an example of user-replaceable magnetic decal 2701 according to some embodiments. Particularly, cabinet 101 may include sheet metal side panel 2702 to which magnetic decal 2701 adheres. In this example, magnetic decal 2701 is intentionally smaller than the full size of sheet metal side panel 2702 so that magnetic decal 2701 is easy to remove. The sections of the sheet metal side panel 2702 that are not covered by the magnetic decal (2) provide access to the edges of magnetic decal 2701 so it can be easily removed. In some cases, magnetic decal 2701 may be removed by peeling a corner away from sheet metal side panel 2702. Additionally or alternatively, a particular corner of magnetic decal 2701 may not be magnetic, so that it more easily detaches from sheet metal side panel 2702. Additionally or alternatively, a non-magnetic tab may extend beyond the edge of magnetic decal 2701 to facilitate detachment from sheet metal side panel 2702.

As a person of ordinary skill in the art will recognize in light of this disclosure, any specific designs and color choices shown are for example purposes only. These various embodiments, however, not require any specific design or colors to be shown on magnetic decals or the gaming systems to which they are applied.

Being able to easily remove or replace cabinet artwork has a downside, which is that it makes it very easy for a thief or vandal to steal or just remove the artwork on a machine. While the machine owner may want to use magnetic decals for the advantages described above, they might be afraid of the decals being stolen or removed.

Figure 28:
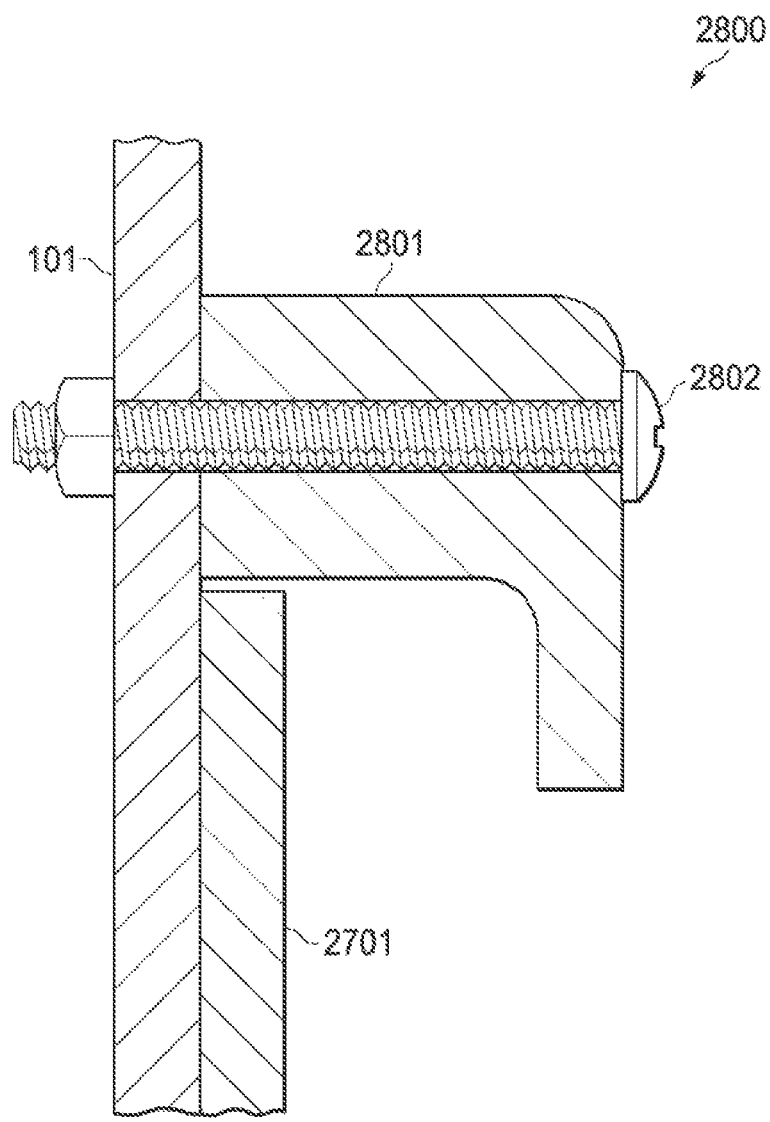
FIG. 28 is a cross-sectional view of an example of a trim piece according to some embodiments.

To address these and other concerns, trim pieces may be used. In that regard, FIG. 28 is a cross-sectional view 2800 of an example of trim piece 2801 according to some embodiments. Particularly, trim piece 2801 is coupled to the outside surface of the lateral portion of cabinet 101 using fastener 2802 (e.g., a screw and nut assembly) such that the edge of magnetic decal 2701 is covered, in this case, by a downward extending portion of trim piece 2801. In some cases, sheet metal side panel 2702 may be located between cabinet 101 and magnetic decal 2701. Moreover, in some cases, the entire edge of magnetic decal 2701 may be covered or otherwise protected by a coextensive trim piece 2801. Without access to the edges, thieves and vandals would not easily be able to remove a magnetic decal. As such, magnetic decal 2701 may not be easily removed from the machine unless trim piece 2801 were also removed.

In other implementations, magnetic decals may be secured to cabinet 101 by using other fastener devices, such as screws. Such fasteners can either be used in cases where the owner wants to protect the decals from theft, or not used in cases where the owner is not worried about theft and/or wants to ensure the decals can be easily removed without dealing with fasteners.

Furthermore, to enhance the visual appearance of the decals, optional edge lighting can be added to the cabinet in one or more places around the decals. For example, lighting elements, such as traditional incandescent bulbs, LED strips, or any number of other lighting products, may be mounted directly to cabinet 101 and/or to trim piece 2801 (e.g., in the space between the downward extending portion of trim piece 2801 and cabinet 101). For instance, even in cases where trim pieces are not used for protection from theft, trim pieces may still be used for removable edge lighting instead. In some implementations, trim piece 2801 may be used help guide the light towards or away from magnetic decal 2701, depending on the lighting effect the owner desires.

Deploying Physical Objects

In some embodiments, one or more of the aforementioned physical objects such as, for example, ball(s), plunger(s), bumper(s), kicker(s), bullseye target(s), drop target(s), variable point target(s), roll(s), saucer(s), spinner(s), rollover(s), switch(es), gate(s), stopper(s), ramp(s), toy(s), electromagnet(s), etc., or other physical objects, may be located in pinball machine 100. At least in part due to the presence of electronic display 200, tracking system 300, and/or other components, one or more of these physical objects may be deployed within hybrid playfield 104 as described in more detail below.

There are many places in a pinball machine where the systems and methods described herein may be used. Common situations involve places where there is not enough room for all of the components required to strike and apply an acceleration to other objects. In such cases, the components may be separated into connected components, one or more components being remotely located with respect to another component(s), two or more components connected to each other or linked in a suitable manner.

Figure 29:
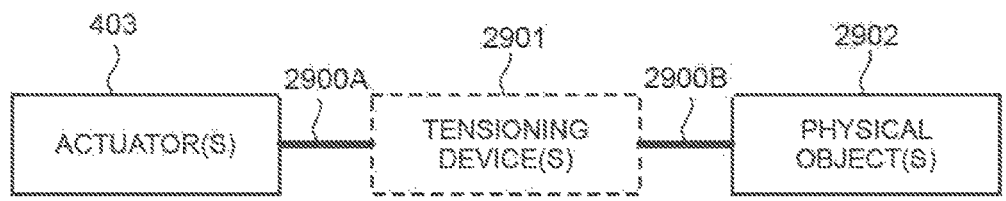
FIG. 29 is a block diagram of an example of a remote actuator system according to some embodiments.

In that regard, FIG. 29 is a block diagram of an example of a remote actuator system according to some embodiments. As illustrated, one or more actuator(s) 403 are operably coupled to one or more physical object(s) 2902 via one or more links. Particularly, in this example, link portion 2900A couples actuator(s) 403 to tensioning device(s) 2901, and link portion 2900B couples tensioning device(s) 2901 to physical object(s) 2902. It should be noted, however, that link portions 2900A and 2900B may in fact constitute a single, continuous link (collectively referred to as "link") and that, in some cases, tensioning device(s) 2901 may be absent. Tensioning device(s) 2901, when present, may be located somewhere along the link.

Generally speaking, movement of actuator(s) 403 creates a force applied to physical object(s) 2902 via the link. Particularly, link portions 2900A and 2900B coupled between actuator(s) 403 and physical object(s) 2902 ensure that the movement of actuator(s) 403, or component(s) within actuator(s) 403, is translated into the movement of physical object(s) 2902.

In some implementations, actuator(s) 403 may include an electric motor, plunger, or the like having a coil or solenoid element. When actuator(s) 403 (or one or more components within actuator(s) 403) moves, link portions 2900A and 2900B also move. The movement of link portions 2900A and 2900B cause physical object(s) 2902 to move as well. In some implementations, the specific nature of the movement of actuator(s) 403 and physical object(s) 2902 may be to cause physical object(s) 2902 to strike and apply an accelerating force to another physical object (e.g., pinball 202) in the pinball machine.

In some embodiments, tensioning device(s) 2901 may be used to adjust the position and/or movement of physical object(s) 2902. For example, tensioning device may include a knob and a bracket or mount such that the link goes through both the knob and the bracket or mount. The bracket or mount may be coupled to a portion of the pinball machine to keep the knob from moving when a force is applied by actuator(s) 403 to the link, whereas the knob may increase the tension on the link when turned in one direction, and it may decrease the tension on the link when turned in the other direction. In other implementations, tensioning device(s) 2901 may include a turnbuckle, a ratcheting device, or another suitable tensioning mechanism.

Link portions 2900A and 2900B may be used to translate the movement of actuator(s) 403, or component(s) of actuator(s) 403, into the movement of physical object(s) 2902 and may be made of any suitable material that is easy to bend and reshape, for example, at room temperature. The shapes of link portions 2900A and 2900B may also be dynamically adjusted when a force is applied to it by the movement of actuator(s) 403.

In some implementations, the material used for link portions 2900A and/or 2900B may include a flexible material that is readily capable of assuming various curved or bent configurations or paths within hybrid playfield 104, such as wire, rope, malleable steel cable, etc. For instance, link portions 2900A and 2900B may assume different configurations (e.g., bend around different points along their lengths) during the course of a pinball game as actuator(s) 403 and/or physical object(s) 2902 are operated. In other implementations, the material used for link portions 2900A and/or 2900B may include a rigid material such as a steel rod, metal bar or arm, hard plastic (e.g., thermosetting plastics, etc.), or the like.

The lengths of link portions 2900A and 2900B may be determined by the positions at which actuator(s) 403 and physical object(s) 2902 are placed, as well as the path that the link needs to take to connect to actuator(s) 403 and physical object(s) 2902. For instance, when actuator(s) 403 are located in close proximity to physical object(s) 2902, the link may be short. Conversely, when actuator(s) 403 are located far away from physical object(s) 2902, the link may be long. As such, through the use of link portions 2900A and 2900B, actuator(s) 403 and physical object(s) 2902 may be located anywhere in the pinball machine, even large distances apart from each other.

In some embodiments, a housing or pipe may be used to provide a more rigid and consistent guide for the link's movement. Such housing may be a hollow tube or other material through which link portions 2900A and/or 2900B is routed. Further, the housing may be mounted in a way that it does not move relative to the pinball machine when actuator(s) 403 (and therefore the link) moves. Rather, link portions 2900A and/or 2900B move through it. Therefore, in some implementations, a cable housing may provide a well-defined and unchanging path that the link may follow when translating the movement of actuator(s) 403 to the movement of physical object(s) 2902.

Figure 30:
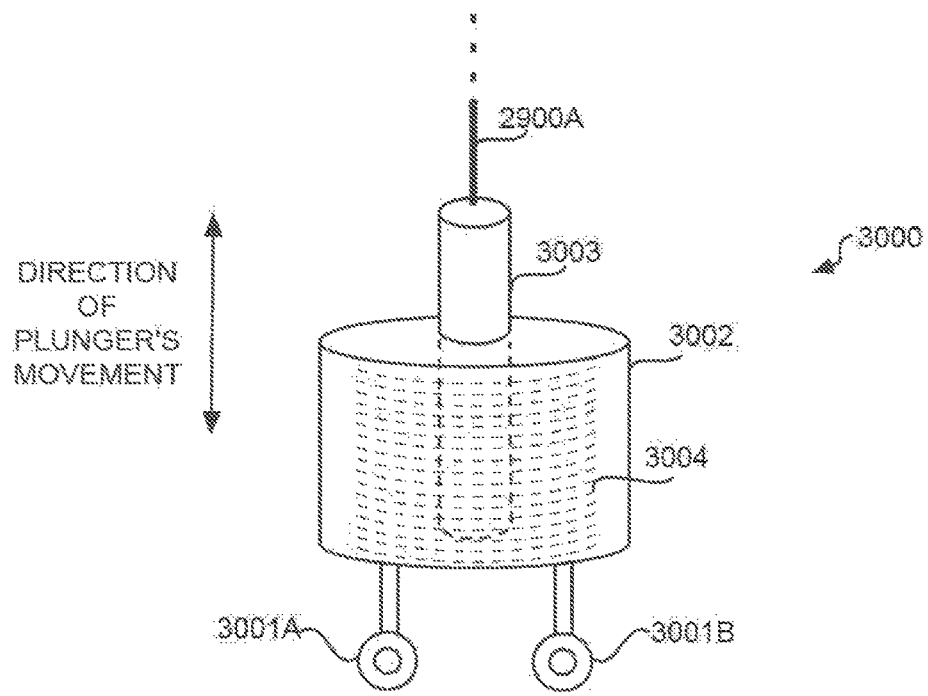
FIG. 30 is a three-dimensional diagram of an example of a single actuator according to some embodiments.

FIG. 30 shows a diagram of an example of a single actuator 3000. In some embodiments, single actuator 3000 may be used as actuator(s) 403 in FIG. 29. In this illustration, single actuator 3000 includes one or more components that may be made to move in order to exert a force on link portions 2900A and/or 2900B. Particularly, casing 3002 includes electromagnet solenoid 3004 made up of a wire coupled to terminal 3001A, the solenoid being wrapped dozens or hundreds of times around a hollow core, and then coupled to another terminal 3001B. When a predetermined voltage is applied across terminals 3001A and 3001B, electrical current flows through electromagnet solenoid 3004, thus creating a magnetic field inside the core around which the wire is wrapped. When the magnetic field is active, metal plunger 3003 is pulled into casing 3002 (a "first direction").

Link portion 2900A is coupled to plunger 3003 such that, when plunger 3003 is pulled in the first direction, link portions 2900A and/or 2900B are pulled along with it. Therefore, the movement of plunger 3003 translates into the movement of link portions 2900A and/or 2900B, and that movement translates into the movement of physical object(s) 2902. When the magnetic field is inactive—i.e., when no voltage is applied across terminals 3001A and 3001B—the force applied to plunger 3003, and therefore link portions 2900A and/or 2900B, disappears. In some cases, plunger 3003 may then move in a direction opposite to the first direction (a "second direction") to return to its original position. To move plunger 3003 back to its original position, a spring may be employed as described below. Additionally or alternatively, if physical object(s) 2902 is pushing against another component with some tension (e.g., a rubber ring), that component may exert a force back on physical object(s) 2902, thereby moving it back to its original position, and, by extension, forcing plunger 3003 back to its original position as well.

In some embodiments, a spring may be placed within casing 3002 to help return plunger 3003 to its original position outside of the solenoid's core. Such a spring may be compressed when plunger 3003 is pulled into casing 3002, and its subsequent decompression may force plunger 3003 back out of casing 3002. The force applied to plunger 3003 by the spring may be in the second direction. Accordingly, when the magnetic field within casing 3002 ceases, link portion 2900A moves outwardly from casing 3002, thus causing physical object(s) 2902 to also move in the second direction.

Figure 31:
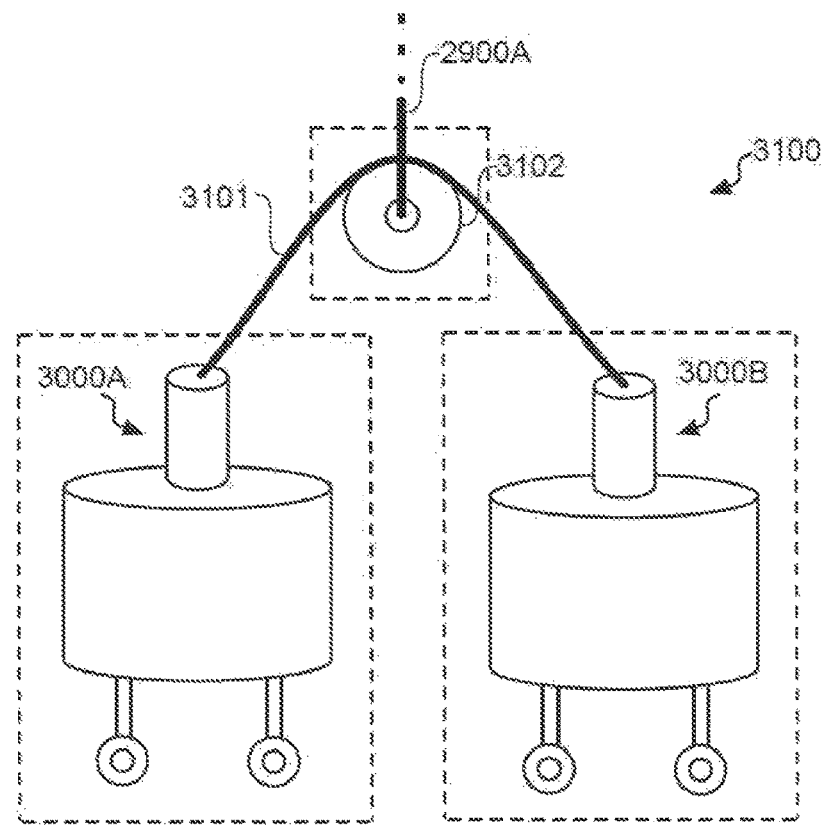
FIG. 31 is a three-dimensional diagram of an example of a dual actuator according to some embodiments.

FIG. 31 is a diagram of an example of a dual actuator 3100 according to some embodiments. In this illustration, two single actuators 3000A and 3000B may make up actuator(s) 403 of FIG. 29. More generally, however, any number N of single actuators may be used. Here actuators 3000A and 3000B are connected together by cable 3101, which is distinct from link portions 2900A and 2900B of FIG. 29. Cable 3101 is routed through pulley 3102, which is in turn coupled to link portion 2900A.

Similarly, as before, link portions 2900A and/or 2900B couple actuator(s) 403 to physical object(s) 2902, and are therefore configured to translate movement between actuators 3000A and 3000B and physical object(s) 2902. More specifically, when either plunger of actuators 3000A and 3000B is pulled into its respective solenoid core, pulley 3102 is also pulled closer to respective one(s) of actuator(s) 3000A and/or 3000B. This movement of pulley 3102 exerts a force on link portion 2900A, and that force translates to movement of link portions 2900A and 2900B, and therefore movement of physical object(s) 2902.

In some embodiments, either or both of actuators 3000A and 3000B may be activated at any given time. Activating actuators 3000A and 3000B may simultaneously translate into more movement of pulley 3102 than when only one of actuators 3000A or 3000B is activated at a time. A larger movement of pulley 3102 translates into more movement of the link, and therefore faster movement of physical object(s) 2902. Accordingly, in some implementations, the use of N actuators may enable different lengths and/or speeds of movement in physical object(s) 2902.

Figure 32:
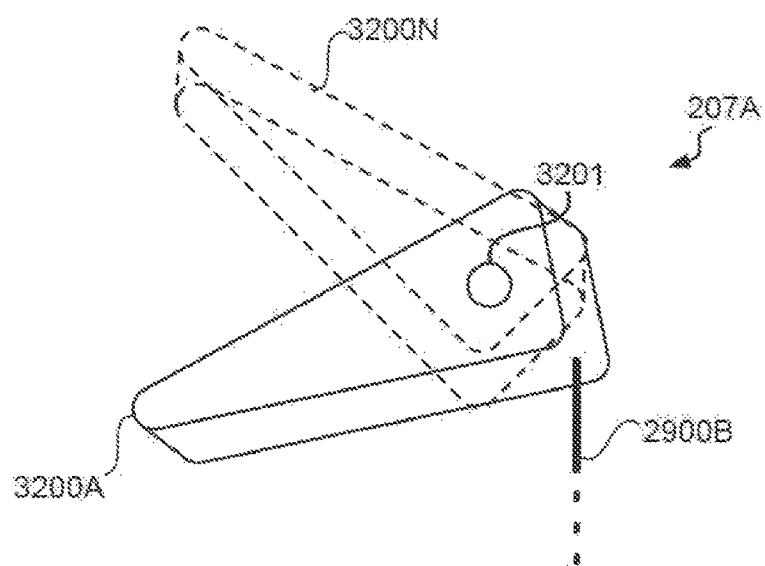
FIG. 32 is a three-dimensional diagram of an example of a remotely actuated flipper according to some embodiments.

FIG. 32 is a diagram of an example of a remotely actuated flipper 207A. In some embodiments, flipper 207A may be used as physical object(s) 2902 of FIG. 29. Here, flipper 207A pivots or rotates around point or post 3201 to assume one of two or more positions 3200A-N (or any other position in between) depending upon the force applied by link portion 2900B, which in turn depends upon the operation of actuator(s) 403, also shown in FIG. 29.

In some embodiments, post 3201 may be used to mount flipper 207A to a portion of hybrid playfield 104 that does not move when flipper 207A rotates around post 3201. This mounting can include, for example, a metal cylinder connected to a surface of pinball machine 100. In some cases, flipper 207A may be made of a single material, such as plastic, wood, metal, or any other suitable material. In other embodiments, however, flipper 207A may include multiple components and/or multiple materials. For example, flipper 207A may have a plastic body with a ball bearing mounted such that it fits around post 3201.

Here, link portion 2900B is coupled to a portion of flipper 207A other than post 3201 (that is, the actual flipper bat) and in such a way that movement of link portion 2900B translates to flipper 207A rotating around post 3201. When link portion 2900B moves towards the bottom of FIG. 32, flipper 207A rotates clockwise, potentially reaching position 3200N or any other intermediate position. When link portion 2900B moves towards the top of FIG. 32, flipper 207A rotates counterclockwise, potentially returning to position 3200A.

In some implementations, flipper 207A may be controlled by a user operating side control(s) 107 to strike and/or apply an acceleration to another object, such as pinball 202. The acceleration may be applied to pinball 202 directly or indirectly (e.g., in cases where flipper 207A is surrounded by a rubber ring or the like; in which case, the rubber ring applies the force to pinball 202). For example, if pinball 202 is at a location where part of flipper 207A resides when traveling between positions 3200A and 3200N, flipper 207A may strike pinball 202 and therefore apply an acceleration to it by rotating around post 3201 due to the movement of link portion 2900B.

Figure 33:
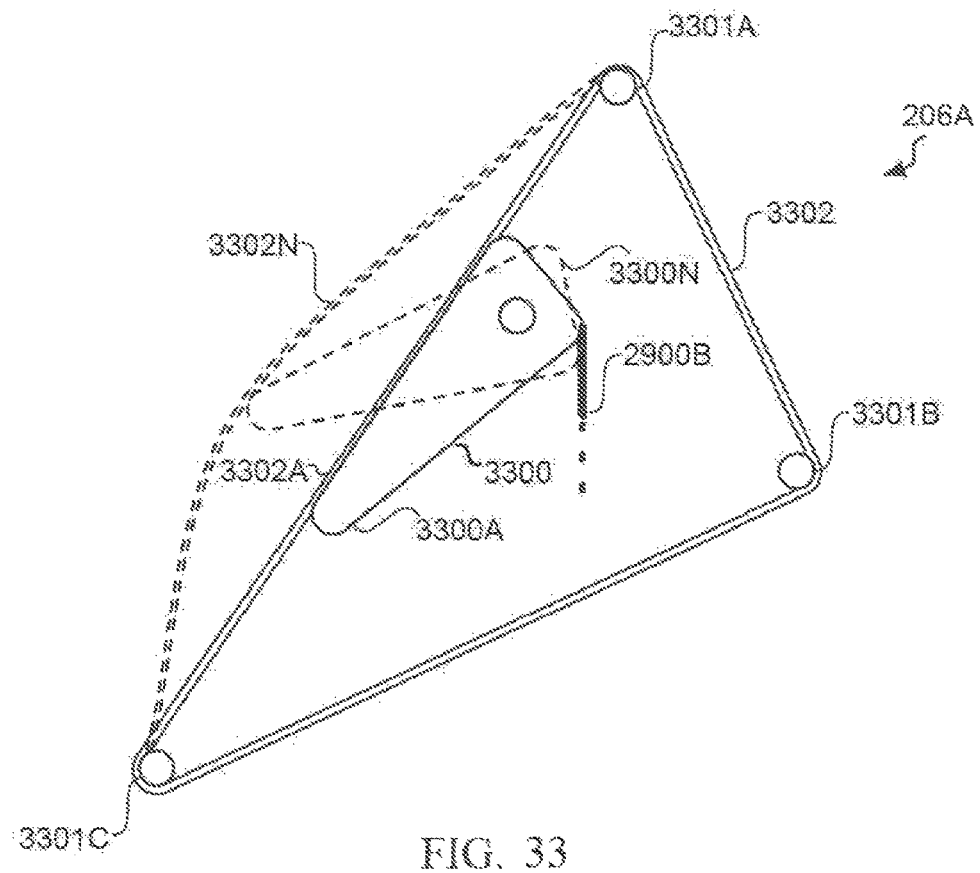
FIG. 33 is a top-view diagram of an example of a remotely actuated slingshot according to some embodiments.

FIG. 33 is a diagram of an example of remotely actuated slingshot 206A. In some embodiments, posts 3301A, 3301B, 3301C hold rubber ring 3302 or the like in place, and bat 3300 (similar to flipper 207A shown in FIG. 32) may be configured to push against rubber ring 3302. In that scenario, bat 3300 may be configured to rotate as described in connection with FIG. 32 to assume position 3300N (or any position in between), in which case, rubber ring 3302 may assume shape 3302N (or any shape in between). Thus, rubber ring 3302 may strike pinball 202 upon control of actuator(s) 403 shown in FIG. 29.

Particularly, when actuator(s) 403 pull link portions 2900A and/or 2900B, bat 3300 may move to position 3300N, thus causing rubber ring 3302 to assume shape 3302N. Therefore, if pinball 202 meets the rubber ring while the rubber ring is traveling between shapes 3302A and 3302N, slingshot 206A may strike pinball 202 and therefore apply an acceleration to it. Then, when actuator(s) 403 stop pulling link portions 2900A and/or 2900B, bat 3300 returns to its original position 3300A.

As described, FIGS. 32 and 33 present embodiments of physical object(s) 2902 of FIG. 29. It should be noted, however, that these embodiments are shown only by way of illustration, and that numerous other embodiments and variations are contemplated. In some cases, physical object(s) 2902 may move in a single direction, whether along a straight line or around a point. In other cases, physical object(s) 2902 may move in multiple directions, sometimes simultaneously, and other times only one direction at a time. It should also be noted that movement of physical object(s) 2902 is often, but not always, intended to strike and apply an acceleration to another object (e.g., pinball 202).

In some implementations, physical object(s) 2902 may contain one or more springs or other tensioning devices to help apply movement to component(s) coupled to link portions 2900A and/or 2900B. For example, in FIGS. 32 and 33, a spring may be added to help return flipper 207A and/or slingshot 206A to its original position once the force being exerted by link portions 2900A and/or 2900B goes away. The force therefore being applied by the spring may subsequently cause flipper 207A and/or slingshot 206A to exert a force on link portions 2900A and/or 2900B, which translates to a force on actuator(s) 403. In this manner, the system may be reversed in that physical object(s) 2902 now act to provide a force on link portions 2900A and/or 2900B in order to produce movement in actuator(s) 403. However, components of actuator(s) 403 may not necessarily be moved in order to strike and apply an acceleration to another object. In various embodiments, the movements caused in actuator(s) 403 by the movements of physical object(s) 2902 are to return components within actuator(s) 403 to their original positions.

Generally speaking, it should be noted that components within actuator(s) 403 or components within physical object(s) 2902 need not be located in the same general vicinity or be directly attached to each other. In other words, actuator(s) 403 and physical object(s) 2902 may be made up of many components that are located far apart from each other.

Furthermore, in some embodiments, one or more physical object(s) 2902 may be deployed within hybrid playfield 104. As such, the presence of electronic display 200 and/or tracking system 300 may prevent physical object(s) 2902 from being directly coupled to the playing surface of hybrid playfield 104. To address these and other concerns, FIGS. 34-36 describe systems and methods of suspending or floating physical object(s) 2902 within hybrid playfield 104.

Figure 34:
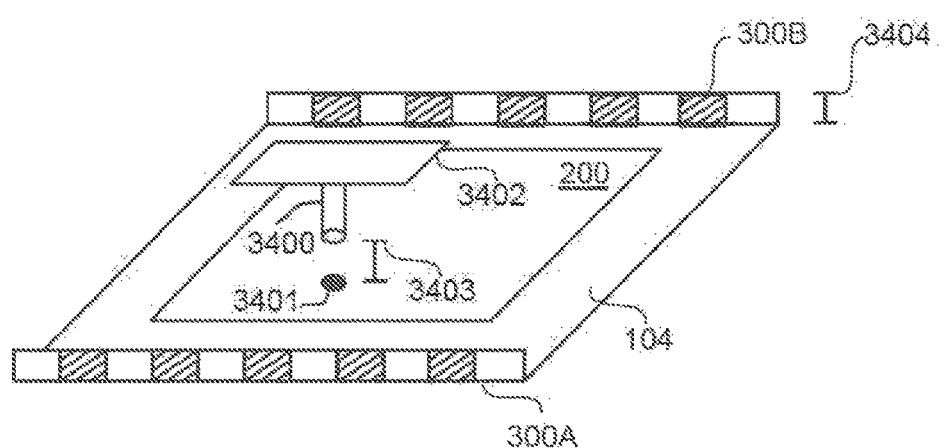
FIG. 34 is a three-dimensional, auxiliary view of an example of a suspended physical object in a hybrid playfield according to some embodiments.

In that regard, FIG. 34 is a diagram of an example of a suspended or floating physical object 3400 in hybrid playfield 104 according to some embodiments. Specifically, physical object 3400 may be a metal post used to prevent pinball 202 from traveling into a part of hybrid playfield 104 that is blocked by physical object 3400. In some cases, physical object 3400 may include a rubber ring or the like. In order to keep the assembly from moving or breaking when pinball 202 hits it, traditional mounting techniques would involve screwing directly into hybrid playfield 104 or screwing into a nut located underneath hybrid playfield 104; thus causing physical object 3400 to appear to rise up from hybrid playfield 104.

In contrast, here physical object 3400 is suspended within hybrid playfield 104 above electronic display 200, thus appearing to be floating above the surface of hybrid playfield 104. Particularly, physical object 3400 is mounted onto surface 3402, which in this case may be a portion of a playfield cover or some other non-playable area, and hangs down from surface 3402. Point 3401 indicates the location of hybrid playfield 104 where physical object 3400 would touch electronic display 200 were it long enough to do so; and gap 3403 illustrates the distance between the tip of physical object 3400 and point 3401.

There may be a number of reasons why one may want physical object 3400 to appear as if it were floating in a pinball machine. For example, it may not be possible to mount the assembly in the desired location on hybrid playfield 104. In FIG. 34, for instance, electronic display 200 makes it impossible to mount physical object 3400 assembly in the desired location on hybrid playfield 104. In other cases, components other than an electronic display may block physical object 3400.

Also, one may wish to allow certain items to pass below the assembly, closer to the surface of hybrid playfield 104. Still referring to FIG. 34, IR transducer arrays 300A and 300B may include transmitters and receivers that transmit and receive beams of light, for example, as described in FIG. 3. Thus, the height 3404 of components of the IR transducer arrays 300A and 300B may be smaller than the gap 3403 between physical object 3400 and point 3401 so as to allow IR transducer arrays 300A and 300B to communicate with each other while still blocking pinball 202 from entering a specific part of hybrid playfield 104 (e.g., the diameter of pinball 202 may be greater than gap 3403). In contrast, if physical object 3400 had been mounted directly on the surface of hybrid playfield 104, physical object 3400 would at least partially block communications between IR transducer arrays 300A and 300B, thus creating a blind spot around which tracking system 300 would be unable to track the movement of pinball 202.

There are a number of ways to mount floating pinball assemblies to provide the illusion that objects or assemblies are floating, for example, by keeping surface 3402 out of view from the player's perspective. In that regard, FIGS. 35A-C are diagrams of components configured to suspend object 3501 in hybrid playfield 104 according to some embodiments.

Figure 35A:
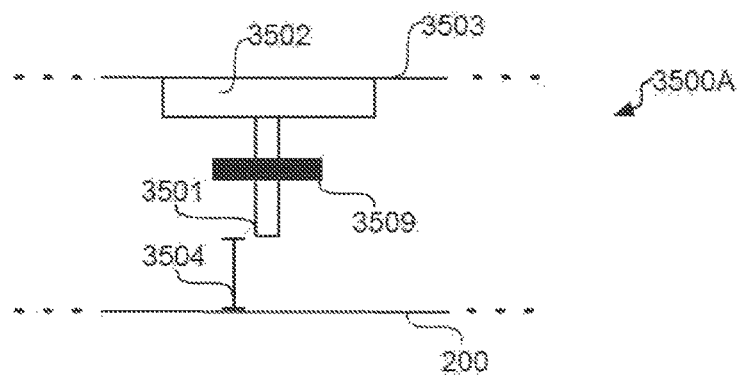
FIGS. 35A-C are side-view diagrams of components configured to suspend a physical object in a hybrid playfield according to some embodiments.
Figure 35B:
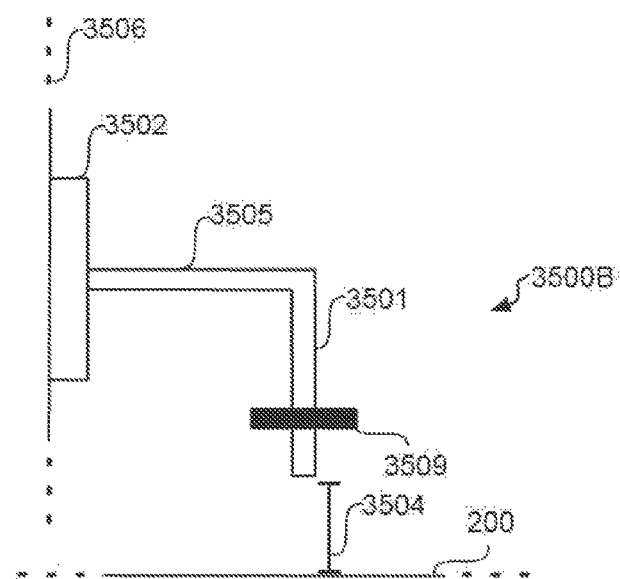
Figure 35C:
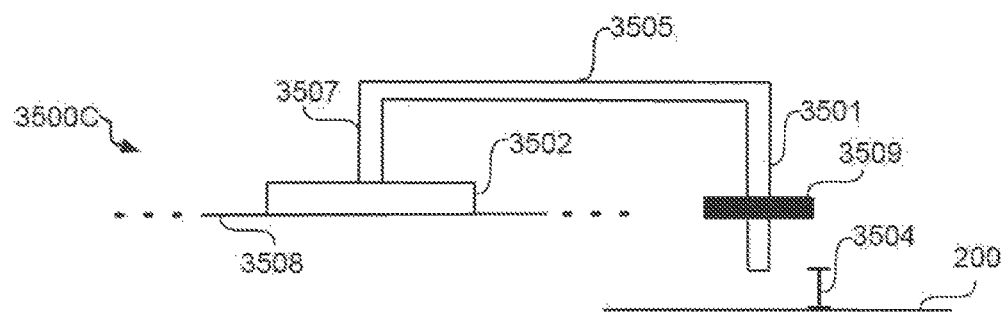

In example 3500A of FIG. 35A, mount 3502 holds object 3501 having rubber ring 3509 above electronic display 200 with gap 3504. Mount 3502 may be attached to cover 3503. In some cases, at least mount 3502 and/or cover 3503 may be made of glass, plastic, LEXAN, PLEXIGLAS, acrylic or other transparent or translucent materials so as to give the impression that object 3501 is floating. As to example 3500B of FIG. 35B, mount 3502 is vertically positioned and mounted against side wall 3506 of cabinet 101. Thus, arm 3505 may extend horizontally away from side wall 3506 to object 3501. In some cases, at least mount 3502, side wall 3506, and/or arm 3505 may be made of glass, plastic, LEXAN, PLEXIGLAS, acrylic or other transparent or translucent materials. With respect to example 3500C of FIG. 35C, mount 3502 is horizontally positioned and mounted against horizontal surface 3508 of the pinball machine distant from electronic display 200, out of sight from the player's perspective. Thus, vertical arm 3507 is coupled to horizontal arm 3505, which in turn is coupled to object 3501. Again, at least mount 3502, vertical arm 3507, and/or horizontal arm 3505 may be made of glass, plastic, LEXAN, PLEXIGLAS, acrylic or other transparent or translucent materials.

It should be noted that, in the foregoing examples, the assembly that includes object 3501 and rubber ring 3509 (i.e., the object(s) with which pinball 202 makes contact) are directly coupled to non-playable surfaces of the pinball machine (e.g., side wall 3506, etc.), that is, surfaces other than the playable surfaces that are accessible to pinball 202 during the normal course of a pinball game, and where the pinball game is actually played (e.g., including a surface immediately above electronic display 200). Moreover, the mounting is done in such a way that the items in the assembly appear to be hanging or floating from the player's perspective. In some cases, object 3501 may itself be made of glass, plastic, LEXAN, acrylic or other transparent or translucent materials, thus giving the impression that rubber ring 3509 is floating.

Floating assemblies may have few items, such as posts and rubber rings, or may be very complex with numerous items, including combinations of fixed and moving parts. For example, flipper 207A may be made into a floating assembly by inverting the typical installation and mounting it from above, similar to how the object 3501 is mounted in FIGS. 34 and 35A. Slingshot 206A may also be suspended or mounted from above.

Figure 36:
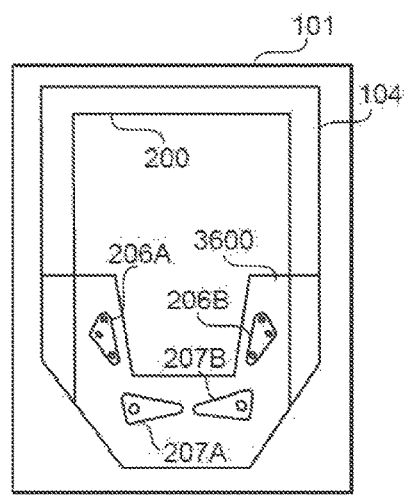
FIG. 36 is a top-view diagram of an example of a surface configured to suspend physical objects in a hybrid playfield according to some embodiments.

FIG. 36 is a diagram of an example of intermediate surface 3600 configured to suspend physical objects in hybrid playfield 104 according to some embodiments. Particularly, flippers 207A and 207B, as well as slingshots 206A and 206B, are mounted on intermediate surface 3600, which may be located at an intermediary height between a cover or lid of the machine, and the playable surface of hybrid playfield 104. In some embodiments, components of flippers 207A and 207B and/or of slingshots 206A and 206B, as well as intermediate surface 3600, may be made of transparent or translucent materials. Intermediate surface 3600 may also hang over the playable surface of hybrid playfield 104, anchored to either the side of cabinet 101 or to other items out of view from the player.

In the example of FIG. 36, electronic display 200 is embedded into hybrid playfield 104 directly below slingshots 206A and 206B and/or flippers 207A and 207B. Because traditional non-floating slingshots 206A and 206B and/or flippers 207A and 207B would need to be mounted directly to hybrid playfield 104, having electronic display 200 in the playfield makes it impractical to use the traditional non-floating assemblies. Floating slingshots 206A and 206B and/or flippers 207A and 207B provide similar characteristics to non-floating ones, but are mounted in a way that does not interfere with electronic display 200. Further, by making most of the items in the assembly out of acrylic, or other transparent or semi-transparent material, the player can still see graphics and other items being displayed on electronic display 200, even directly under the floating slingshots 206A and 206B and/or flippers 207A and 207B.

Another embodiment may contain some or all of the following items floating near one or both sides of hybrid playfield 104: posts, rings, switch targets, guide rails, and other items otherwise used in pinball machines. Once again, a floating assembly with these items may be used due to the inability to mount the items directly to hybrid playfield 104, such as in the case of the playfield containing electronic display 200 or other items. It might also be used so that they do not obstruct the path of infrared beams going across the playfield, near the playable surface of hybrid playfield 104. Such infrared beams may be used to detect the position of pinball 202 as it moves across the surface of hybrid playfield 104. Using traditional non-floating assemblies mounted into the playfield itself would not work, because assemblies would block infrared beams, rendering the tracking system at least partially useless.

In summary, floating pinball assemblies may generally operate as their non-floating pinball counterparts, but they present the illusion, from the player's perspective, that they are floating above the playable surface of hybrid playfield 104 or above other items mounted to the playfield. They therefore enable the use of features that would not otherwise be usable in a pinball machine, such as electronic display 200 embedded into hybrid playfield 104 in areas that are typically used for assembly mounting, or tracking systems whose infrared beams need to travel through areas generally populated by traditional non-floating assemblies.

In some embodiments, a plastic material may be used instead of the more traditional glass used to cover the playfield of a pinball machine. For many decades, pinball machines have included what's termed "playfield glass," which is a sheet of glass, typically tempered, that acts as the top surface of a pinball machine. The glass serves many purposes, such as helping to enclose the playfield so items in the game, such as pinballs, cannot escape the enclosure, so outside items, such as players' hands, cannot enter the enclosure, to muffle sounds coming from the machine, and many others. Traditionally, a pinball machine with a glass playfield cover has a glass lid that slides into grooves or slots in the pinball machine cabinet.

There are a number of problems associated with the use of playfield glass. For instance, the glass is susceptible to breaking, either when an objects strikes the glass or when the glass is being handled by a person, often when removing or reinstalling the glass. Tempered glass is typically used to eliminate sharp, dangerous shards of glass from injuring people when the glass breaks, but this has the unfortunate side effect of creating thousands of tiny pieces of glass that need to be cleaned up.

Another problem with glass is that its optical properties typically cause light to be reflected brightly, resulting in issues with glare. Some glass suppliers have started coating the glass with anti-glare materials to reduce this issue, but the result is a significant price increase, making the glass impractical for non-wealthy pinball machine owners. A better solution for the pinball machine enclosure is some form of a plastic material rather than glass. Examples of suitable plastic materials include, but are not limited to, LEXAN, acrylic, and PLEXIGLAS. These plastic products are each significantly stronger than glass, and therefore less susceptible to breaking. LEXAN is typically 250 times stronger than glass, and acrylic is typically 5 times stronger than glass. In either case, it is practically impossible for one of these plastics to be broken by pinball 202 in a pinball machine or by manual handling of the glass.

Further, the optical properties of these plastics are significantly different then glass. Sheets of these plastics are nearly transparent and do not typically result in reflections nearly as bright as they do with glass. For extreme cases, non-glare plastics can be used. Some non-glare plastics are regular plastics coated with a non-glare material, and other non-glare plastics are manufactured directly with non-glare properties. In both cases, non-glare plastics are typically much less expensive than non-glare glass with similar optical properties relative to light reflections and glare.

Another problem with using regular glass as the playfield cover is that it severely limits mounting options. It is difficult to use hardware (screws, pins, etc.) to secure the glass to anything else on the pinball machine's cabinet because installing the hardware introduces the strong possibility of breaking the glass. Therefore, playfield glass is usually installed on a pinball machine by sliding it into a channel and then installing a so-called lock-down bar to keep the glass from sliding back out. This unfortunately limits the possibilities designers have when designing pinball cabinets.

Plastic playfield covers eliminate these, and other problems. Installing hardware into plastic does not carry the same risk of breakage as it does with glass. Plastics may be drilled and screw-mounted much more easily than glass. Therefore, plastic playfield covers enable designers to create and build new types of pinball machine cabinets and enclosures. While a plastic playfield cover may still be slid into a channel similarly as glass, it may also be mounted to portions of the cabinet itself. Moreover, the use of plastics may, in some cases, facilitate the mounting of one or more components (e.g., slingshots, flippers, etc.) on the lid.

Figure 37:
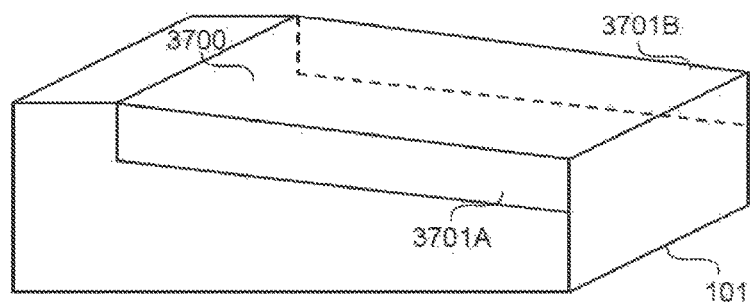
FIG. 37 is a three-dimensional, auxiliary view of a cabinet with an example of a plastic cover or lid according to some embodiments.

FIG. 37 is a three-dimensional, auxiliary view of cabinet 101 with an example of a plastic cover 3700 (e.g., lid) coupled to cabinet 101 via side rails 3701A and 3701B, according to some embodiments. Here, the entire section including plastic cover 3700 and side rails 3701A and 3701B is removable from the rest of the cabinet 101.

Figure 38:
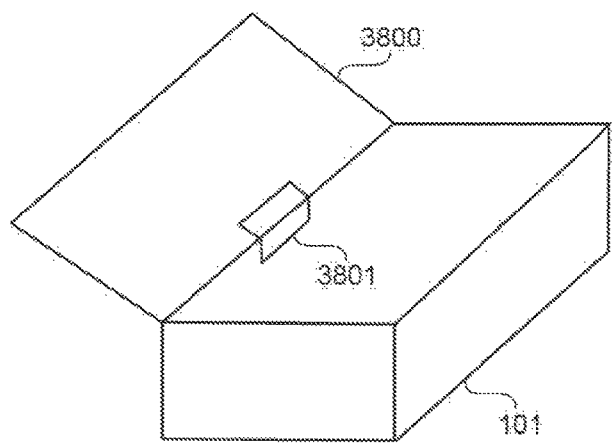
FIG. 38 is a three-dimensional, auxiliary view of a cabinet with another example of a plastic cover or lid according to some embodiments.

FIG. 38 is a three-dimensional, auxiliary view of another cabinet 101 with an example of a plastic cover 3800 (e.g., lid) coupled to cabinet 101 via lateral hinge 3801, according to some embodiments. In some cases, lateral hinge 3801 may be located in other sides of plastic cover 3800, thus allowing cabinet 101 to be opened by lifting on side of plastic cover 3800. Plastic cover 3800 may be mounted to cabinet 101 in many other ways too, including combinations of some of the previously described ways.

To summarize, the use of plastic as the material to be used for a pinball playfield cover may eliminate many of the problems associated with using glass, risk of breakage, optical reflections and glare, restrictive mounting, and without significantly reducing material costs.

Animated Playfield Components

Flippers, slingshots, targets, and other physical objects may be used as playfield components configured to physically interact with a pinball during a pinball game. For instance, referring to FIG. 2, playfield components such as flippers 207A and 207B, slingshots 206A and 206B, and trigger elements 205 may be disposed within hybrid playfield 104 and may be used to perform different gameplay operations. Although some of the examples of animated playfield components discussed below refer specifically to flippers, it should be understood that the same principles may be applied to any other of the aforementioned physical objects and components.

Generally speaking, flippers 207A and 207B may be manipulated by a player in order to prevent pinball 202 from falling in drain 208, and/or to otherwise control pinball 202. Flipper manipulation may be achieved via software, direct hardware wiring, etc. Usually, but not always, pinball machines have two flippers near the bottom of the playfield, as shown in FIG. 2. Certain machines may have fewer flippers. Other machines have additional flippers in other areas of hybrid playfield 104 to give players the ability to control pinball 202 at other locations of the playfield.

As noted in connection with FIG. 32, a flipper may pivot or rotate around a point or post to assume one of two or more predetermined positions under control of a player. When flippers are activated, typically by the player hitting a button (e.g., side control(s) 107 in FIG. 1) corresponding to the flipper, the flipper rotates into another position. The changing of the flipper's position may be used to redirect the motion of a pinball. Flippers may also be used for other gameplay operations. Examples include, but are not limited to, holding a pinball in place, allowing a pinball to bounce from one flipper to another, and stopping the motion of a pinball.

Conventional flippers are typically made out of plastic, and they are usually opaque and single-colored. Examples of conventional flipper colors include white and yellow. Similarly, other playfield components (e.g., slingshots, etc.) are also usually made of opaque materials.

In contrast, in some embodiments described herein, a flipper (or any other pinball component) may be animated, such that the visual appearance of its surface (e.g., its top surface) changes over time. For example, in some implementations, a flipper may display one color at one time and a different color at another time. In other implementations, the opacity of the flipper may change. In yet other implementations, text, shapes or other graphical objects may be drawn or rendered (or appear to be drawn or rendered) on the flipper.

Figure 39A:
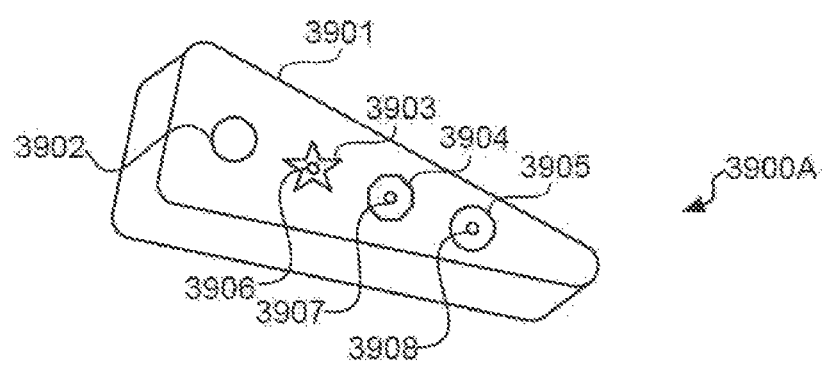
FIGS. 39A-C are three-dimensional, auxiliary views of examples of animated playfield components according to some embodiments.
Figure 39B:
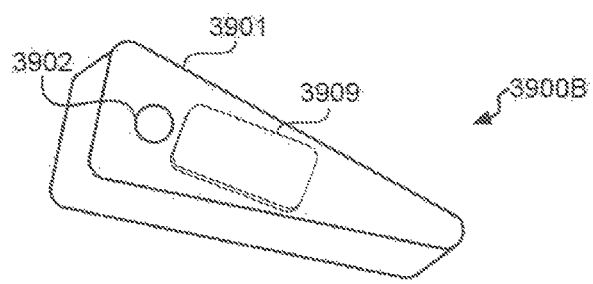
Figure 39C:
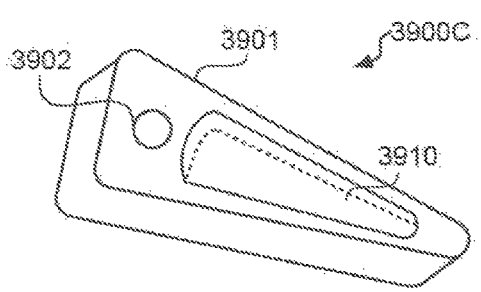

To illustrate these features, FIGS. 39A-C show three-dimensional, auxiliary views of examples of animated flippers according to some embodiments. In each of FIGS. 39A-C, flipper bat portion 3901 is configured to rotate around post 3902 during a pinball game, typically (although not exclusively) under control of a user or player.

With respect to FIG. 39A, the surface of flipper 3900A has different shapes 3903-3905 (e.g., each shape may have a different color), and each shape includes or is optically coupled to a corresponding one of light sources 3906-3908. For example, each of light sources 3906-3908 may include one or more LEDs or the like (e.g., each of light sources 3906-3908 may include a white LED or an array of red, green, and blue LEDs) built or embedded within flipper 3900A, and shapes 3903-3905 may be painted, drawn, carved, and/or inlaid (e.g., plastic or glass) onto the surface of flipper bat portion 3901. As such, when a particular one of light sources 3906-3908 is turned on (or set to a particular color), a corresponding one of shapes 3903-3905 is visible to the user or player. Non-illuminated shapes are not visible, or are at least less visible (e.g., opaque) to the player.

For flipper 3900A to be animated, different ones of light sources 3906-3908 may illuminate corresponding ones of shapes 3903-3905 at a given time. For instance, a particular pinball game may begin without any of light sources 3906-3908 being turned on—thus rendering all of shapes 3903-3905 opaque—and one or more of those light sources may be turned on later during the game, for example, in response to a game event.

For example, if all of shapes 3903-3905 have the same shape, turning each of light sources 3906-3908 on and off sequentially may give the impression that the shape is moving to different positions across the surface of flipper bat portion 3901. As another example, shape 3903 (or any other shape(s)) may be illuminated when flipper 3900A is in a down position, and shape 3905 (or any other shape(s)) may be illuminated when flipper 3900A is in an up position. As yet another example, shape 3904 (or any other shape(s)) may be caused to "blink" in response to the player reaching a predetermined point or stage in a pinball game (e.g., a bonus round, etc.). As still another example, a first one of shapes 3903-3905 may be lit when a first pinball is being played, a second one of shapes 3903-3905 may be lit when a second pinball is being played, and a third one of shapes 3903-3905 may be lit when a third pinball is being played.

In some of the foregoing examples, when a given one of shapes 3903-3905 is not said to be lit, it may be deemed to be opaque—that is, a corresponding one of light sources 3906-3908 is turned off. Moreover, it should be understood that any number of light sources 3906-3908 and shapes 3903-3905 may be used, and that a one-to-one correspondence between light sources and shapes is not needed. Also, shapes 3903-3905 may have any suitable design, and may match a theme of the game or machine.

In FIG. 39B, the surface of flipper 3900B includes display 3909. For example, display 3909 may include an LCD display similar to electronic display 200 of FIG. 2, but smaller in size to fit the surface of flipper bat portion 3901. In some embodiments, display 3909 may render one or more images during a pinball game. These images may include text, shapes or other graphical objects.

In some cases, display 3909 may provide graphical or textual instructions that teach a player certain aspects of the game such as, for instance, an instant in time when to activate flipper 3900B. This may be achieved, for example, by tracking the position of the pinball across hybrid playfield 104, determining a time at which flipper 3900B should be activated in order to prevent the pinball from falling in the drain, accounting for a player reaction time (the time it should take for the player to see an instruction and control the flipper in response), and presenting the instruction to the player via display 3909 so that he or she has a sufficient amount of time to activate flipper 3900B and hit the pinball.

In other cases, display 3909 may indicate a timer countdown, a number or credits left to the player, etc. In yet other cases, display 3909 may provide colorful animations with the goal to entertain the player during the game. For example, display 3909 may show images of fireworks, explosions, etc. matching the theme of the game or machine. In some implementations, the images displayed on display 3909 may be synchronized with images displayed on electronic display 200 such that flipper bat portion 3901 appears to be at least partially invisible to a player—that is, image(s) on display 3909 appear to be part of the image(s) on electronic display 200—when flipper bat portion 3901 is static and/or rotating around post 3902.

Here it should be noted that display 3909 may assume any suitable shape and does not need to be rectangular. Display 3909 may, in some cases, cover the entirety of the surface of flipper bat portion 3901. In other cases, display 3909 may be located inside of flipper 3900B and covered with a transparent or translucent materials. Additionally or alternatively, display 3909 may be flush with the surface of flipper bat portion 3901 so that flipper 3900B appears to be a monolithic component.

In FIG. 39C, flipper bat portion 3901 of flipper 3900C includes a hollow, transparent, and/or translucent gap 3910 surrounded by solid or opaque boundary 3911. When flipper 3900C is mounted on hybrid playfield 104, gap 3910 allows a player or onlooker to see a portion of electronic display 200 ("flipper portion") directly under gap 3910 and within boundary 3911. The flipper portion of electronic display 200 may, in some cases, comprise a set of pixels having a shape that follows the contour of boundary 3911. Hence, any of the aforementioned types of animation, or any other animation, although actually rendered on electronic display 200 below flipper 3900C, may appear to an onlooker as if rendered on the surface of flipper 3900C.

When flipper bat portion 3901 rotates, gap 3910 moves relative to electronic display 200. In some implementations, by periodically or continually tracking the motion and/or activation of flipper 3900C, graphical renderings in the flipper portion of electronic display 200 may be made to appear to move in a corresponding fashion, thus matching or tracking the movement of gap 3910. As such, different physical portions of electronic display 200 (i.e., different sets of pixels) may provide the surface animation of flipper 3900C when flipper 3900C moves.

For instance, when flipper 3900C is in a first position, the flipper portion of electronic display 200 may consist of a first set of pixels corresponding to the portion of electronic display 200 that a player sees through gap 3910, and that appears (to that player) to be at the surface of flipper 3900C. When flipper 3900C is in a second position, the flipper portion of electronic display 200 may correspond to a second set of pixels that a player then sees. Upon flipper 3900C's return to the first position, the flipper portion of electronic display 200 may change to again encompass the first set of pixels. In some cases, any number of positions may be interpolated so that flipper portions encompass different sets of pixels at different times. Furthermore, at any given time, portions of electronic display 200 that are not directly under gap 3910 at that time may continue to render other images (e.g., background graphics, etc.) that are not intended to appear as if part of the surface of flipper 3900C.

Players of different heights and/or body types may see hybrid playfield 104 at different angles, and therefore may have different perspectives on images seen through gap 3910. In some embodiments, a camera or other sensor (e.g., mounted on vertical portion 103, etc.) may be coupled to interface board 402 and may be configured to identify a player's height and/or to track the location of a player's head and/or eyes. Accordingly, the location of a flipper portion of electronic display 200 under gap 3910 that displays images appearing to be rendered on the surface of flipper 3900C may be adjusted to accommodate the player's vision, in some cases in real time, depending upon the player's height, distance from hybrid playfield 104, head positioning, and/or eye positioning, such that the images produced by the flipper portion of electronic display 200 during a game appear to be directly under flipper 3900C, regardless of perspective.

Additionally or alternatively, the level (roll, pitch, and/or yaw) of hybrid playfield 104 may be used when determining where to position the flipper portion of electronic display 200. To that end, one or more accelerometers used as part of the automatic level detection systems and methods described in more detail below may be used here in order to adjust the location of flipper portions of electronic display 200, and so that the images produced by those flipper portions appear to be directly under flipper 3900C, regardless of the angle(s) with which pinball machine 100 and/or hybrid playfield 104 is set up.

In various embodiments, shapes, texts, and/or colors that represent the animations may either be drawn or displayed on the flipper themselves, or may be drawn or displayed in such a way that they appear to be in or on the flippers, even if those animations are not in or on the flippers. In an embodiment, colors that represent animations may be created by LEDs that are placed inside of the flippers or whose light is directed onto the flippers. In another embodiment, small screens such as LCD screens may be attached to the flippers and animations may be drawn or displayed on the screens. In another embodiment, animations may be projected onto the flippers from another source, such as a video projector. In yet another embodiment, flippers may be transparent or semi-transparent, and animations may be drawn or displayed on a screen or screens that are underneath the flippers.

Figure 40:
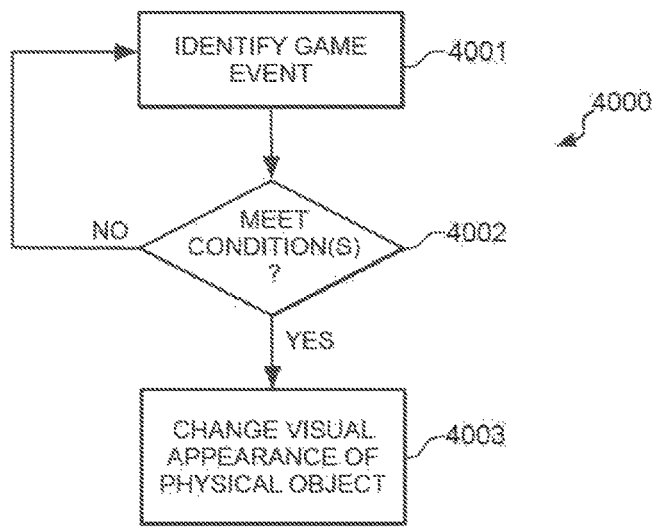
FIG. 40 is a flowchart of an example of a method of animating a playfield component according to some embodiments.

FIG. 40 is a flowchart of an example of method 4000 of animating a playfield component. In some embodiments, method 4000 may be performed, at least in part, by computing system 401 executing software program 600 in cooperation with electronic display 200, interface board 402, and/or tracking system 300. At block 4001, method 4000 includes identifying a game event. Examples of events include, but are not limited to, a game having not yet begun, a game having started, a number of credits being available, a stage or a predetermined point in a game being reached, a particular target being hit, a number of pinballs having been used or being available, a number of points being earned, a position of a physical object in the playfield, a speed or direction of the physical object, etc.

At block 4002, method 4000 includes determining whether the event meets a predetermined condition. For example, the position of a physical object may have changed by an amount meeting a threshold value, a minimum number of points may have been earned, and so on. If so, then at block 4003 method 4000 includes changing the visual appearance and/or animating a physical object within the playfield in a preprogramed manner. Otherwise, method 4000 returns to block 4001.

The shapes and colors that comprise animations on physical objects can change over time, often as a result of changing circumstances in gameplay. In some embodiments, text may be displayed on the flipper indicating the shot at which a player should aim, or counting down a timer, or any number of other possibilities. In other embodiments, the animations may appear as lightning bolts, morphing shapes, moving characters, or any number of other possibilities. In yet other embodiments, animations may include all of the previously described items.

The foregoing examples represent but only a few of the numerous ways the flippers or other playfield components may be animated using the systems and method described herein. The term animation applies broadly to the items being displayed on the playfield components that change over time, whether simple colors, shapes, texts, or other graphical objects.

Automatic Level Detection

The manner in which a pinball interacts with the playfield and/or physical objects on the playfield in a pinball machine during a game may be dependent upon the level at which the machine rests. The front-to-back level of a pinball machine, referred to herein as the pitch and illustrated in FIG. 1, determines the speed at which one or more pinballs roll up or down the playfield when not subject to forces other than natural forces imposed by gravity, friction, and/or air resistance. The side-to-side level of a pinball machine, referred to herein as the "roll" and also shown in FIG. 1, determines to which side one or more pinballs rolling on the playfield will be pulled when not under any force other than the aforementioned natural forces. Although the "yaw" of the machine, further shown in FIG. 1, does not often directly affect gameplay, it may provide additional insight into how a pinball machine is installed or whether it is being moved.

Pinball machine manufacturers may sometimes provide instructions as to the pitch and roll levels with which the machine should be set up for optimal play. The roll is typically, but not always, 0 degrees, which means that the side-to-side surface of the playfield is parallel to the surface of the earth or exactly perpendicular to the force of gravity exerted by the earth. Having a side to side level of 0 degrees means any ball rolling on the playfield will not be pulled to either side by the force of the earth's gravity.

Generally speaking, assuming that the ground surface upon which pinball machine 100 sits is flat, the roll of pinball machine 100 is 0 degrees so long as leg 102A has the same length of leg 102B, and leg 102C has the same length as leg 102D, resulting in cabinet 101 resting parallel to the earth (also assuming that the cabinet is the same height on each side and, mounting holes or brackets are provided such that the legs are attached to the cabinet in the same spot on each side). The pitch of pinball machine 100 varies from machine to machine, but it is approximately 6.5 degrees for most pinball machines manufactured in the last twenty years. A pitch of 6.5 degrees means the back of hybrid playfield 104 is taller than the front of the hybrid playfield 104 by an amount that makes the angle between the surface of the earth and the surface of the playfield 6.5 degrees. In FIG. 1, the pitch of the pinball machine 100 is determined by the lengths of the legs 102A, 102B, 102C, 102D. If back legs 102A, 102B were much longer than front legs 102C, 102D, the pitch would be greater than if back legs 102A, 102B had approximately the same length/height as front legs 102C, 102D.

Setting up a pinball machine to a specific roll and to a specific pitch has traditionally been a very manual process. Some pinball machine manufacturers include small bubble levels mounted onto machines to aid their owners in setting up the pitch of the machine; although this mechanism does not aid with side-to-side, "roll" leveling. Whether an installer setting up the machine uses the integrated bubble levels or another device, such as his or her own bubble levels, to measure the side to roll level and pitch, setting up the roll and pitch is an iterative and manual process. Generally, a person makes an adjustment to the leveling of the machine, visually checks the bubble level or other device to see the current angle of the side-to-side level and/or pitch, and repeats the process until the machine is set up as desired.

Because the side-to-side and front-to-back levels of a machine have a direct impact on how pinballs roll on the surface of the playfield, the roll and pitch may also very likely affect whether or not a player would want to play the machine. If the roll is non-zero, pinballs will be pulled to one side of the other by the force of gravity, making the game undesirable to play. If the pitch is significantly more or less than the recommended pitch, pinballs will likely roll up and down the playfield far too fast or far too slow, thus also making the game undesirable to play. Moreover, players may not realize that the roll and/or pitch of the machine is not set properly until they start playing the game.

To address these, and other problems, systems and methods described herein provide automatic level detection in pinball machines. In some embodiments, a pinball machine, through a combination of sensors and software code configured to process sensor data, may automatically identify the roll, pitch, and/or yaw at which it rests. In some cases, a pinball machine may provide feedback, whether visual or audible, to the person setting it up (such as an installer) in order to make the setup process less iterative and less manual. Additionally or alternatively, a pinball machine with automatic level detection may be configured to inform prospective players the roll, pitch, and/or yaw of the machine so that they know that information before deciding whether to play the machine. Additionally or alternatively, automatic level detection may be used to detect force applied to the pinball machine by a player.

In some embodiments, one or more accelerometers may be provided within (or mounted onto) a pinball machine by its manufacturer, or may be installed in the machine by a third-party after manufacturing. Referring to FIG. 4, these one or more accelerometers may be communicatively coupled to interface board 402 as one or more of sensor(s) 404. As such, computing system 401 may be configured to retrieve values measured by the accelerometer(s). Also, in some embodiments, the accelerometer(s) may be mechanically coupled to hybrid playfield 104, as opposed to cabinet 101, in order to provide a more accurate reading of actual game conditions.

In some implementations, an accelerometer configured to measure the force of gravity in one, two, or three axes may measure the roll, pitch, and/or yaw of the pinball machine to which it is coupled. If two or more single-axis accelerometers are used, each accelerometer may measure the force of gravity on a respective axis, and therefore measure either the roll, pitch, or yaw the machine. For example, two single-axis accelerometers may be arranged orthogonally with respect to each other to measure the roll and pitch of a machine. A third single-axis accelerometer may be used to measure the yaw of the machine. Conversely, a single two- or three-axis accelerometer may be used.

Accelerometers suitable for use as sensor(s) 404 may include piezoelectric, piezoresistive, and/or capacitive components. In some cases, MicroElectro-Mechanical System (MEMS) accelerometers may be used that include an electronic package having cantilever beam(s) with a proof or seismic mass, or the like. As the proof mass is deflected from its neutral position due to the influence of external accelerations, the capacitance between a set of beams changes in a manner proportional to the deflection of the mass, which in turn may be correlated to an acceleration and/or ultimately to the orientation of the pinball machine. More generally, however, the exact device or devices used to measure the leveling of a pinball machine may vary.

Figure 41:
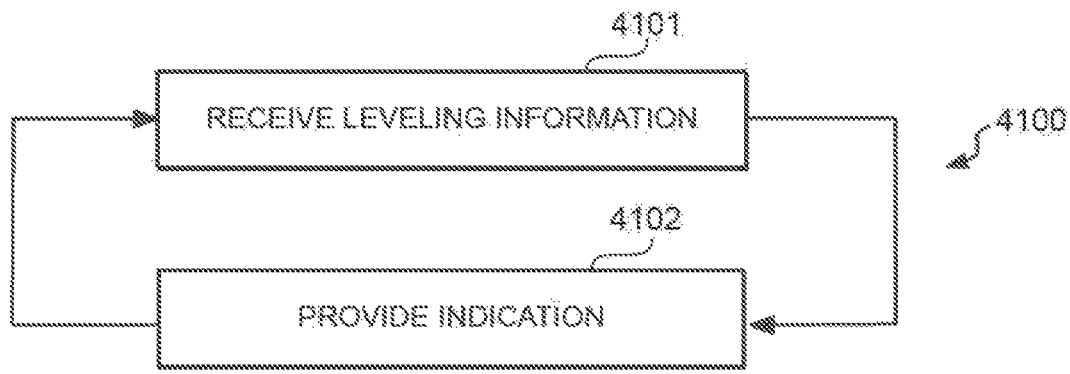
FIG. 41 is a flowchart of an example of a method of processing leveling information according to some embodiments.

FIG. 41 is a flowchart of an example of method 4100 of processing leveling information. In some embodiments, method 4100 may be performed, at least in part, by computing system 401 executing software program 600 in cooperation with interface board 402 and/or sensor(s) 404. At block 4101, method 4100 includes receiving leveling information, for example, from one or more accelerometers used as sensor(s) 404. Then, at block 4102, method 4100 includes providing an indication of the leveling information to an installer, player, prospective player, etc.

In some implementations, leveling information may be rendered on electronic display 200. In other implementations, leveling information may be converted to audio signals and played through speakers (e.g., a human voice, beeps, etc.). In yet other implementations, leveling information may be displayed on electronic display 200 and converted to audio signals. In still other implementations, leveling information may be provided via other components within hybrid playfield 104. For example, in some cases, a surface of a component (e.g., an animated flipper) may change its visual appearance to convey the leveling information.

In other embodiments, other forms of communication including, but not limited to, network-based communication via email and/or text messages, may be used by computing system 401 to convey leveling measurement data. A pinball machine configured to communicate roll-pitch and/or yaw information may greatly help a person or entity in adjusting the leveling of the machine. A person manually adjusting the side-to-side level, for instance, can continue making adjustments until the audio signal representing the roll of the machine indicates the desired leveling has been achieved.

Moreover, a pinball machine with automatic level detection may also be configured to inform prospective players of the roll and/or pitch of the machine before the prospective players decide to play. By displaying measurements on a display device, by playing audio representing these measurements through speakers, or by providing the measurement information to the prospective player through network communications, the player can understand what the measurements are before deciding whether or not to play a game on that machine.

In some embodiments, software program 600 may be configured to disallow a player from playing if the roll and/or pitch of the pinball machine is outside of certain constraints. For example, a pinball machine may be configured to disallow a prospective player from playing if the side-to side-level is more than 1 degree off of 0. A pinball machine may also be configured to disallow somebody from playing if the pitch is more than 2 degrees off of a recommended pitch (e.g., 6.5 degrees).

Furthermore, a pinball machine with automatic level detection may be configured to inform its owner or operator when the roll or pitch of the machine is not ideal. For instance, the machine may notify the owner in any number of ways, such as by displaying a message on electronic display 200 or by playing an audio message through speakers. A network-enabled pinball machine may also notify the owner or operator by sending an email or text message or by some other form of electronic message.

In some embodiments, the automatic level detection systems and methods described above may be used to determine when a player is physically moving the pinball machine. When a player applies a sideways force to the machine, the measured roll level changes briefly, allowing the machine to identify the force being applied by the player. The same is true for front-to-back forces briefly affecting the pitch, and up-and-down forces affecting the yaw. A machine using a two or more axis accelerometer for its automatic level detection, or multiple single-axis accelerometers, may be configured to sense player-applied forces in any or all directions. By identifying these forces, the pinball machine may offer gameplay features that relate the player-created forces to gameplay objectives. Oftentimes a player may apply forces to the machine in an attempt to manipulate a pinball or other object on the machine.

Figure 42:
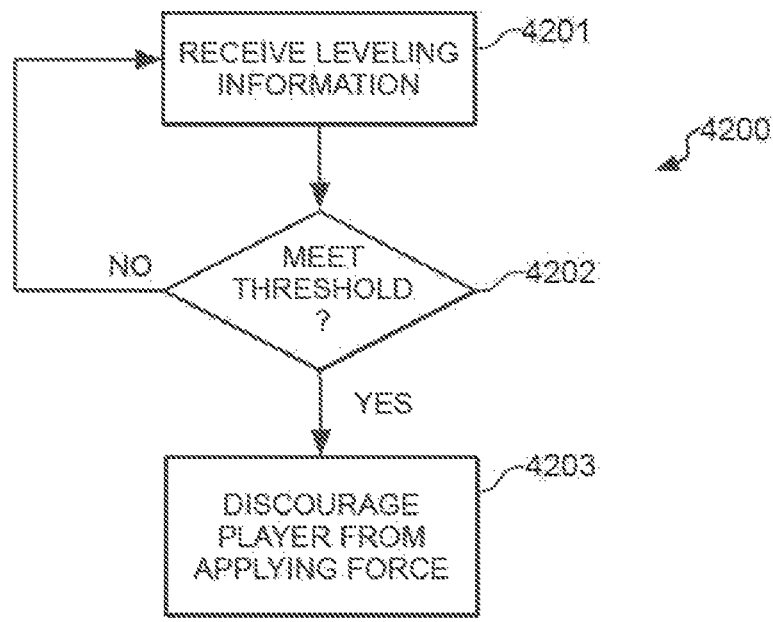
FIG. 42 is a flowchart of an example of a method of discouraging a player from applying force to a pinball machine according to some embodiments.

FIG. 42 is a flowchart of an example of method 4200 of discouraging a player from applying force to a pinball machine. In some embodiments, method 4200 may be performed, at least in part, by computing system 401 executing software program 600 in cooperation with interface board 402 and/or sensor(s) 404. At block 4201, method 4200 includes receiving leveling information, for example, from one or more accelerometers. At block 4202, method 4200 includes determining whether the leveling information meets one or more threshold values. For instance, block 4202 may determine whether a rate and/or magnitude of change of the leveling information meets the threshold value(s). If so, then at block 4203 method 4200 includes discouraging the player from applying force to the pinball machine. Otherwise, method 4200 returns to block 4201.

In some implementations, in order to discourage the player from applying force to the pinball machine, block 4203 may include deducting points, reducing the number of pinballs available, taking away credits, increasing the speed of a countdown timer, reducing the length of a game, ending the game early, making it harder for the player to complete an objective (e.g., presenting additional targets to shoot), disabling a control (e.g., a flipper), etc. In some cases, by negatively affecting gameplay in a suitable manner, method 4200 may discourage the player from physical moving the pinball machine (and potentially damaging the machine). In other implementations, in order to discourage the player from applying force to the pinball machine, block 4203 may include acknowledging, via audio, video, or some other interaction with the player, that the machine knows the player is applying forces to the machine. In yet other implementations, block 4203 may include notifying an owner or operator (e.g., via network communications) that force is being applied to the machine.

Figure 43:
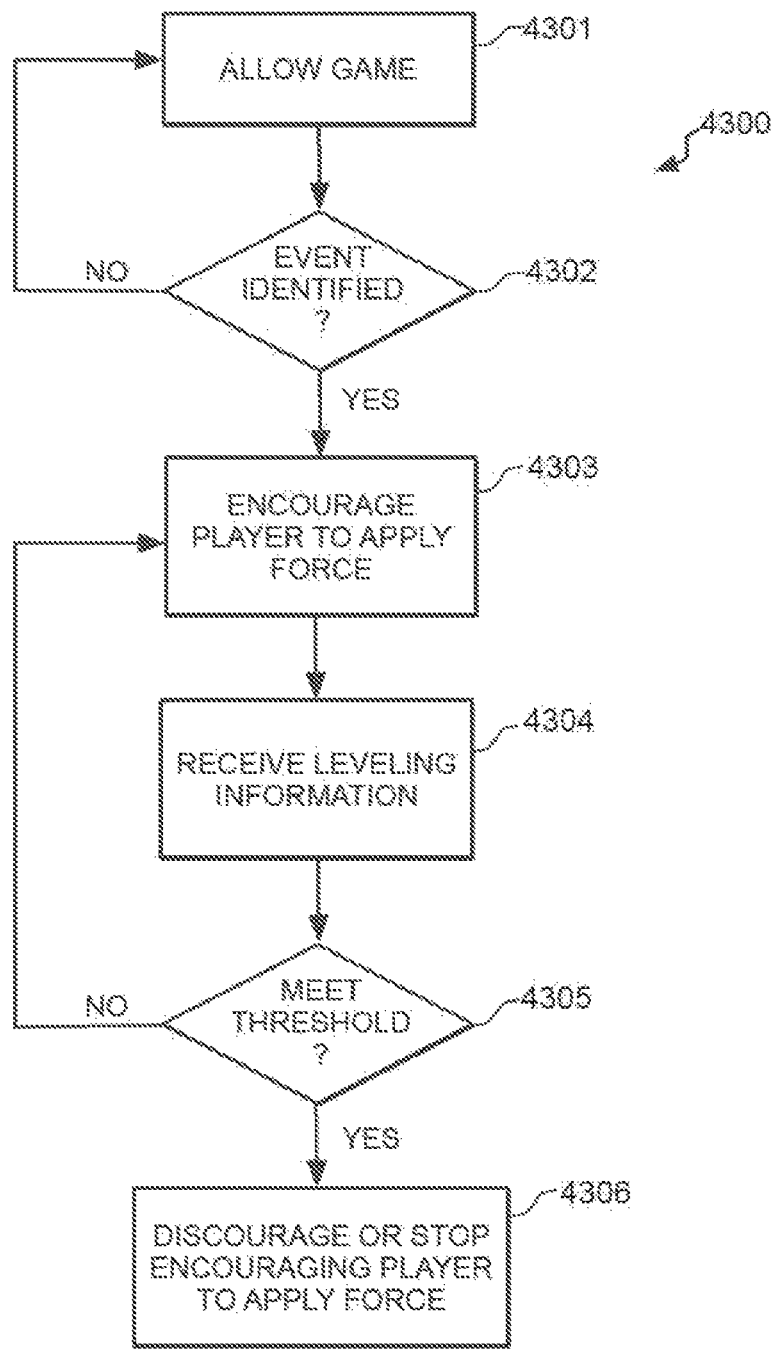
FIG. 43 is a flowchart of an example of a method of encouraging a player to apply force to a pinball machine according to some embodiments.

FIG. 43 is a flowchart of an example of method 4300 of encouraging a player to apply force to a pinball machine. In some embodiments, method 4300 may be performed, at least in part, by computing system 401 executing software program 600 in cooperation with interface board 402 and/or sensor(s) 404. At block 4301, method 4300 may include allowing a game to be played. At block 4302, method 4300 may include identifying a game event. Again, examples of game events include, but are not limited to, a stage or a predetermined point in a game being reached, a particular target being hit, a number of pinballs having been used or being available, a number of points being earned, a position of a physical object in the playfield, a speed or direction of the physical object, etc. If not, method 4300 returns to block 4301. Otherwise, method 4300 proceeds to block 4303.

At block 4303, method 4300 includes encouraging a player to apply force to the pinball machine. For example, method 4300 may include providing an indication via audio, video, etc., that the player should apply external forces to the machine. At block 4304, method 4300 includes receiving leveling information, for example, from one or more accelerometers. At block 4305, method 4300 includes determining whether the rate and/or magnitude of change of the leveling information meets threshold value(s). If so, method 4300 may reward the player by awarding point, credits, or extra pinballs, or by rendering a virtual object, stop rendering the virtual object, or animating the virtual object on an electronic display (e.g., shaking a fruit out of a tree, shaking a box off of a table, etc.). The method may then proceed to block 4306. Otherwise, if the rate and/or magnitude of change of the leveling information does not meet the threshold value(s), method 4300 returns to block 4303 where the player is again encouraged to apply forces, or greater forces, to the machine.

At block 4306, method 4300 includes discouraging or stop encouraging the player from applying forces to the machine. For example, once a game objective has been reached, method 4300 may warn or notify the player to stop moving the machine. Additionally or alternatively, if the rate and/or magnitude of change of the leveling information meets another (higher) threshold value(s), thus indicating that the player is making use of excessive force that can damage the machine, method 4300 may begin penalizing the player (e.g., by deducting points, available pinballs left, etc.) if he or she continues to move the machine.

In some embodiments, automatic level detection may also help handicap machines in multi-machine tournaments. For example, assume a tournament using two machines with otherwise the same pinball game, except that one is set up with a 6-degree pitch and the other with an 8-degree pitch. In this case, the 8-degree machine will have a faster playfield and therefore will be more difficult to play. Similarly, different rolls may also cause one machine to be harder to play than the other. Accordingly, in some cases, game software executed by computing system 401 may take the machine's automatically detected level into account to adjust scoring or some other aspect of gameplay. For instance, in the foregoing example, if it is determined that a given target in the 8-degree machine is twice as hard to hit than a corresponding target in the 6-degree machine, the 8-degree machine may be set up to award twice the amount of points than the 6-degree machine when that target is hit. Alternatively, the 6-degree machine may be set up to award half the amount of points than the 8-degree machine when the target is hit. In other cases, the 8-degree machine may allow a player more time to complete an objective than the 6-degree machine, the 8-degree machine may provide an additional bonus round or pinball(s) than the 6-degree machine, etc.

Also, still referring to multi-machine tournaments, the automatic level detection techniques discussed herein may be particularly useful when the machines are set up in different geographical or physical locations (e.g., connected via a network) so that an organizer can determine whether the various machines are set up similarly.

Pinball machines with hybrid playfields have been described. In an illustrative, non-limiting embodiment, a method may include electronically determining a physical property of a physical object, where the physical object is allowed to move above a display disposed within a playfield of a pinball machine, and rendering a virtual object on the display in response to an evaluation of the physical property. For example, the physical object may include at least one of: a ball, a flipper, a slingshot, a kicker, a bumper, a target, a plunger, a hole, a saucer, a spinner, a gate, a switch, a stopper, a ramp, or a magnet. Moreover, the physical property may include at least one of: a position of the physical object on the playfield, a speed of the physical object over the playfield, or a direction of movement of the physical object across the playfield.

In some implementations, the evaluation of the physical property may include at least one of: a determination that the position of the physical object matches a predetermined position on the playfield, a determination that the speed of the physical object matches a predetermined speed over the playfield, or a determination that the direction of movement of the physical object matches a predetermined direction across the playfield. Additionally or alternatively, the evaluation of the physical property may include at least one of: a determination that the position of the physical object does not match a predetermined position on the playfield, a determination that the speed of the physical object does not match a predetermined speed over the playfield, or a determination that the direction of movement of the physical object does not match a predetermined direction across the playfield.

In some cases, rendering the virtual object may include modifying a previously-rendered virtual object to simulate a physical interaction between the physical object and the previously-rendered virtual object that results in the virtual object. Also, the simulated physical interaction may be of a magnitude proportional to a value of the physical property. For example, modifying the previously-rendered virtual object may include at least one of: moving the previously-rendered virtual object between different positions on the display, changing a shape of the previously-rendered virtual object, changing a color of the previously-rendered virtual object, or changing a size of the previously-rendered virtual object.

In another illustrative, non-limiting embodiment, a pinball machine may include a memory configured to store instructions and a processing circuitry operably coupled to the memory, the processing circuitry configured to execute the instructions to cause the pinball machine to: render a virtual object on an electronic screen, the electronic screen disposed within a playfield of the pinball machine, and change an aspect of a physical object located above the electronic screen and within the playfield in response to the virtual object exhibiting a predefined property.

In some cases, changing the aspect of the physical object may include simulating a physical interaction between the physical object and the virtual object. The physical interaction may be configured to affect progress of a game played on the pinball machine. For example, the aspect of the physical object may include at least one of: shape of the physical object, a position of the physical object, a speed of the physical object, or a direction of movement of the physical object, a light emitted by the physical object, a color of the physical object, or a sound emitted by the physical object. Moreover, the predefined property may include at least one of: a distance between the virtual object and the physical object, a speed of the virtual object relative to the physical object, or a direction of movement of the virtual object relative to the physical object.

In some implementations, the processing circuitry may be configured to execute the instructions to cause the pinball machine to, in response to changing the aspect of the physical object, modify the virtual object. For instance, the property of the virtual object may include at least one of: a shape of the virtual object, a color of the virtual object, a texture of the virtual object, a size of the virtual object, a position of the virtual object, a speed of the virtual object, or a direction of movement of the virtual object.

In yet another illustrative, non-limiting embodiment, a non-transitory computer-readable storage medium may have program instructions stored thereon that, upon execution by a processor within a pinball machine, cause the pinball machine to: provide a list of one or more software applications via an electronic display arranged within the playfield of the pinball machine, allow a user to select one of the one or more software applications, and execute the selected software application. For example, the list of one or more software applications may include one or more distinct pinball games.

In some cases, the one or more distinct pinball games may be stored in a library remotely located with respect to the pinball machine. Also, the pinball machine may allow a first user to play a portion of a first pinball game, it may allow a second user to play a portion of a second pinball game after having allowed the first user to play the first portion of the first pinball game, and it may allow the first user to play a subsequent portion of the first pinball game after having allowed the second user to play the portion of the second pinball game.

Pinball machines having physical objects within hybrid playfields have been described. In an illustrative, non-limiting embodiment, a device may include a physical object coupled to an actuator via a flexible link, the physical object configured to directly or indirectly interact with a pinball within a playfield of a pinball machine under control of the actuator. The actuator may include a motor or plunger having an electromagnetic coil or solenoid, and the flexible link may include a wire, rope, or cable. The device may also include a tensioning device configured to modify a tension of the link.

In some implementations, the physical object may be a flipper or a slingshot. The flipper or slingshot may be coupled to a portion of the pinball machine other than one or more playable surfaces accessible to the pinball during a pinball game. Additionally or alternatively, the flipper or slingshot may be suspended above an electronic display within the playfield. Additionally or alternatively, the actuator may be configured to move the physical object in response to a virtual object being present or absent from the electronic display during a pinball game.

In another illustrative, non-limiting embodiment, a pinball machine may include a physical object configured to directly or indirectly interact with a pinball during a pinball game, the physical object coupled to an area within a playfield of the pinball machine other than a playable surface accessible to the pinball during a pinball game, the physical object suspended above the playable surface. The physical object may include a post, flipper, slingshot, target, or rail. Further, the physical object may be coupled to the area of the playfield via a component selected from the group consisting of: an arm, mount, plate, and bracket.

In some cases, the playable surface may be an approximately horizontal surface having an electronic display visible to a player during the pinball game, the electronic display configured to render one or more virtual objects in response to a movement of the physical object. Also, the component may include a transparent or translucent portion located above the electronic display. Additionally or alternatively, the area within the playfield to which the physical object is coupled may include an intermediate surface approximately parallel to the playable surface, the intermediate surface including a transparent or translucent portion located above the electronic display.

The pinball machine may also include a tracking system having one or more transducers configured to determine a location, speed, or direction of movement of the pinball, the component configured to position the physical object above the one or more transducers. The area within the playfield to which the physical object is coupled may include a playfield cover or lid, and wherein the playfield cover or lid is plastic. The pinball machine may also include an actuator coupled to the physical object via a flexible link, the physical object configured to move within the playfield under control of the actuator.

In yet another illustrative, non-limiting embodiment, a pinball machine may include a plastic playfield cover configured to cover a playfield of the pinball machine, the plastic playfield cover configured to provide a player with access to one or more physical objects within the playfield. The pinball machine may also include a hinge configured to couple the plastic playfield cover to a cabinet of the pinball machine. The pinball machine may further include a physical object and an actuator coupled to the physical object via a flexible link, the physical object configured to directly or indirectly interact with a pinball during a pinball game by moving within the playfield under control of the actuator, the physical object coupled to an area within the playfield other than a playable surface accessible to the pinball during a pinball game, the physical object suspended above the playable surface.

Pinball machines with configurable playfields are described. In an illustrative, non-limiting embodiment, a method may include detecting an event during a game played at least in part over a surface of a playfield in a pinball machine, the playfield having a first and a second playfield portions, the first and second playfield portions having two outermost lateral edges between which the game takes place; and, in response to the event, electronically activating a playfield reducer located between the first and second portions, the playfield reducer configured to extend between the two outermost lateral edges of the playfield portions in a manner sufficient to prevent the pinball from traveling between the first and second playfield portions. For example, the first playfield portion may have an electronic screen configured to display one or more virtual elements capable of interacting with a pinball, and the second playfield portion may have one or more elements configured to return the pinball to the first playfield portion.

In some implementations, detecting the event may include determining that one or more software-based conditions is met, the software-based conditions selected from the group consisting of: reaching of a predetermined score, failing to reach the predetermined score, reaching of a predetermined game stage, passage of a predetermined amount of time, and user selection. Also, detecting the event may include electronically determining a physical property of a physical object, the physical object allowed to move above the electronic screen; and determining that the physical property matches one or more event conditions.

In some cases, the physical object may be selected from the group consisting of: the pinball, a flipper, a slingshot, a kicker, a bumper, a target, a plunger, a hole, a saucer, a spinner, a gate, a switch, a stopper, a ramp, or a magnet. Moreover, the physical property may be selected from the group consisting of: a position of the physical object on the first playfield portion, a speed of the physical object over the first playfield portion, and a direction of movement of the physical object across the first playfield portion.

The playfield reducer may include a barrier, and activating the playfield reducer may include causing the barrier to rise above a surface of the first playfield portion. Additionally or alternatively, the playfield reducer may include a hole, and activating the playfield reducer may include uncovering the hole. Additionally or alternatively, the playfield reducer may include a combination of one or more barrier elements and one or more hole elements, and activating the playfield reducer may include causing the one or more barrier elements to rise above a surface of the first playfield portion and uncovering the one or more hole elements. In some cases, a first element of the playfield reducer may be located in the first playfield portion, and a second element of the playfield reducer may be located in the second playfield portion.

In another illustrative, non-limiting embodiment, a pinball machine may include a main playfield portion having a set of one or more pinball components disposed therein, the set of one or more pinball components configured to interact with a pinball during a pinball game, the main playfield portion further configured to receive any of a plurality of interchangeable modular playfield portions, each of the plurality of interchangeable modular playfield portions having different sets of one or more pinball components. The pinball machine may also include a memory configured to store instructions; and processing circuitry operably coupled to the memory, the processing circuitry configured to execute the instructions to cause the pinball machine to: identify one of a plurality of interchangeable modular playfield portions; and change an aspect of the pinball game based upon the identification.

For example, to identify the interchangeable modular playfield portion, the processing circuitry may be configured to execute the instructions to cause the pinball machine to detect that the interchangeable modular playfield portion has been coupled to the pinball machine. Also, to change the aspect of the pinball game, the processing circuitry may be configured to execute the instructions to cause the pinball machine to retrieve predetermined game settings from a database, the predetermined game settings configured to enable the pinball machine to control the one or more different components. In some cases, the database may be accessible to the pinball machine over a computer network.

Moreover, the one or more pinball components may be reconfigurable by a user, and the processing circuitry may be further configured to execute the instructions to cause the pinball machine to detect a configuration of the one or more different components and change the aspect of the pinball game based upon the detection.

In yet another illustrative, non-limiting embodiment, a non-transitory computer-readable storage medium may have program instructions stored thereon that, upon execution by a processor within a pinball machine, cause the pinball machine to: identify one of a plurality of interchangeable modular playfield portions, each of the plurality of interchangeable modular playfield portions having one or more different components configured to interact with a pinball during a pinball game, the identified interchangeable modular playfield portion having been coupled to the pinball machine by an end-user; and monitor or control at least one of the different components during the pinball game. In some cases, the at least one component may include a playfield reducer configured to prevent the pinball from traveling between a main playfield portion and the identified interchangeable modular playfield portion.

Pinball machines with animated playfield components and automatic level detection have been described. In an illustrative, non-limiting embodiment, a method may include changing a visual appearance of a surface of a physical object within a pinball machine, the physical object configured to physically interact with a pinball during a pinball game. For example, the physical object may include a flipper, slingshot, or target. Also, changing the visual appearance of the surface may include causing the surface to convey at least one of: a text, a graphic, or a color.

In some implementations, the surface may include a display, and changing the visual appearance of the surface may include rendering an image on the display. In other embodiments a playable surface accessible to the pinball during the pinball game may include a display, the physical object may be located above the display, the surface of the physical object may include a transparent or translucent portion, and changing the visual appearance of the surface of the physical object may include rendering an image on the display, the image being visible to a player through the transparent or translucent portion.

As such, the method may include changing the visual appearance of the surface while the physical object moves during the pinball game or over a time interval. In some cases, the surface may have a first physical appearance when a given pinball is being played, and a second physical appearance when a subsequent pinball is being played. Moreover, changing the visual appearance of the surface may include conveying leveling information, the leveling information being detected by one or more accelerometers coupled to the pinball machine.

In another illustrative, non-limiting embodiment, a pinball machine may include a memory configured to store instructions and processing circuitry operably coupled to the memory, the processing circuitry configured to execute the instructions to cause the pinball machine to receive leveling information detected by one or more accelerometers, the leveling information selected from the group consisting of: pitch, roll, and yaw. The processing circuitry may be further configured to execute the instructions to cause the pinball machine to provide at least one of: a textual, graphical, or audio indication of the leveling information. In some cases, the indication may be provided to a computing device remotely located with respect to the pinball machine, at least in part, via a telecommunications network.

For instance, the instructions may be executable as part of a setup procedure of the pinball machine, and the indication may be provided to an installer. Additionally or alternatively, the indication may be provided to a prospective player of the pinball machine.

In some implementations, the processing circuitry may be further configured to execute the instructions to cause the pinball machine to allow a player to start a game in response to the leveling information meeting a threshold value. Additionally or alternatively the instructions may be executable as part of a pinball game, and the one or more accelerometers may be configured to determine that a player has physically moved the pinball machine. For instance, the one or more accelerometers may be coupled to a playfield surface of the pinball machine.

In yet another illustrative, non-limiting embodiment, a non-transitory computer-readable storage medium may have instructions stored thereon that, upon execution by a processor within a pinball machine, cause the pinball machine to periodically or continuously receive leveling information detected by one or more accelerometers during a pinball game, and perform at least one of: discourage the player from applying force to the pinball machine in response to the leveling information meeting a value, or encourage a player to apply force to the pinball machine.

In some cases, to encourage the player to apply force, the instructions may cause the pinball machine to perform at least one of: award a point, award a credit, award an extra pinball, render a virtual object on a display, stop rendering the virtual object on a display, or animate a virtual object on the display. The instructions may further cause the pinball machine to stop encouraging the player to apply force in response to the leveling information meeting a value. In other cases, to discourage the player from applying force, the instructions may cause the pinball machine to perform at least one of: take away a point, take away a credit, take away a pinball, increase the speed of a countdown timer, present an additional target to shoot, or disable a control.

Pinball machines with modular components have been described. In an illustrative, non-limiting embodiment, a method may include providing a cabinet having a first lateral portion and a second lateral portion; and assembling a pinball machine, at least in part, by sliding a physical object into or onto: (a) a support element of the first lateral portion, and (b) a support element of the second lateral portion. For example, the support elements may include one or more slots. The physical object may include two or more fasteners configured to be inserted into the one or more slots. Additionally or alternatively, the support elements may include one or more platforms. The physical object may be mounted on a plate and may include: a flipper, a slingshot, a kicker, a bumper, a target, a plunger, a hole, a saucer, a spinner, a gate, a switch, a stopper, a ramp, or a magnet.

In some implementations, the method may further include assembling the pinball machine, at least in part, by sliding an electronic screen into or onto: (a) another support element of the first lateral portion, and (b) another support element of the second lateral portion. The electronic screen may be configured to render a virtual object, and the pinball machine ma be configured to change an aspect of the physical object in response to the virtual object exhibiting a predefined property. Changing the aspect of the physical object may include simulating a physical interaction between the physical object and the virtual object, and the physical interaction may be configured to affect progress of a game played on the pinball machine.

The aspect may include at least one of: shape of the physical object, a position of the physical object, a speed of the physical object, or a direction of movement of the physical object, a light emitted by the physical object, a color of the physical object, or a sound emitted by the physical object. The predefined property may include at least one of: a distance between the virtual object and the physical object, a speed of the virtual object relative to the physical object, or a direction of movement of the virtual object relative to the physical object.

In other implementations, the method may include removing the physical object from the pinball machine, where the physical object is disposed in a given configuration; and re-assembling the pinball machine, at least in part, by sliding another physical object into or onto the support elements, where the other physical object is disposed in a different configuration. The given configuration may allow a pinball machine to provide a given pinball game, and the different configuration may allow the pinball machine to provide a different game.

The method may further include assembling the pinball machine, at least in part, by attaching a user-replaceable module to an outside surface of the first or second lateral portions, where the user-replaceable module includes one or more controls or terminals configured to communicate with the pinball machine via an interface, and where the interface is configured to receive another user-replaceable module having different one or more control terminals configured to communicate with the pinball machine via the interface. Moreover, the method may include assembling the pinball machine, at least in part, by adding a user-replaceable magnetic decal to a metallic outside surface of the first or second lateral portions.

In another illustrative, non-limiting embodiment, a pinball machine may include a pinball machine cabinet having a first lateral portion and a second lateral portion, and a user-replaceable module coupled to an outside surface of the first or second lateral portions, where the user-replaceable module includes one or more controls or terminals configured to communicate with the pinball machine via an interface. The one or more controls or terminals may include at least one of: a button, a connector, a jack, or a knob. The interface may include a wireless communication interface.

The pinball machine may also include a memory configured to store instructions; and processing circuitry operably coupled to the memory, the processing circuitry configured to execute the instructions to cause the pinball machine to: identify the user-replaceable module as a particular one among a plurality of possible user-replaceable modules; and modify at least one aspect of a pinball game playable on the pinball machine based upon the identification of the particular user-replaceable module.

In yet another illustrative, non-limiting embodiment, a pinball machine may include a pinball machine cabinet having a first lateral portion and a second lateral portion; and a user-replaceable magnetic decal coupled to a metallic outside surface of the first or second lateral portions. The pinball machine may also include a trim piece coupled to the first or second lateral portions and configured to prevent the user-replaceable magnetic decal from being removed from the metallic outside surface by physically covering an edge of the user-replaceable magnetic decal.

It should be understood that the various operations described herein may be implemented in software executed by processing circuitry, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. For example, although presented in the context of pinball machines, various systems and methods described herein may be implemented in other types of amusement games. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A pinball machine comprising:
   a playfield surface on which a pinball rolls during normal gameplay, the playfield surface comprising a proximate portion of the playfield surface and a distal portion of the playfield surface;
   one or more flipper directly above the proximate portion of the playfield surface and controllable by a player during the normal gameplay;
   a playfield reducer disposed between the proximate portion of the playfield surface and the distal portion of the playfield surface, the playfield reducer extending between and from proximate a first outermost lateral edge of the playfield surface to proximate a second outermost lateral edge of the playfield surface, the playfield reducer being operable to be in and transition between a first position and a second position during the normal gameplay, wherein:
   when the playfield reducer is in the first position, the pinball is capable of traversing, by rolling on the playfield surface, between the proximate portion of the playfield surface and the distal portion of the playfield surface, and
   when the playfield reducer is in the second position, the pinball is not capable of traversing, by rolling on the playfield surface, between the proximate portion of the playfield surface and the distal portion of the playfield surface, and the playfield reducer creates no lateral gap between the first outermost lateral edge and the second outermost later edge through which the pinball is capable of rolling on the playfield surface; and
   a computing system comprising a processor and memory, wherein the computing system is operable to:
   detect when a first predetermined condition occurs during the normal gameplay;
   in response to detecting that the first predetermined condition has occurred, activating the playfield reducer to transition from the first position to the second position;
   detect when a second predetermined condition occurs during the normal gameplay; and
   in response to detecting that the second predetermined condition has occurred, deactivating the playfield reducer to transition from the second position to the first position.

2. The pinball machine of claim 1, wherein the proximate portion ot the playfield surface has an electronic screen configured to display one or more virtual elements capable of appearing to interact with the pinball.

3. The pinball machine of claim 1, wherein the first predetermined condition includes: reaching of a predetermined score, the pinball contacting a predetermined target, or a combination thereof.

4. The pinball machine of claim 1, wherein the computing system is operable to determining a physical property of the pinball, the first predetermined condition including whether the physical property matches a predetermined property.

5. The pinball machine of claim 1, wherein the second predetermined condition includes: expiration of a predetermined amount of time, reaching a predetermined score, the pinball contacting a predetermined target, or a combination thereof.

6. The pinball machine of claim 1, wherein the playfield reducer comprises one or more barrier, one or more hole, or a combination thereof.

* * * * *